(12) United States Patent
Zhang et al.

(10) Patent No.: US 11,968,659 B2
(45) Date of Patent: Apr. 23, 2024

(54) METHOD AND APPARATUS FOR PERFORMING COMMUNICATION IN WIRELESS COMMUNICATION SYSTEM

(71) Applicant: Samsung Electronics Co., Ltd., Suwon-si (KR)

(72) Inventors: Chuang Zhang, Beijing (CN); Di Su, Beijing (CN); Peng Lin, Beijing (CN); Chen Qian, Beijing (CN); Bin Yu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 434 days.

(21) Appl. No.: 17/269,990

(22) PCT Filed: Aug. 20, 2019

(86) PCT No.: PCT/KR2019/010590
§ 371 (c)(1),
(2) Date: Feb. 19, 2021

(87) PCT Pub. No.: WO2020/040530
PCT Pub. Date: Feb. 27, 2020

(65) Prior Publication Data
US 2021/0329660 A1 Oct. 21, 2021

(30) Foreign Application Priority Data

Aug. 21, 2018 (CN) .......................... 201810957759.7
Dec. 6, 2018 (CN) ......................... 201811490954.X

(51) Int. Cl.
*H04W 4/00* (2018.01)
*H04W 72/0446* (2023.01)
(Continued)

(52) U.S. Cl.
CPC ..... *H04W 72/121* (2013.01); *H04W 72/0446* (2013.01); *H04W 72/0453* (2013.01); *H04W 72/1268* (2013.01); *H04W 72/23* (2023.01)

(58) Field of Classification Search
CPC ........... H04W 72/121; H04W 72/0446; H04W 72/0453; H04W 72/1268; H04W 72/23;
(Continued)

(56) References Cited

U.S. PATENT DOCUMENTS 9,826,546 B2 * 11/2017 Li .......................... H04L 5/0053
2015/0264664 A1 9/2015 Kawasaki et al.
(Continued)

FOREIGN PATENT DOCUMENTS

EP 2919411 A1 9/2015
WO 2017/097016 A1 6/2017

OTHER PUBLICATIONS

Notification of Transmittal of the International Search Report and the Written Opinion of the International Searching Authority, or the Declaration dated Nov. 27, 2019 in connection with International Patent Application No. PCT/KR2019/010590, 12 pages.

*Primary Examiner* — Chuong T Ho

(57) ABSTRACT

The present disclosure provides a method of scheduling for a UE. The method includes dividing M UEs into N groups, wherein a distance metric between each UE in a group and the center of the group does not exceed a first predetermined threshold, where M and N are positive integers; pairing the N groups, wherein a distance metric between centers of the two paired groups is greater than a second predetermined threshold; and in a case where there is a group paired with a group to which a first UE for which scheduling is to be performed belongs, scheduling transmissions in different directions respectively for the first UE and the second UE from the paired group on the same time-frequency resource.

(Continued)

The present disclosure also provides a signal transmission method, a base station, a UE and a computer readable medium.

8 Claims, 17 Drawing Sheets

(51) Int. Cl.
  *H04W 72/0453* (2023.01)
  *H04W 72/121* (2023.01)
  *H04W 72/1268* (2023.01)
  *H04W 72/23* (2023.01)
(58) Field of Classification Search
  CPC  H04W 72/044; H04W 72/535; H04W 72/541
  USPC .......................................... 370/329, 330, 328
  See application file for complete search history.

(56) References Cited

U.S. PATENT DOCUMENTS

| | | | |
|---|---|---|---|
| 2015/0349942 A1 | 12/2015 | Chatterjee et al. | |
| 2015/0382375 A1 | 12/2015 | Bhushan et al. | |
| 2017/0029343 A1* | 2/2017 | Ginn | B01D 53/502 |
| 2017/0302337 A1* | 10/2017 | Liu | H04L 5/14 |
| 2018/0295020 A1 | 10/2018 | Mo et al. | |

* cited by examiner

[Fig. 1]
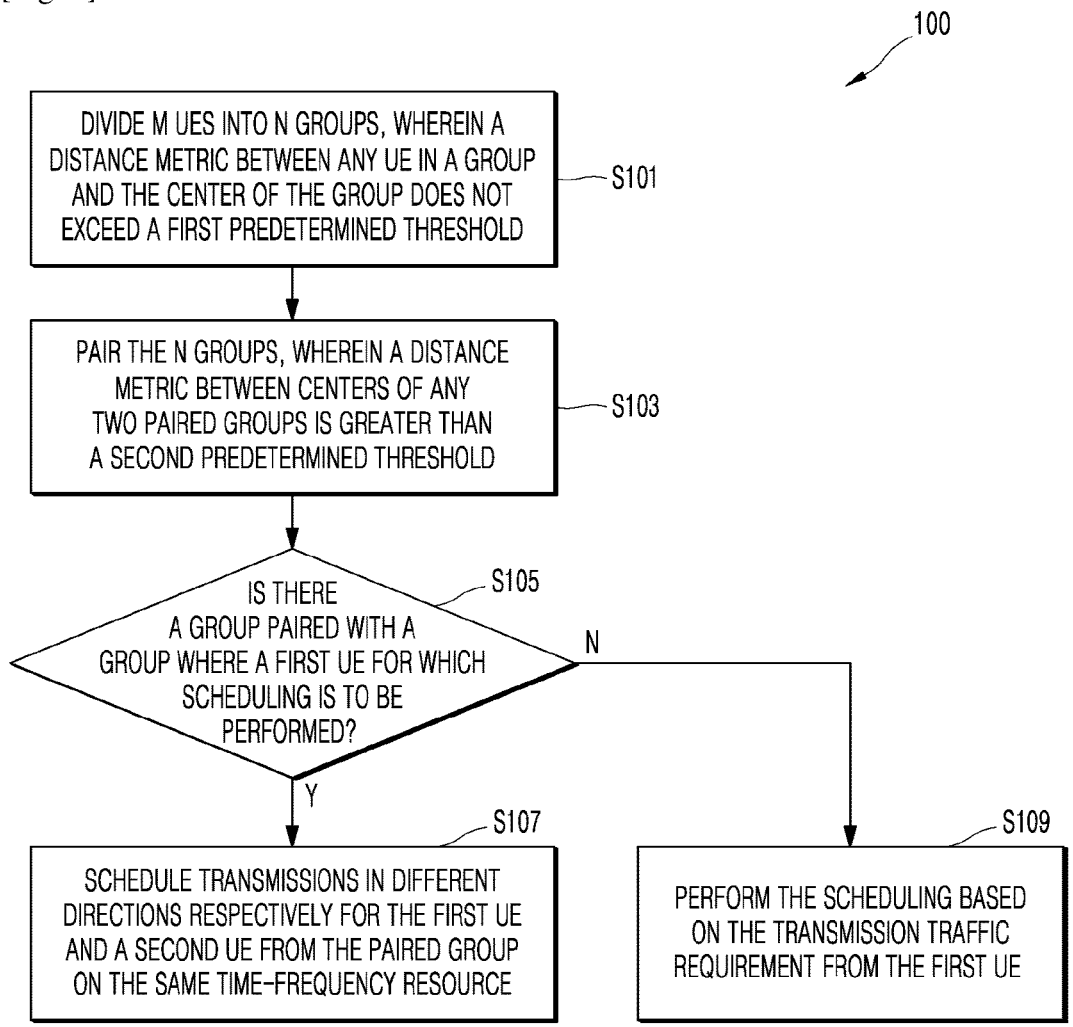
[Fig. 2]
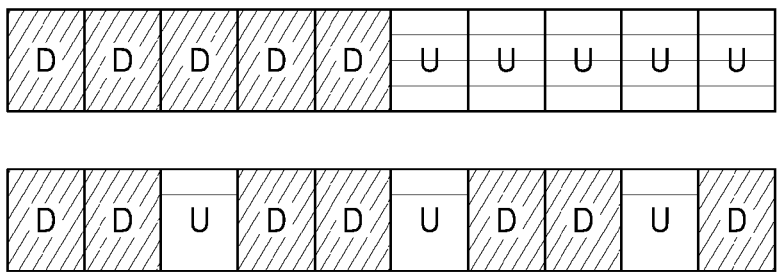

[Fig. 3]
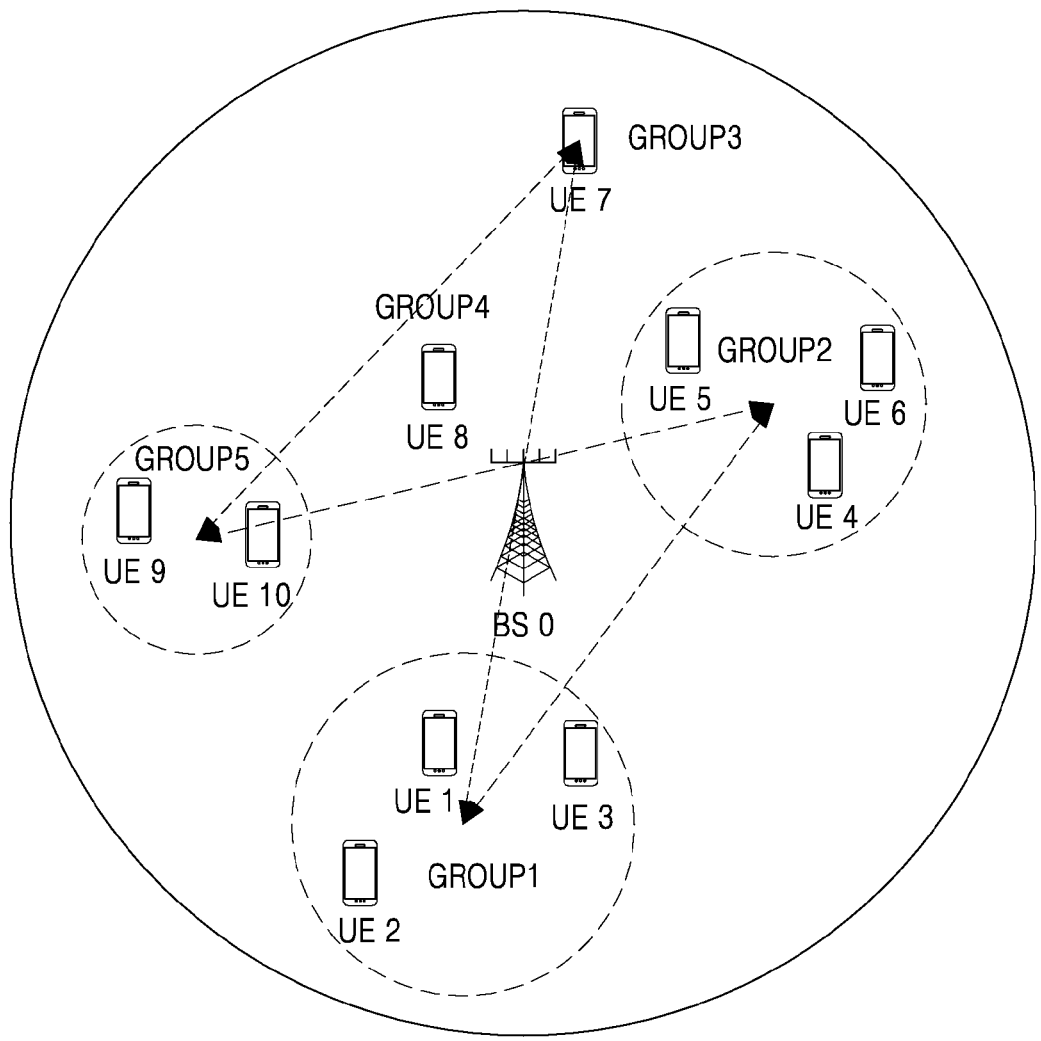

[Fig. 4]
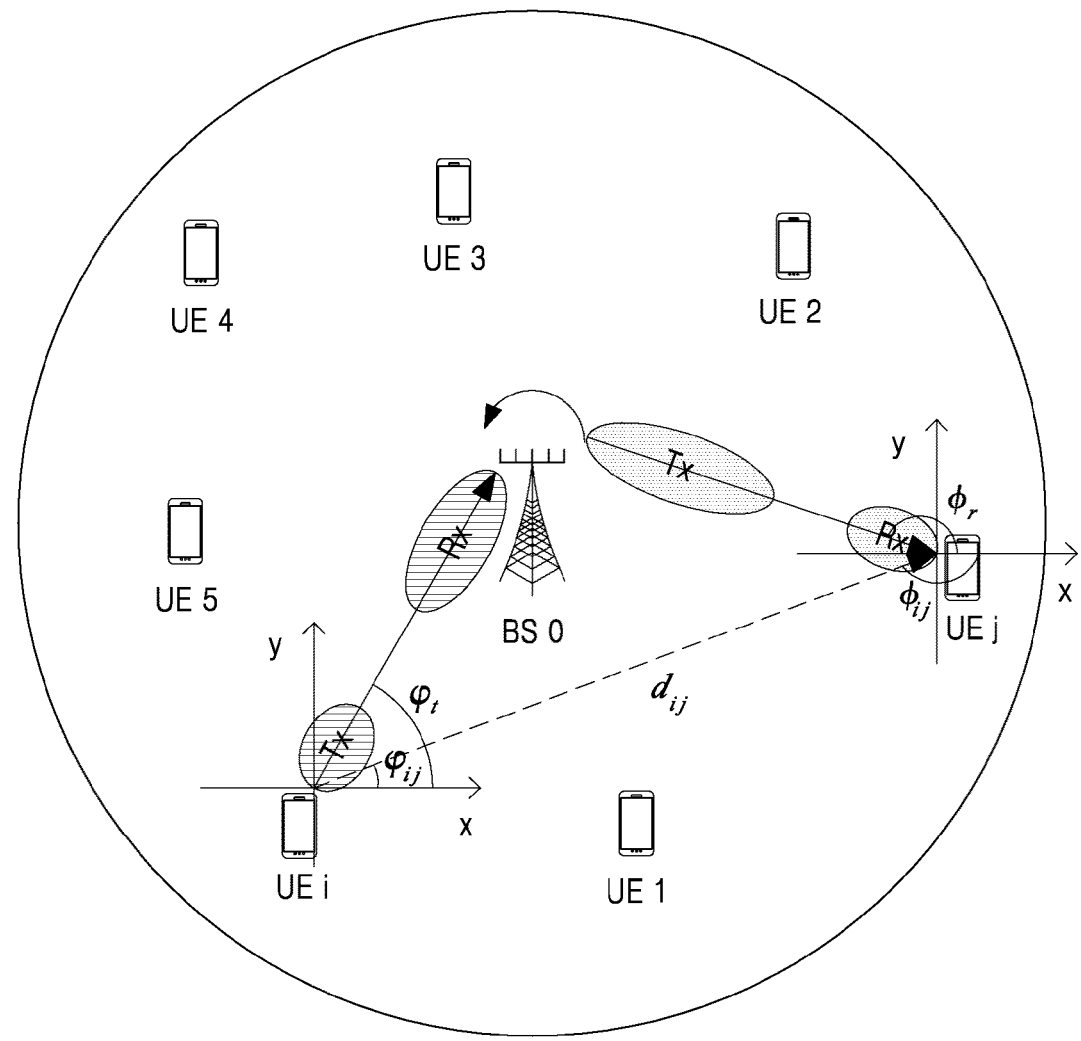

[Fig. 5]
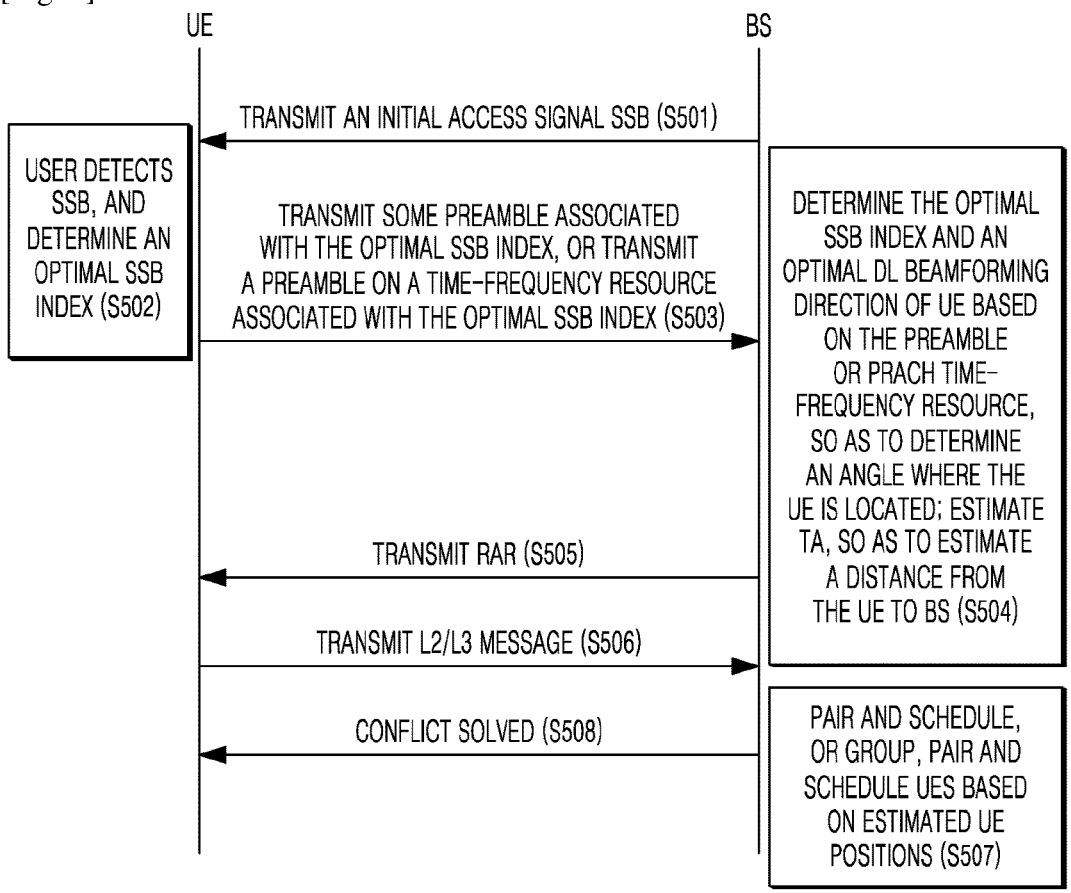

[Fig. 6]
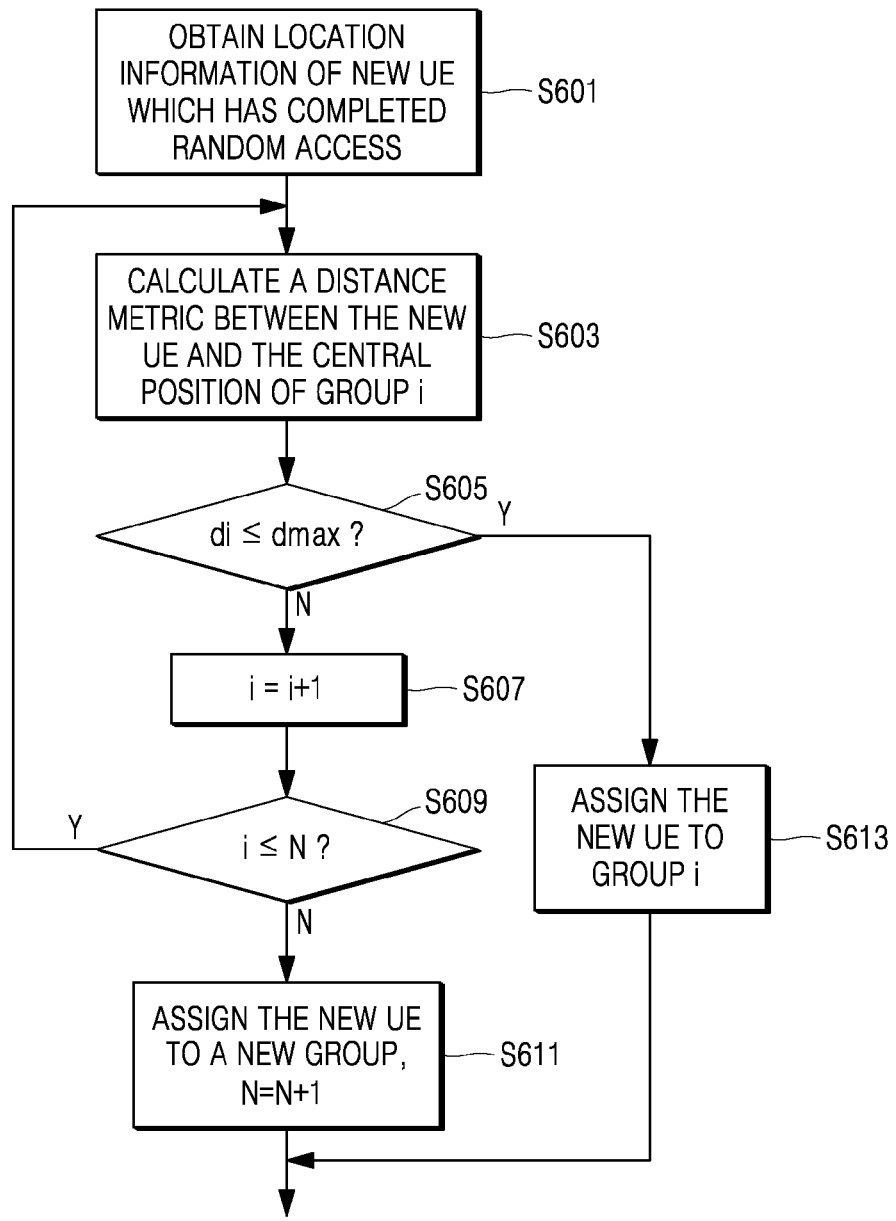

[Fig. 7]
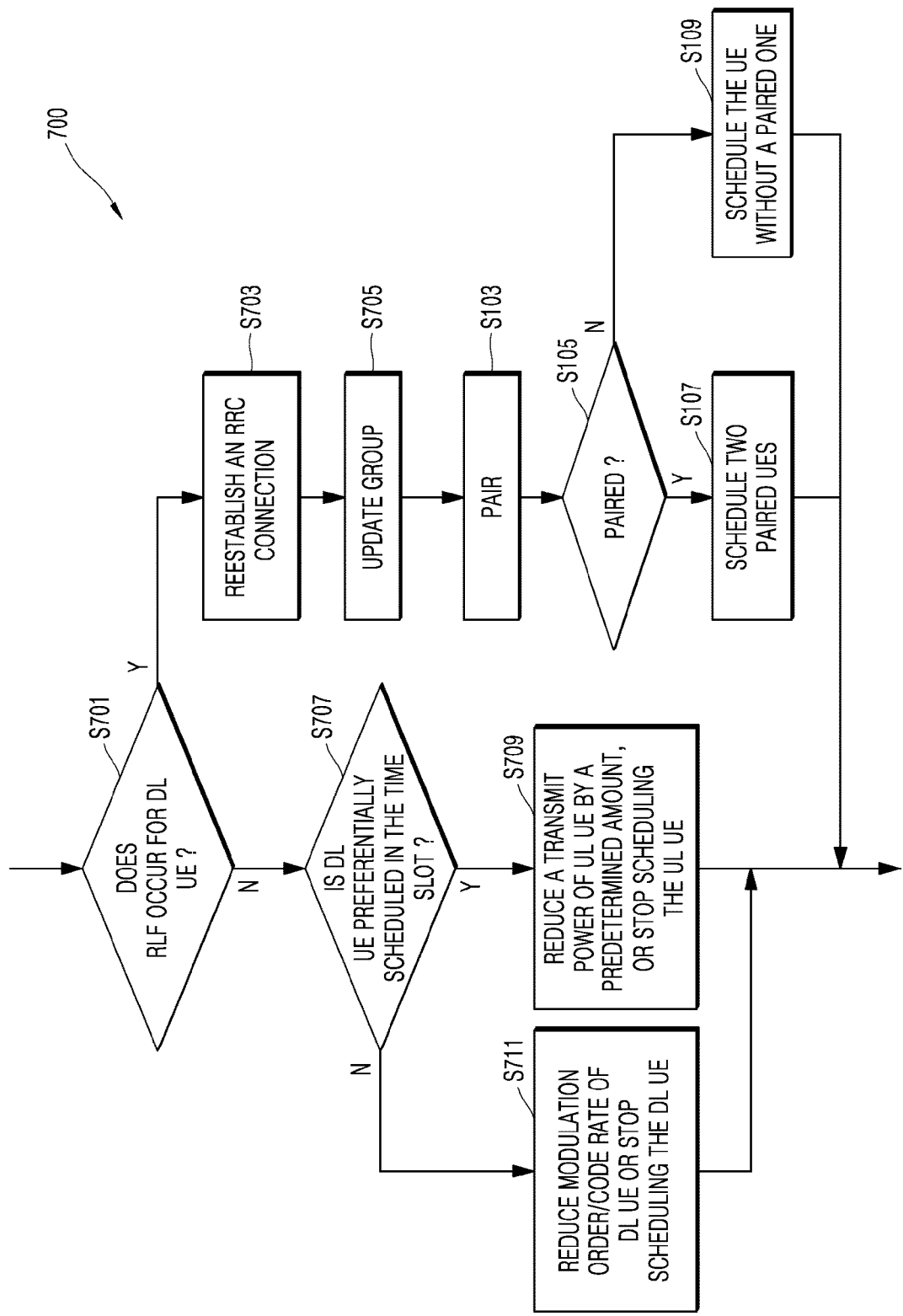

[Fig. 8]
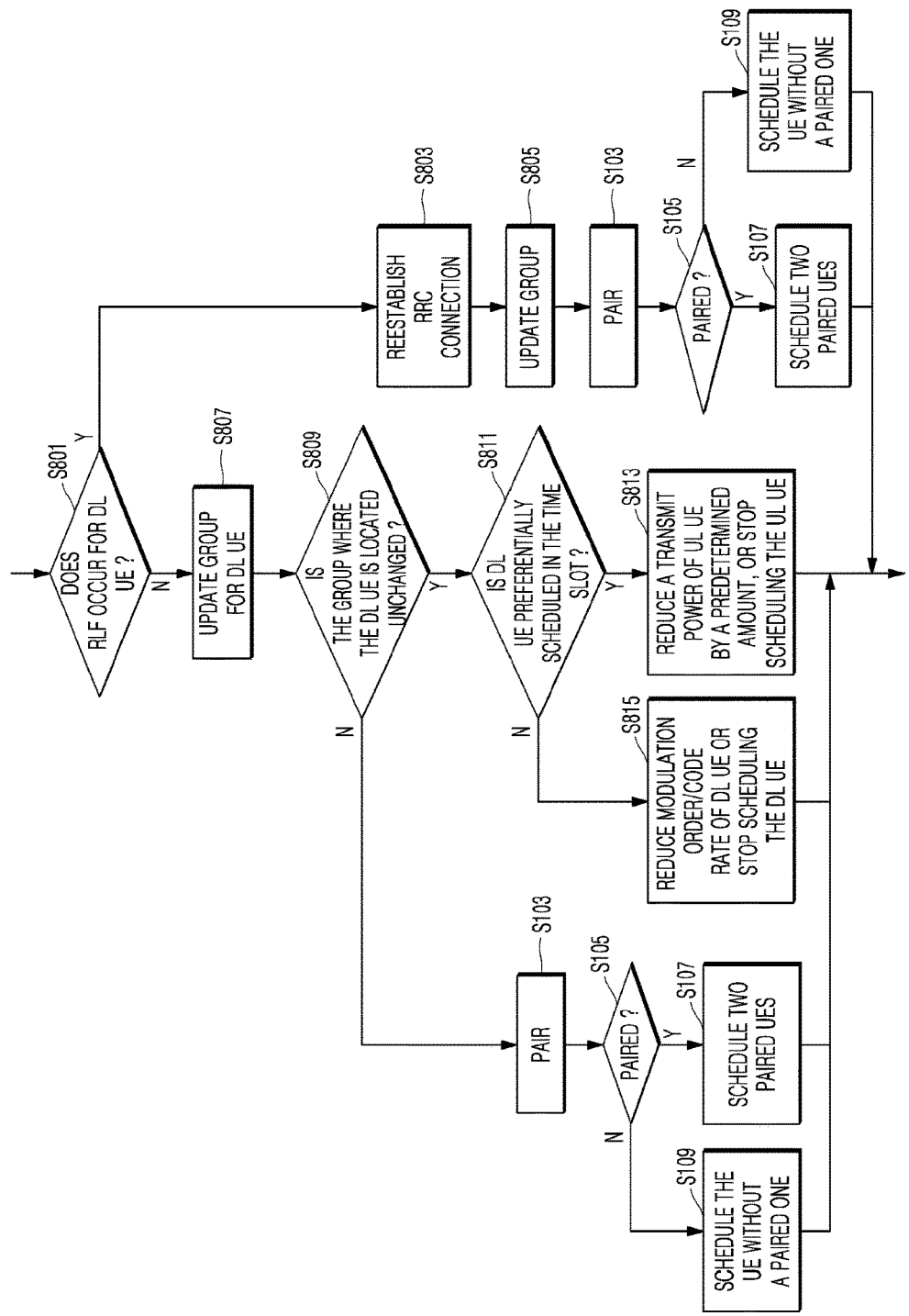
[Fig. 9]
BASE STATION (900)
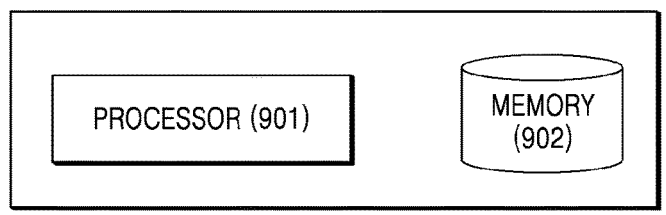

[Fig. 10]
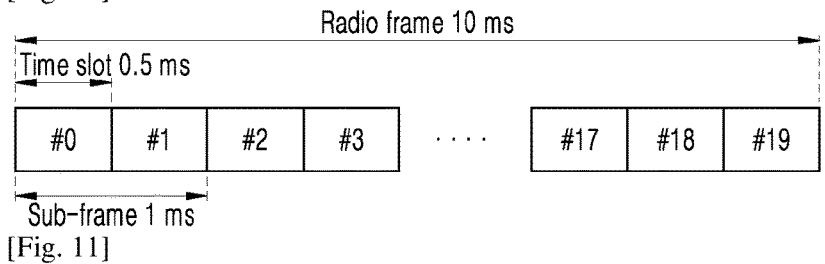
[Fig. 11]
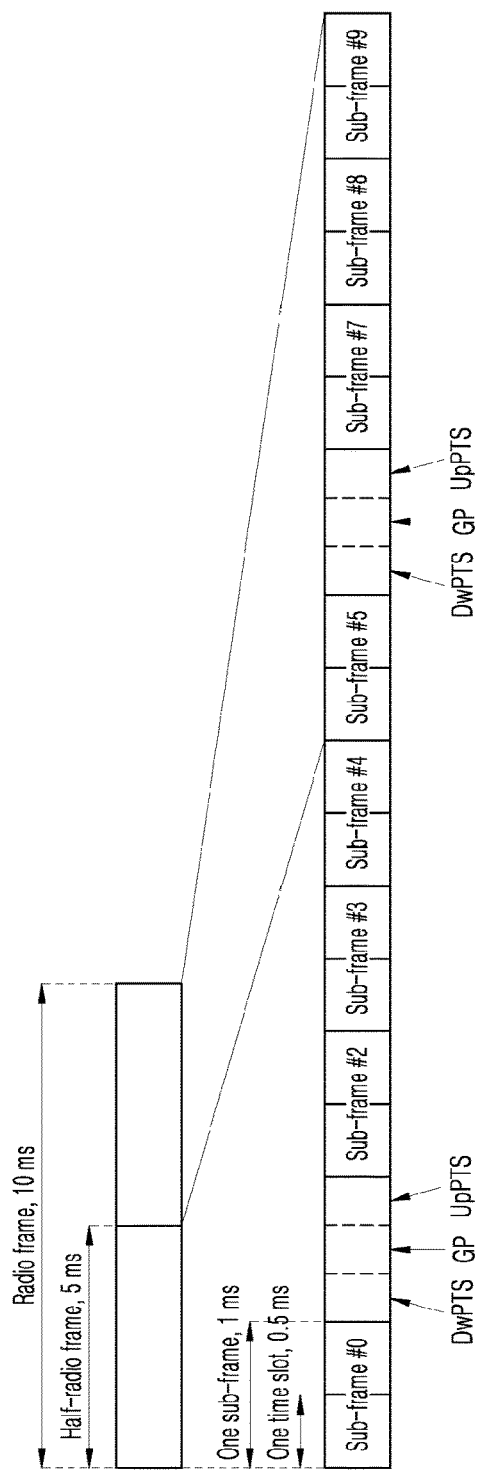

[Fig. 12]
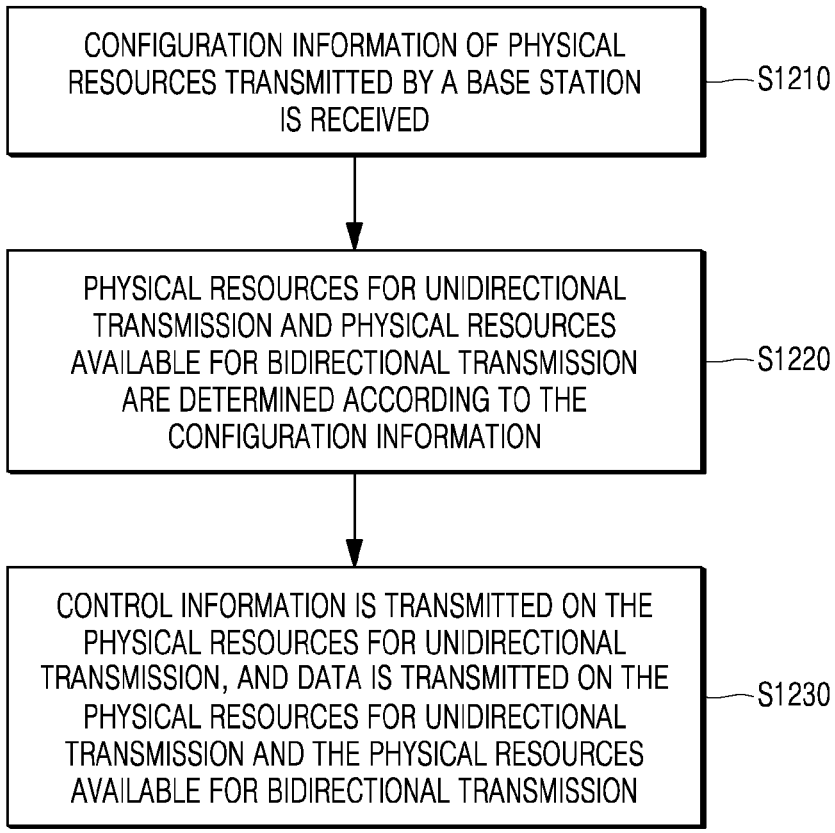
[Fig. 13]
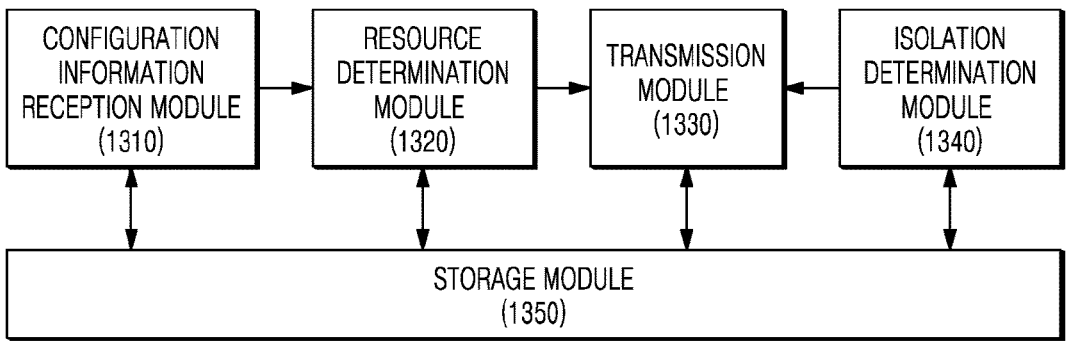
[Fig. 14]
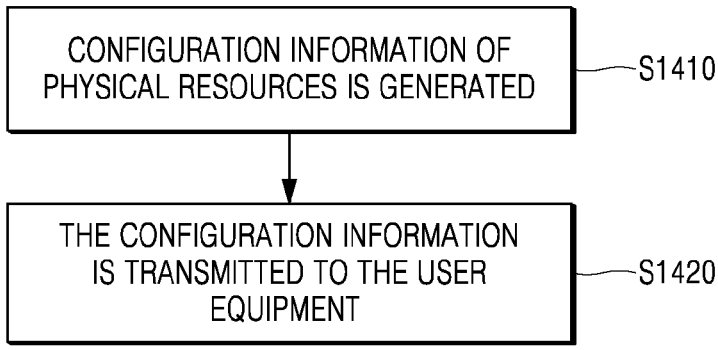

[Fig. 15]
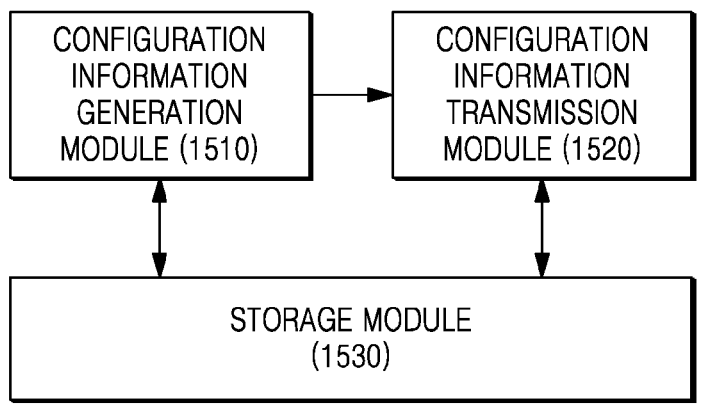
[Fig. 16]
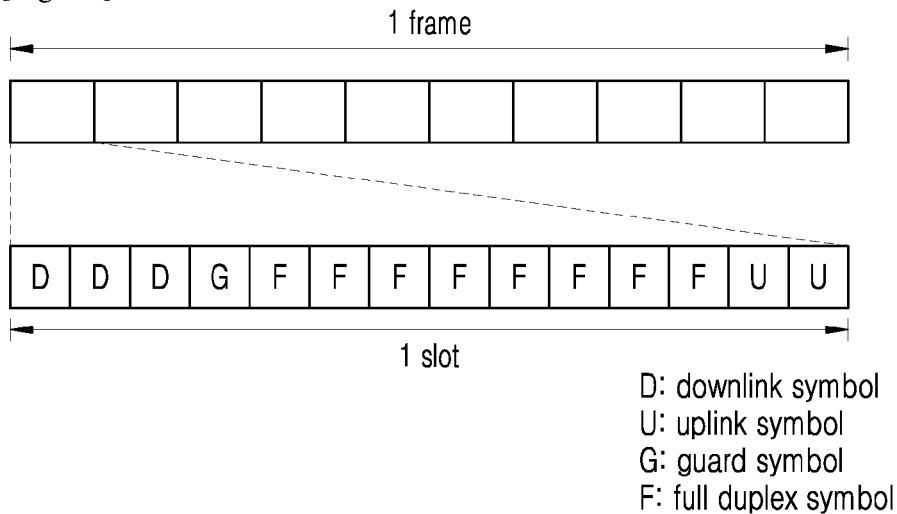
D: downlink symbol
U: uplink symbol
G: guard symbol
F: full duplex symbol

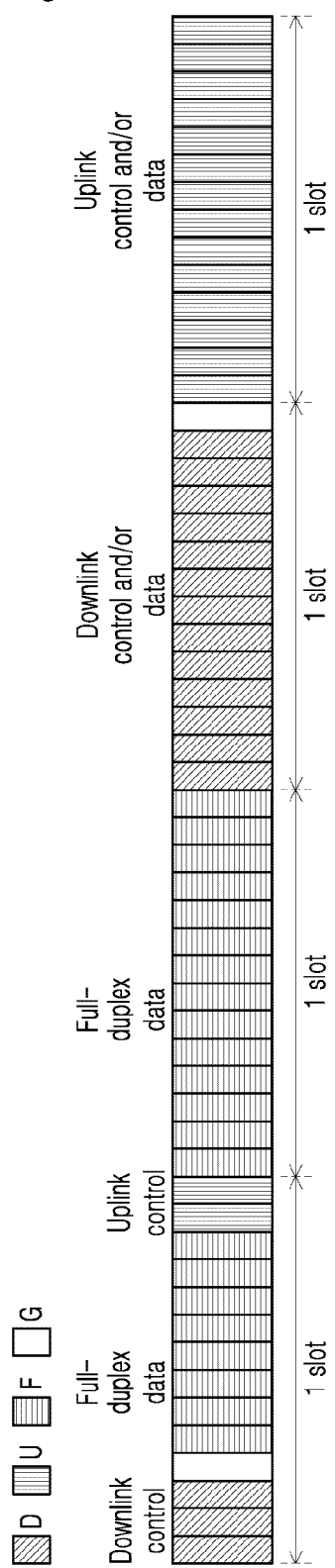
[Fig. 17]

[Fig. 18]
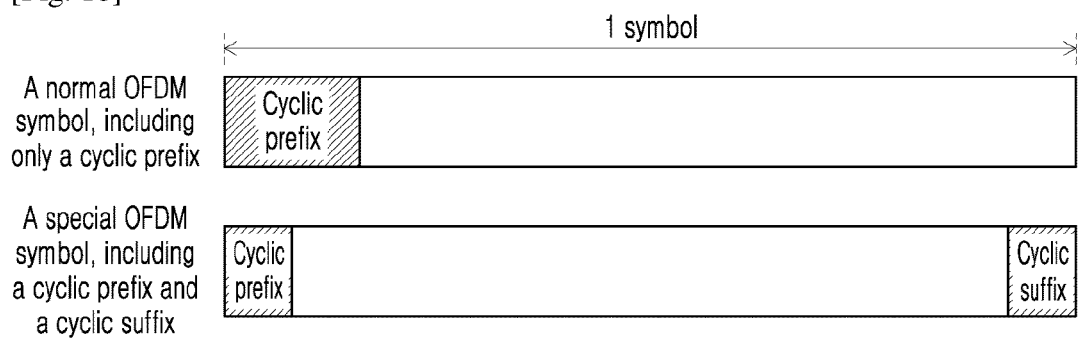

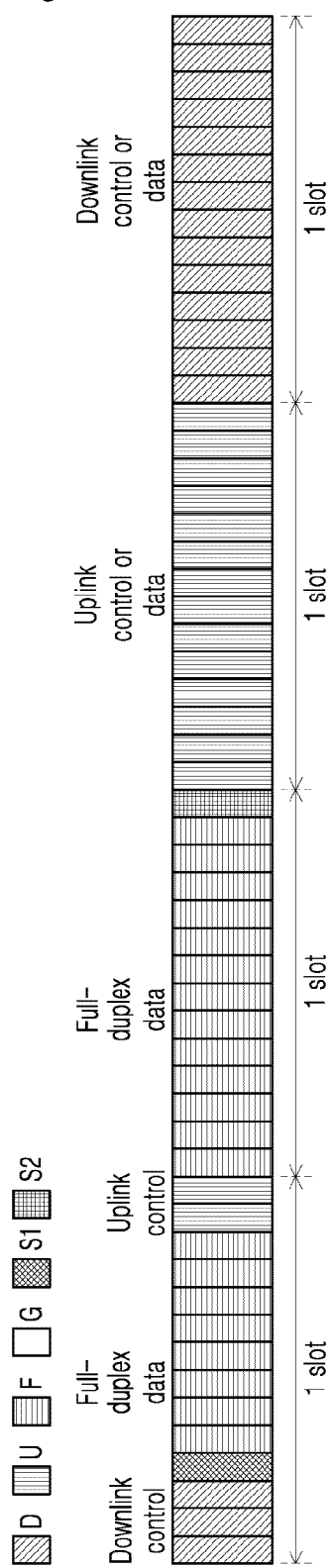
[Fig. 19]

[Fig. 20]
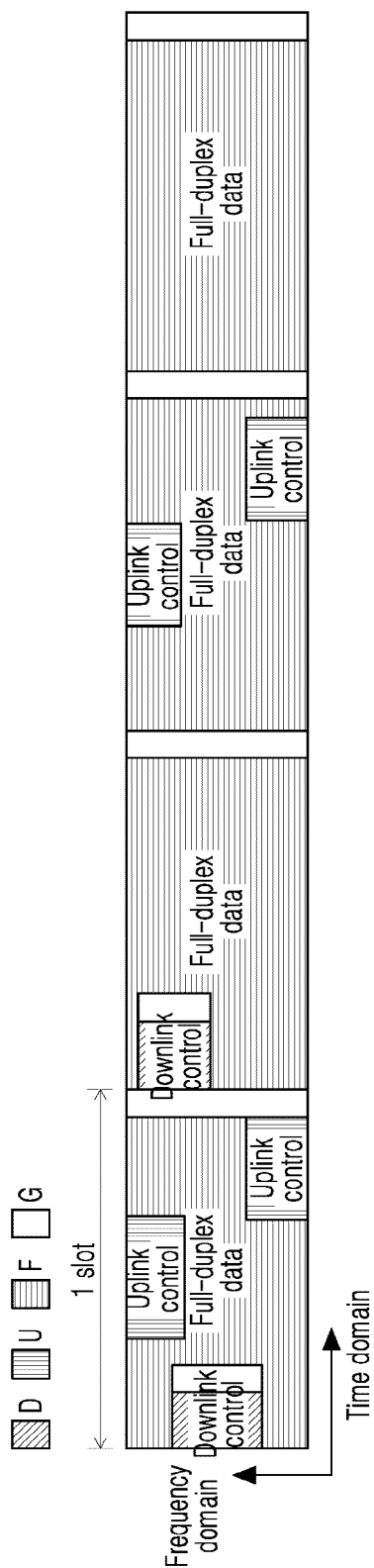

[Fig. 21]
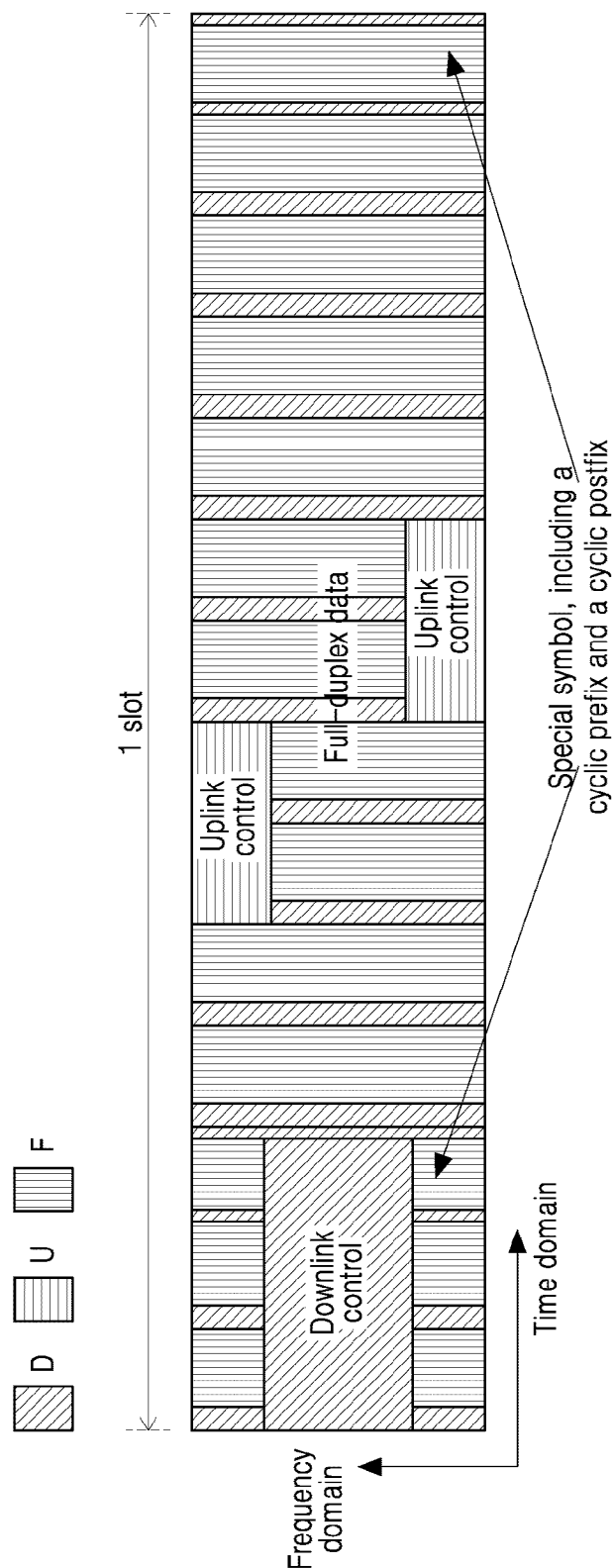

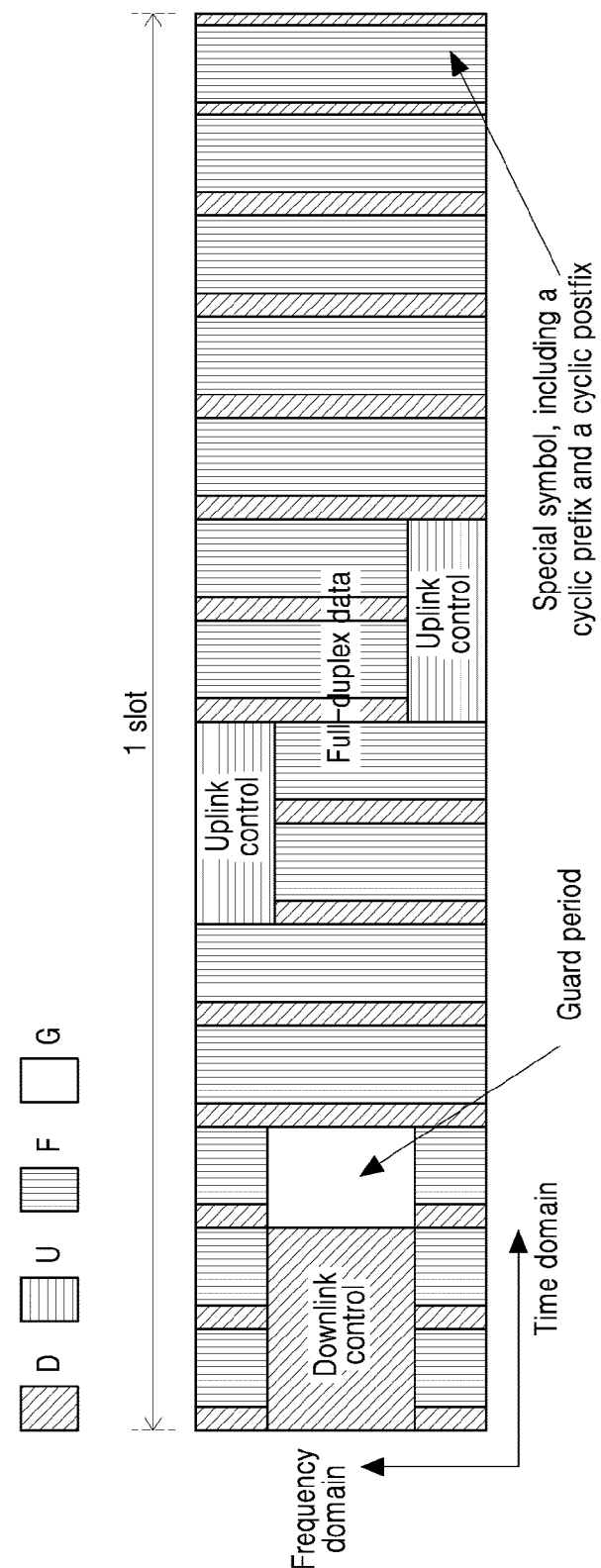
[Fig. 22]

[Fig. 23]
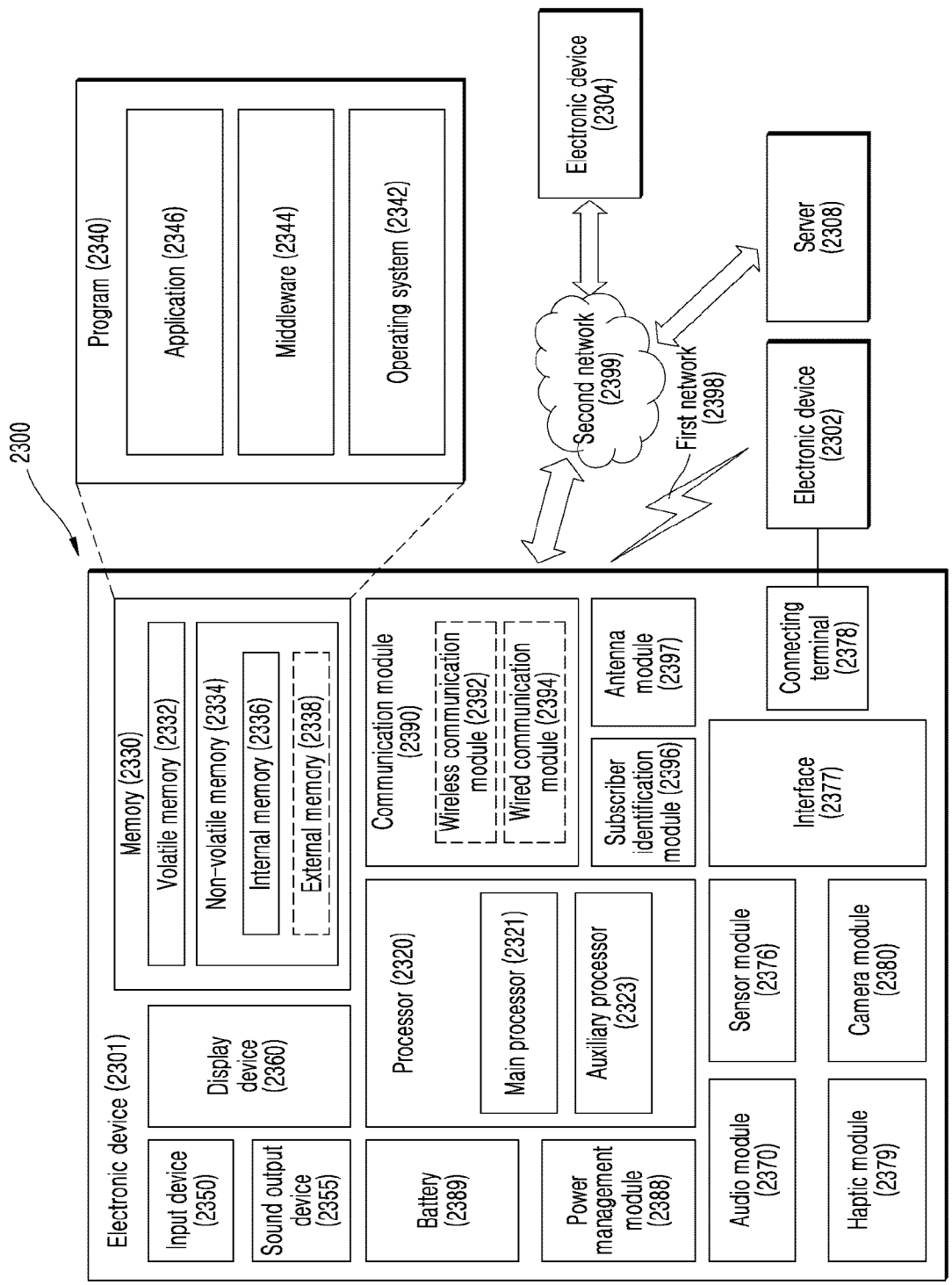

METHOD AND APPARATUS FOR PERFORMING COMMUNICATION IN WIRELESS COMMUNICATION SYSTEM

CROSS-REFERENCE TO RELATED APPLICATIONS

This application is a 371 of International Application No. PCT/KR2019/010590 filed on Aug. 20, 2019, which claims priority to Chinese Patent Application No. 201810957759.7 filed on Aug. 21, 2018 and Chinese Patent Application No. 201811490954.X filed on Dec. 6, 2018, the disclosures of which are herein incorporated by reference in their entireties.

BACKGROUND

1. Field

The present disclosure relates to the field of wireless communication technology, and in particular, to a method and a device for scheduling, a method and a device for signal transmission and a computer readable medium.

2. Description of Related Art

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

Performance of the full-duplex system may be affected by two main factors: first, since the uplink and the downlink are of co-time and co-frequency, a signal transmitted from a full-duplex device may generate a strong self-interference to a received signal, and the self-interference signal is even higher than a noise floor by more than 120 dB; second, since there are UEs that perform uplink and downlink transmissions coexisting on the same time-frequency resource, the UE performing the uplink transmission may generate co-channel interference for the UE performing the downlink transmission.

SUMMARY

The present disclosure provides a method of scheduling for a UE. The method includes dividing M UEs into N groups, wherein a distance metric between each UE in a group and the center of the group does not exceed a first predetermined threshold, where M and N are positive integers; pairing the N groups, wherein a distance metric between centers of the two paired groups is greater than a second predetermined threshold; and in a case where there is a group paired with a group to which a first UE for which scheduling is to be performed belongs, scheduling transmissions in different directions respectively for the first UE and the second UE from the paired group on the same time-frequency resource. The present disclosure also provides a signal transmission method, a base station, a UE and a computer readable medium.

BRIEF DESCRIPTION OF THE DRAWINGS

In order to illustrate the technical solutions in the embodiments of the present disclosure more clearly, the drawings used in the description of the embodiments will be briefly described below. It is obvious that the drawings in the following description are only some embodiments of the present disclosure. Those skilled in the art may also obtain other drawings based on these drawings without any creative labor.

FIG. 1 schematically shows a flowchart of a method of scheduling for a UE which is performed by a base station according to an exemplary embodiment of the present disclosure;

FIG. 2 schematically shows a structure of a frame consisting of time slots according to an exemplary embodiment of the present disclosure;

FIG. 3 schematically shows a diagram of pairing groups according to an exemplary embodiment of the present disclosure;

FIG. 4 schematically shows a diagram of determining a distance metric based on a distance and a beamforming gain according to an exemplary embodiment of the present disclosure;

FIG. 5 schematically shows a process of initially grouping a randomly accessing UE according to an exemplary embodiment of the present disclosure;

FIG. 6 schematically shows a process of initially grouping a randomly accessing new UE in a case where the new UE occurs according to an exemplary embodiment of the present disclosure;

FIG. 7 schematically shows a method of performing scheduling by a base station in a case where a failure of demodulation by a downlink UE occurs according to an exemplary embodiment of the present disclosure;

FIG. 8 schematically shows another method of performing scheduling by a base station in a case where a failure of demodulation by a downlink UE occurs according to an exemplary embodiment of the present disclosure; and FIG. 9 schematically shows a block diagram of a structure of a base station according to an exemplary embodiment of the present disclosure.

FIG. 10 illustrates a schematic diagram of a frequency division duplex frame structure;

FIG. 11 illustrates a schematic diagram of a time division duplex frame structure;

FIG. 12 illustrates a schematic flowchart of a signal transmission method at a User Equipment (UE) according to an embodiment of the present disclosure;

FIG. 13 illustrates a schematic block diagram of a UE according to an embodiment of the present disclosure;

FIG. 14 illustrates a schematic flowchart of a signal transmission method at a base station according to an embodiment of the present disclosure;

FIG. 15 illustrates a schematic block diagram of a base station according to an embodiment of the present disclosure;

FIG. 16 illustrates a schematic diagram of a frame structure according to the present embodiment;

FIG. 17 is a schematic diagram of a rule of correspondence between symbol directions and transmission contents according to an embodiment of the present disclosure;

FIG. 18 illustrates a schematic diagram of a special Orthogonal Frequency Division Multiplexing (OFDM) symbol according to the present embodiment;

FIG. 19 is another schematic diagram of a rule of correspondence between symbol directions and transmission contents according to an embodiment of the present disclosure;

FIG. 20 illustrates a schematic diagram of another frame structure according to the present embodiment;

FIG. 21 illustrates a schematic diagram of yet another frame structure according to the present embodiment;

FIG. 22 illustrates a schematic diagram of still another frame structure according to the present embodiment; and FIG. 23 is a block diagram illustrating an electronic apparatus 2301 in a network environment 2300 according to various embodiments.

DETAILED DESCRIPTION

In order to effectively suppress the co-channel interference between the UEs in the cell while scheduling the uplink and the downlink data transmissions on the same time-frequency resource so as to improve spectrum efficiency and throughput of the overall system, the present disclosure provides a method of scheduling for a UE and a base station capable of performing the method. By grouping and pairing UEs properly, it may ensure that the co-channel interference of the UEs is controlled at a certain level when the uplink and the downlink transmissions are simultaneously scheduled on the same time-frequency resource.

According to a first aspect of the present disclosure, a method of scheduling for a UE is provided. The method includes: dividing M UEs into N groups, wherein a distance metric between each UE in a group and a center of the group does not exceed a first predetermined threshold, where M and N are positive integers, and M≥N; pairing the N groups, wherein a distance metric between centers of the two paired groups is greater than a second predetermined threshold; and in a case where there is a group paired with a group to which a first UE for which scheduling is to be performed belongs, scheduling transmissions in different directions respectively for the first UE and a second UE from the paired group on a same time-frequency resource.

In an exemplary embodiment, when M>N, said dividing the M UEs into the N groups includes:

initially dividing the M UEs into N0 groups based on a distance metric between any two of the M UEs, where N0 is a positive integer, and N0≤N;

for each of the N0 groups,
determining whether a distance metric between each UE in the group and an initial center of the group exceeds the first predetermined threshold, wherein the initial center of the group is obtained by averaging positions of the UEs in the group;

if there is a UE in the group whose distance metric from the initial center of the group exceeds the first predetermined threshold, subdividing the group into two groups based on the distance metric between any two of the UEs in the group;

*39 for each of the two groups,
determining, whether a distance metric between the UE in the group and the center of the group exceeds the first predetermined threshold;

if there is a UE in the group whose distance metric from the center of the group exceeds the first predetermined threshold, repeating the subdividing step; and if there is no UE in the group whose distance metric from the center of the group exceeds the first predetermined threshold, repeating the determining step for the next group, until there is no UE in any of the groups whose distance metric from the center of the group exceeds the first predetermined threshold; and obtaining the center of the group by averaging the positions of the UEs in the group.

In an exemplary embodiment, the distance metric is represented by distance, wherein the position of the UE is obtained by:

quantizing a $2\pi$ angle into W parts according to a Precoding Matrix Index 'PMI' reported by the UE, to obtain angles $0 \leq \varphi_0 < \varphi_1 < \ldots < \varphi_{W-1} \leq 2\pi$, corresponding to beamforming vectors $e(\varphi_0), e(\varphi_1), \ldots, e(\varphi_{W-1})$ respectively; and determining an angle $\varphi$ at which the UE is located according to a formula given as:

$$\varphi = \arg\max_{(\varphi_i)} \text{max-element}(e^H(\varphi_i)P)$$

where P is a PMI matrix max-element($e^H(\varphi_i)P$) denotes a maximum element in a vector $e^H(\varphi_i)P$, and $\arg\max_{\varphi_i}$ denotes an angle $\varphi_i$ which makes max-element($e^H(\varphi_i)P$)

maximum, where W is a positive integer, and i is an integer between 0 and (W−1); and calculating a distance between the UE and a base station based on a timing advance 'TA' of the UE.

In an exemplary embodiment, the distance metric is determined based on a distance and a beamforming gain, wherein the distance is associated with a path loss estimate, wherein said dividing the M UEs into the N groups includes: dividing the M UEs into the N groups based on $$\beta_{i0} = \frac{L_{i0}}{G_{i0}^{tx} G_{i0}^{rx}},$$

wherein the distance metric $\beta_{iO}$ between UEi in the group and the center G0 of the group does not exceed the first predetermined threshold, where Li0 denotes a path loss estimate from UEi to the center G0 of the group, $G_{iO}^{tx}$ denotes a beamforming gain of a transmit beam of UEi in a direction of G0 when the transmit beam of UEi is directed to the base station, $G_{iO}^{rx}$ denotes a beamforming gain of a receive beam of the center G0 of the group in a direction of UEi when the receive beam of the center G0 of the group is directed to the base station; and said pairing the N groups includes: pairing the N groups based on $$\beta_{mn} = \frac{L_{mn}}{G_{mn}^{tx} G_{mn}^{rx}},$$

wherein the distance metric $\beta_{mn}$ between centers $G_m$ and $G_n$ of any two paired groups is greater than the second predetermined threshold, where $L_{mn}$ denotes a path loss estimate of the center $G_m$ of the group to the center $G_n$ of the group, $G_{mn}^{tx}$ denotes a beamforming gain of a transmit beam of the center $G_m$ of the group in a direction of the center $G_n$ of the group when the transmit beam of the center $G_m$ of the group is directed to the base station, $G_{mn}^{rx}$ denotes a beamforming gain of a receive beam of the center $G_n$ of the group in a direction of the center $G_m$ of the group when the receive beam of the center $G_n$ of the group is directed to the base station, where i is a positive integer and not greater than M, and m and n are positive integers and not greater than N.

In an exemplary embodiment, said dividing the M UEs into the N groups includes: dividing the M UEs into the N groups based on $$\beta_{i0} = \frac{d_{i0}^{\alpha}}{e_t^H(\varphi_t) e_t(\varphi_{i0}) e_r^H(\phi_{i0}) e_r(\phi_r)},$$

wherein the distance metric $\beta_{iO}$ between UEi in the group and the center G0 of the group does not exceed the first predetermined threshold, where di0 denotes a distance from UEi to the center G0 of the group, α denotes a path loss exponent, $\varphi_t$ denotes a beamforming angle of the transmit beam of UEi in the direction of the center G0 of the group when the transmit beam of UEi is directed to the base station, $e_t^H(\varphi_t)$ denotes a conjugate transpose of a transmit beamforming vector $e_t(\varphi_t)$ of UEi in the direction of the center G0 of the group, $\phi_r$ denotes a beamforming angle of the receive beam of the center G0 of the group in the direction of UEi when the receive beam of the center G0 of the group is directed to the base station, $e_r(\phi^r)$ denotes a receive beamforming vector of the center G0 of the group in the direction of UEi, $\varphi^{iO}$ denotes an AOD (Angle of Departure) of UEi to the center G0 of the group, and $e_t(\varphi_{iO})$ denotes an AOD vector of UEi to the center G0 of the group, $\varphi^{iO}$ denotes an AOA (Angle of Arrival) of UEi to the center G0 of the group, and $e_r^H(\phi_{iO})$ denotes a conjugate transpose of an AOA vector $e_r(\phi_{iO})$ of UEi to the center G0 of the group; and said pairing the N groups includes: pairing the N groups based on $$\beta_{mn} = \frac{d_{mn}^{\alpha}}{e_t^H(\varphi'_t) e_t(\varphi'_{mn}) e_r^H(\phi'_{mn}) e_r(\phi'_r)},$$

wherein the distance metric $\beta_{mn}$ between the Gm and Gn of any two paired groups is greater than the second predetermined threshold, wherein dmn denotes a distance from Gm to Gn, $\varphi'_t$ denotes a beamforming angle of the transmit beam of Gm in a direction of Gn when the transmit beam of Gm is directed to the base station, $e_t^H(\varphi_{iO})$ denotes a conjugate transpose of a transmit beamforming vector $e_t(\varphi'_t)$ of the transmit beam of Gm in the direction of Gn, $\phi'_r$ denotes a beamforming angle of a receive beam of Gn in the direction of Gm when the receive beam of Gn is directed to the base station, $e_r(\varphi'_r)$ denotes a beamforming vector of the receive beam of Gn in the direction of Gm, $\varphi'_{mn}$ denotes an AOD of Gm to Gn, $e_t(\varphi'_{mn})$ denotes an AOD vector of Gm to Gn, $\phi'_{mn}$ denotes an AOA of Gm to Gn, and $e_r^H(\phi'_{mn})$ denotes a conjugate transpose of an AOA vector $e_r(\phi'_{mn})$ of Gm to Gn, where i, m and n are positive integers.

In an exemplary embodiment, when a number of transmit antennas of UEa is different from that of UEb, and/or a number of receive antennas of UEa is different from that of UEb, the distance metric between UEa and UEb is represented by $$\frac{\beta_{ab} + \beta_{ba}}{2},$$

where a and b are positive integers and not greater than M.

In an exemplary embodiment, when the distance metric βiO between UEi in the group and the center G0 of the group is calculated, it is assumed that numbers of transmit antennas and receive antennas of G0 are respectively equal to those of UEi; and when the distance metric βmn between Gm and Gn is calculated, it is assumed that numbers of transmit antennas and receive antennas of Gm and Gn are respectively equal to the numbers of transmit antennas and receive antennas of most of the UEs in their respective groups, then when the number of the transmit antennas of Gm is different from that of Gn, and/or the number of the receive antennas of Gm is different from that of Gn, the distance metric between Gm and Gn is represented by $$\frac{\beta_{mn} + \beta_{nm}}{2}$$

In an exemplary embodiment, said scheduling the transmissions in different directions respectively for the first UE and the second UE from the paired group on the same time-frequency resource further includes:

pre-configuring a time slot to preferentially schedule an uplink transmission or a downlink transmission thereon;

selecting, based on a predetermined scheduling criterion, the first UE whose transmission traffic meets a transmission requirement of a direction of the preferentially scheduled transmission;

selecting, from the group paired with the group to which the first UE belongs, the second UE whose transmission traffic meets a transmission requirement in a different direction; and scheduling the transmissions in different directions in the time slot respectively for the selected first UE and second UE.

In an exemplary embodiment, said scheduling the transmissions in different directions respectively for the first UE and the second UE from the paired group on the same time-frequency resource further includes:

determining the uplink UE and the downlink UE in a time slot based on a formula for a sum rate given as:

$$R_d + \alpha R_u,$$

where RD is a downlink rate of one of the first UE and the second UE in the time slot, RU is an uplink rate of the other of the first UE and the second UE in the time slot, and α is a weighting coefficient configured by a system for determining a ratio of the uplink rate in the time slot in said scheduling;

selecting, based on a predetermined scheduling criterion, the first UE and the second UE whose sum rate meets a transmission requirement; and scheduling the transmissions in different directions in the time slot respectively for the selected first UE and second UE.

In an exemplary embodiment, the method further includes:

in a case of access by a new UE, sequentially determining whether a distance metric between the new UE and the center of each group exceeds the first predetermined threshold;

if there is a group for which a distance metric between its center and the new UE is smaller than the first predetermined threshold, assigning the new UE to the group;

if the distance metric between the new UE and the center of each group exceeds the first predetermined threshold, assigning the new UE to a new group.

In an exemplary embodiment, the method further includes updating the group, which includes:

when a report is received from the UE, determining whether the distance metric between the reporting UE and the center of the group to which the reporting UE belongs exceeds the first predetermined threshold;

if the distance metric between the reporting UE and the center of the group to which the reporting UE belongs exceeds the first predetermined threshold, sequentially determining whether the distance metric between the reporting UE and the center of each of the remaining groups exceeds the first predetermined threshold;

if there is a group for which the distance metric between its center and the reporting UE is smaller than the first predetermined threshold, assigning the reporting UE into the group;

if the distance metric between the reporting UE and the center of each group exceeds the first predetermined threshold, assigning the reporting UE to a new group.

In an exemplary embodiment, the method further includes:

determining whether an RLF (Radio Link Failure) occurs for the UE, in response to a failure of data demodulation by the UE; and if it is determined that the RLF occurs for the UE, performing a step of updating the group in a case where the UE reestablishes a RRC (Radio Resource Control) connection with a base station; and performing the pairing and the scheduling based on the updated group.

In an exemplary embodiment, the method further includes:

if it is determined that the RLF does not occur for the UE, performing a rate adjustment according to whether the downlink transmission or the uplink transmission is preferentially scheduled in the current time slot, by:

if the downlink transmission is preferentially scheduled in the current time slot, reducing a transmission power of a UE which is scheduled for the uplink transmission by a predetermined amount, or stopping scheduling the uplink transmission; or if the uplink transmission is preferentially scheduled in the current time slot, reducing a modulation order or a code rate of the downlink transmission, or stopping scheduling the downlink transmission.

In an exemplary embodiment, the method further includes:

if it is determined that the RLF does not occur for the UE, performing the step of updating the group for the UE;

if the updated group to which the UE belongs is the same group to which the UE originally belongs, performing rate adjustment according to whether the downlink transmission or the uplink transmission is preferentially scheduled in the current time slot, by:

if the downlink transmission is preferentially scheduled in the current time slot, reducing a transmission power of the UE which is scheduled for the uplink transmission by a predetermined amount according to an SINR (Signal to Interference plus Noise Ratio) reported by the UE which is scheduled for the downlink transmission, or stopping scheduling the uplink transmission; or if the uplink transmission is preferentially scheduled in the current time slot, reducing a modulation order or a code rate of the downlink transmission according to the SINR reported by the UE which is scheduled for the downlink transmission, or stopping scheduling the downlink transmission.

In an exemplary embodiment, the method further includes:

if the updated group to which the UE belongs is different from the group to which the UE originally belongs, performing the pairing and the scheduling based on the updated group.

In an exemplary embodiment, the method further includes: in a case where there is no group paired with the group to which the first UE for which scheduling is to be performed belongs, performing the scheduling based on the transmission traffic requirement from the first UE.

According to a second aspect of the present disclosure, a method of scheduling transmissions in different directions respectively on a same time-frequency resource is provided, wherein a first UE scheduled to perform a downlink transmission and a second UE scheduled to perform an uplink transmission respectively belong to two paired groups from a plurality of groups, a distance metric between any UE in each of the plurality of groups and a center of the group does not exceed a first predetermined threshold, and a distance metric between centers of the two paired groups is greater than a second predetermined threshold, the method comprising:

determining whether a Radio Link Failure 'RLF' occurs for the first UE, in response to a failure of demodulating data by the first UE; and if it is determined that the RLF occurs for the first UE, performing a step of updating the group for the first UE in a case where the first UE reestablishes a Radio Resource Control 'RRC' connection with the base station.

In an exemplary embodiment, said step of updating the group includes: determining whether a distance metric between the first UE and a center of the group to which the first UE belongs exceeds the first predetermined threshold; if the distance metric between the first UE and the center of the group to which the first UE belongs exceeds the first predetermined threshold, sequentially determining whether the distance metric between the first UE and the center of each of the remaining groups exceeds the first predetermined threshold; if there is a group for which the distance metric between its center and the first UE is smaller than the first predetermined threshold, assigning the first UE to the group; if the distance metric between the first UE and the center of each group exceeds the first predetermined threshold, assigning the first UE to a new group; pairing the group to which the first UE belongs with another group, wherein the distance metric between the centers of the two paired groups is greater than the second predetermined threshold; and in a case where there is a group paired with the group to which the first UE belongs, scheduling the uplink transmission and the downlink transmission respectively for the first UE and a UE from the paired group for which the uplink transmission is to be performed on the same time-frequency resource.

In an exemplary embodiment, the method further includes: if it is determined that the RLF does not occur for the first UE, performing a rate adjustment according to whether the downlink transmission or the uplink transmission is preferentially scheduled in the current time slot, by:

if the downlink transmission is preferentially scheduled in the current time slot, reducing a transmission power of the second UE by a predetermined amount, or stopping scheduling the uplink transmission; or if the uplink transmission is preferentially scheduled in the current time slot, reducing a modulation order or a code rate of the downlink transmission, or stopping scheduling the downlink transmission.

In an exemplary embodiment, the method further includes:

if it is determined that the RLF does not occur for the first UE, performing the step of updating the group for the first UE;

if the updated group to which the first UE belongs is the same group to which the first UE originally belongs, performing rate adjustment according to whether the downlink transmission or the uplink transmission is preferentially scheduled in the current time slot, by:

if the downlink transmission is preferentially scheduled in the current time slot, reducing a transmission power of the UE from the paired group for which the uplink transmission is to be performed by a predetermined amount according to a SINR reported by the first UE, or stopping scheduling the uplink transmission; or if the uplink transmission is preferentially scheduled in the current time slot, reducing a modulation order or a code rate of the downlink transmission according to the SINR reported by the first UE, or stopping scheduling the downlink transmission.

In an exemplary embodiment, the method further includes:

if the updated group to which the first UE belongs is different from the group to which the first UE originally belongs, pairing the updated group to which the first UE belongs with another group, wherein the distance metric between the centers of the two paired groups is greater than the second predetermined threshold; and in a case where there is a group paired with the updated group to which the first UE belongs, scheduling the uplink transmission and the downlink transmission respectively for the first UE and the UE from the paired group for which the uplink transmission is to be performed on the same time-frequency resource.

In an exemplary embodiment, the method further includes:

in a case where there is no group paired with the group to which the first UE belongs, scheduling only the downlink transmission for the first UE.

According to a third aspect of the present disclosure, a base station is provided. The base station includes: a processor; and a memory storing computer executable instructions that, when executed by the processor, cause the base station to:

divide M UEs into N groups, wherein a distance metric between each UE in a group and a center of the group does not exceed a first predetermined threshold, where M and N are positive integers, and M≥N;

pair the N groups, wherein a distance metric between centers of the two paired groups is greater than a second predetermined threshold; and in a case where there is a group paired with a group to which a first UE for which scheduling is to be performed belongs, schedule transmission in different directions respectively for the first UE and a second UE from the paired group on same time-frequency resource.

In an exemplary embodiment, when M>N, said dividing the M UEs into the N groups includes:

initially dividing the M UEs into $N_0$ groups based on a distance metric between any two of the M UEs, where N0 is a positive integer, and N0≤N.

for each of the N0 groups, determining whether a distance metric between each UE in the group and an initial center of the group exceeds the first predetermined threshold, wherein the initial center of the group is obtained by averaging positions of the UEs in the group;

if there is a UE in the group whose distance metric from the initial center of the group exceeds the first predetermined threshold, subdividing the group into two groups based on the distance metric between any two of the UEs in the group;

for each of the two groups, determining, whether a distance metric between the UE in the group and the center of the group exceeds the first predetermined threshold;

if there is a UE in the group whose distance metric from the center of the group exceeds the first predetermined threshold, repeating the subdividing step; and if there is no UE in the group whose distance metric from the center of the group exceeds the first predetermined threshold, repeating the determining step for the next group, until there is no UE in any of the groups whose distance metric from the center of the group exceeds the first predetermined threshold; and obtaining the center of the group by averaging the positions of the UEs in the group.

In an exemplary embodiment, the distance metric is represented by distance, wherein the position of the UE is obtained by:

quantizing a 2π angle into W parts according to a Precoding Matrix Index 'PMI' reported by the UE, to obtain angles $0 \leq \varphi_0 < \varphi_1 < \ldots < \varphi_{W-1} \leq 2\pi$, corresponding to beamforming vectors $e(\varphi_0), e(\varphi_1), \ldots, e(\varphi_{W-1})$ respectively; and determining an angle φ at which the UE is located according to a formula given as:

$\varphi = \text{argmax}_{(\varphi_i)} \text{max-element}(e^H(\varphi_i)P)$ where P is a PMI matrix, max-element($e^H(\varphi_i)P$) denotes a maximum element in a vector $e^H(\varphi_i)P$, and argmax$_{\varphi i}$ denotes an angle $\varphi_i$ which makes max-element($e^H(\varphi_i)P$) maximum, where W is a positive integer, and i is an integer between 0 and (W−1); and calculating a distance between the UE and a base station based on a timing advance 'TA' of the UE.

In an exemplary embodiment, the distance metric is determined based on a distance and a beamforming gain, wherein the distance is associated with a path loss estimate, wherein said dividing the M UEs into the N groups includes: dividing the M UEs into the N groups based on $$\beta_{i0} = \frac{L_{i0}}{G_{i0}^{tx} G_{i0}^{rx}},$$

wherein the distance metric $\beta_{iO}$ between UEi in the group and the center G0 of the group does not exceed the first predetermined threshold, where Li0 denotes a path loss estimate from UEi to the center G0 of the group, $G_{iO}^{tx}$ denotes a beamforming gain of a transmit beam of UEi in a direction of G0 when the transmit beam of UEi is directed to the base station, $G_{iO}^{rx}$ denotes a beamforming gain of a receive beam of the center G0 of the group in a direction of UEi when the receive beam of the center G0 of the group is directed to the base station; and said pairing the N groups includes: pairing the N groups based on $$\beta_{mn} = \frac{L_{mn}}{G_{mn}^{tx} G_{mn}^{rx}},$$

wherein the distance metric $\beta_{mn}$ between centers $G_m$ and $G_n$ of any two paired groups is greater than the second predetermined threshold, where $L_{mn}$ denotes a path loss estimate of the center of $G_m$ the group to the center $G_n$ of the group, $G_{mn}^{tx}$ denotes a beamforming gain of a transmit beam of the center $G_m$ of the group in a direction of the center $G_n$ of the group when the transmit beam of the center $G_m$ of the group is directed to the base station, $G_{mn}^{rx}$ denotes a beamforming gain of a receive beam of the center $G_n$ of the group in a direction of the center $G_m$ of the group when the receive beam of the center $G^n$ of the group is directed to the base station, where i is a positive integer and not greater than M, and m and n are positive integers and not greater than N.

In an exemplary embodiment, said dividing the M UEs into the N groups includes: dividing the M UEs into the N groups based on $$\beta_{i0} = \frac{d_{i0}^\alpha}{e_t^H(\varphi_t)e_t(\varphi_{i0})e_r^H(\phi_{i0})e_r(\phi_r)},$$

wherein the distance metric $\beta_{iO}$ between UEi in the group and the center G0 of the group does not exceed the first predetermined threshold, where di0 denotes a distance from UEi to the center G0 of the group, α denotes a path loss exponent, $\varphi_t$ denotes a beamforming angle of the transmit beam of UEi in the direction of the center G0 of the group when the transmit beam of UEi is directed to the base station, $e_t^H(\varphi_t)$ denotes a conjugate transpose of a transmit beamforming vector $e_t(\varphi_t)$ of UEi in the direction of the center G0 of the group, $\phi_r$ denotes a beamforming angle of the receive beam of the center G0 of the group in the direction of UEi when the receive beam of the center G0 of the group is directed to the base station, $e_r(\phi_r)$ denotes a receive beamforming vector of the center G0 of the group in the direction of UEi, $\varphi_{iO}$ denotes an AOD (Angle of Departure) of UEi to the center G0 of the group, and $e_t(\varphi_{iO})$ denotes an AOD vector of UEi to the center G0 of the group, $\phi_{iO}$ denotes an AOA (Angle of Arrival) of UEi to the center G0 of the group, and $e_r^H(\phi_{iO})$ denotes a conjugate transpose of an AOA vector $e_r(\phi_{iO})$ of UEi to the center G0 of the group; and said pairing the N groups includes: pairing the N groups based on $$\beta_{mn} = \frac{d_{mn}^\alpha}{e_t^H(\varphi_t')e_t(\varphi_{mn}')e_r^H(\phi_{mn}')e_r(\phi_r')},$$

wherein the distance metric $\beta_{mn}$ between the Gm and Gn of any two paired groups is greater than the second predetermined threshold, wherein dmn denotes a distance from Gm to Gn, $\varphi_t'$ denotes a beamforming angle of the transmit beam of Gm in a direction of Gn when the transmit beam of Gm is directed to the base station, $e_t^H(\varphi_t')$ denotes a conjugate transpose of a transmit beamforming vector $e_t(\varphi_t')$ of the transmit beam of Gm in the direction of Gn, $\phi'^r$ denotes a beamforming angle of a receive beam of Gn in the direction of Gm when the receive beam of Gn is directed to the base station, $e_r(\phi_r')$ denotes a beamforming vector of the receive beam of Gn in the direction of Gm, $\varphi'_{mn}$ denotes an AOD of Gm to Gn, $e_t(\varphi'_{mn})$ denotes an AOD vector of Gm to Gn, $\phi'_{mn}$ denotes an AOA of Gm to Gn, and $e_r^H(\phi'_{mn})$ denotes a conjugate transpose of an AOA vector $e_r(\phi'_{mn})$ of Gm to Gn, where i, m and n are positive integers.

In an exemplary embodiment, when a number of transmit antennas of UEa is different from that of UEb, and/or a number of receive antennas of UEa is different from that of UEb, the distance metric between UEa and UEb is represented by $$\frac{\beta_{ab} + \beta_{ba}}{2}$$

where a and b are positive integers and not greater than M.

In an exemplary embodiment, when the distance metric βiO between UEi in the group and the center G0 of the group is calculated, it is assumed that numbers of transmit antennas and receive antennas of G0 are respectively equal to those of UEi; and when the distance metric βmn between Gm and Gn is calculated, it is assumed that numbers of transmit antennas and receive antennas of Gm and Gn are respectively equal to the numbers of transmit antennas and receive antennas of most of the UEs in their respective groups, then when the number of the transmit antennas of Gm is different from that of Gn, and/or the number of the receive antennas of Gm is different from that of Gn, the distance metric between Gm and Gn is represented by $$\frac{\beta_{mn} + \beta_{nm}}{2}.$$

In an exemplary embodiment, said scheduling the transmissions in different directions respectively for the first UE and the second UE from the paired group on the same time-frequency resource further includes:
pre-configuring a time slot to preferentially schedule an uplink transmission or a downlink transmission thereon;
selecting, based on a predetermined scheduling criterion, the first UE whose transmission traffic meets a transmission requirement of a direction of the preferentially scheduled transmission;
selecting, from the group paired with the group to which the first UE belongs, the second UE whose transmission traffic meets a transmission requirement in a different direction; and
scheduling the transmissions in different directions in the time slot respectively for the selected first UE and second UE.

In an exemplary embodiment, said scheduling the transmissions in different directions respectively for the first UE and the second UE from the paired group on the same time-frequency resource further includes:
determining the uplink UE and the downlink UE in a time slot based on a formula for a sum rate given as:

$R_d + \alpha R_u,$ where RD is a downlink rate of one of the first UE and the second UE in the time slot, RU is an uplink rate of the other of the first UE and the second UE in the time slot, and a is a weighting coefficient configured by a system for determining a ratio of the uplink rate in the time slot in said scheduling;
selecting, based on a predetermined scheduling criterion, the first UE and the second UE whose sum rate meets a transmission requirement; and
scheduling the transmissions in different directions in the time slot respectively for the selected first UE and second UE.

In an exemplary embodiment, the method further includes:
in a case of access by a new UE, sequentially determining whether a distance metric between the new UE and the center of each group exceeds the first predetermined threshold;
if there is a group for which a distance metric between its center and the new UE is smaller than the first predetermined threshold, assigning the new UE to the group;
if the distance metric between the new UE and the center of each group exceeds the first predetermined threshold, assigning the new UE to a new group.

In an exemplary embodiment, the instruction further cause the base station to update the group, which includes:
when a report is received from the UE, determining whether the distance metric between the reporting UE and the center of the group to which the reporting UE belongs exceeds the first predetermined threshold;
if the distance metric between the reporting UE and the center of the group to which the reporting UE belongs exceeds the first predetermined threshold, sequentially determining whether the distance metric between the reporting UE and the center of each of the remaining groups exceeds the first predetermined threshold;
if there is a group for which the distance metric between its center and the reporting UE is smaller than the first predetermined threshold, assigning the reporting UE into the group;
if the distance metric between the reporting UE and the center of each group exceeds the first predetermined threshold, assigning the reporting UE to a new group.

In an exemplary embodiment, the instruction further cause the base station to:
determine whether an RLF (Radio Link Failure) occurs for the UE, in response to a failure of data demodulation by the UE; and
if it is determined that the RLF occurs for the UE, perform a step of updating the group in a case where the UE reestablishes a RRC (Radio Resource Control) connection with a base station;
and performing the pairing and the scheduling based on the updated group.

In an exemplary embodiment, the instruction further cause the base station to:
if it is determined that the RLF does not occur for the UE, perform a rate adjustment according to whether the downlink transmission or the uplink transmission is preferentially scheduled in the current time slot, by:
if the downlink transmission is preferentially scheduled in the current time slot, reducing a transmission power of a UE which is scheduled for the uplink transmission by a predetermined amount, or stopping scheduling the uplink transmission; or
if the uplink transmission is preferentially scheduled in the current time slot, reducing a modulation order or a code rate of the downlink transmission, or stopping scheduling the downlink transmission.

In an exemplary embodiment, the instruction further cause the base station to:
if it is determined that the RLF does not occur for the UE, perform the step of updating the group for the UE;
if the updated group to which the UE belongs is the same group to which the UE originally belongs, perform rate adjustment according to whether the downlink transmission or the uplink transmission is preferentially scheduled in the current time slot, by:
if the downlink transmission is preferentially scheduled in the current time slot, reducing a transmission power of the UE which is scheduled for the uplink transmission by a predetermined amount according to an SINR (Signal to Interference plus Noise Ratio) reported by the UE which is scheduled for the downlink transmission, or stopping scheduling the uplink transmission; or
if the uplink transmission is preferentially scheduled in the current time slot, reducing the modulation order or the code rate of the downlink transmission according to the SINR reported by the UE which is scheduled for the downlink transmission, or stopping scheduling the downlink transmission.

In an exemplary embodiment, the instructions further cause the base station to:
if the updated group to which the UE belongs is different from the group to which the UE originally belongs, performing the pairing and the scheduling based on the updated group.

In an exemplary embodiment, the instructions further cause the base station to: in a case where there is no group paired with the group to which the first UE for which scheduling is to be performed belongs, performing the scheduling based on the transmission traffic requirement from the first UE.

According to a fourth aspect of the present disclosure, a base station is provided. The base station includes: a processor; and a memory storing computer executable instructions that, when executed by the processor, cause the base station to perform any of the methods according to the first and second aspect of the present disclosure as described previously.

According to a fifth aspect of the present disclosure, a computer readable medium is provided. The computer readable medium having stored thereon instructions that, when executed by a processor, cause the processor to perform the methods according to the first and second aspects of the present disclosure as described previously.

The technical solutions of the present disclosure may effectively suppress the co-channel interference between the UEs in the cell while scheduling the uplink and the downlink data transmissions on the same time-frequency resource, thereby improving spectrum efficiency and throughput of the overall system.

Furthermore, in order to ensure reliable transmission of control information while improving the spectrum efficiency of the systems, the embodiments of the present disclosure propose a signal transmission method, a signal transmission device, and a storage medium.

According to a sixth aspect of the present disclosure, there is proposed a signal transmission method at a user equipment, the method comprising:

receiving configuration information of physical resources transmitted by a base station;

determining, according to the configuration information, physical resources for unidirectional transmission and physical resources for bidirectional transmission; and transmitting control information on the physical resources for unidirectional transmission, and transmitting data on the physical resources for unidirectional transmission and the physical resources for bidirectional transmission.

In some embodiments, configuration units of the physical resources for unidirectional transmission and the physical resources for bidirectional transmission are symbols and/or resource blocks in symbols.

In some embodiments, when the physical resources for unidirectional transmission comprise downlink physical resources and/or uplink physical resources, there are isolations between the downlink physical resources and respective successive uplink physical resources or respective successive physical resources for bidirectional transmission.

In some embodiments, when the physical resources for unidirectional transmission comprise downlink physical resources and/or uplink physical resources, if last one or more resources in a current time slot are physical resources for bidirectional transmission and first one or more resources in a next time slot are uplink physical resources, it is determined, according to the configuration information, that the last one or more resources in the current time slot are configured as isolations.

In the above embodiments, the isolations are guard periods or symbols having a cyclic prefix and a cyclic suffix.

In some embodiments, receiving configuration information of physical resources transmitted by a base station comprises one or more of:

receiving cell-specific Radio Resource Control (RRC) signaling or common Downlink Control Information (DCI) transmitted by the base station, wherein the cell-specific RRC signaling or common DCI comprises the configuration information;

receiving user equipment-group common RRC signaling transmitted by the base station, wherein the user equipment-group common RRC signaling comprises the configuration information; and receiving user equipment-specific RRC signaling or dedicated DCI transmitted by the base station, wherein the user equipment-specific RRC signaling or dedicated DCI comprises the configuration information.

In some embodiments, the physical resources for unidirectional transmission comprise downlink physical resources and/or uplink physical resources. If the user equipment receives a first DCI for allocating uplink transmission, uplink control information and/or data is transmitted on uplink physical resources in physical resources indicated by the first DCI, and uplink data is transmitted on physical resources for bidirectional transmission in the physical resources indicated by the first DCI and/or respective successive symbols for isolation purposes. If the user equipment receives a second DCI for allocating downlink transmission, downlink control information and/or data is received on downlink physical resources in physical resources indicated by the second DCI and/or respective successive symbols for isolation purposes, and downlink data is received on physical resources for bidirectional transmission in the physical resources indicated by the second DCI and/or respective successive symbols for isolation purposes. If the user equipment is capable of full-duplex communication and activates a full-duplex communication function, and receives the first DCI for allocating uplink transmission and the second DCI for allocating downlink transmission, and the first DCI and the second DCI indicate the same physical resources, the uplink control information and/or data is transmitted on the uplink physical resources in the physical resources indicated by the first DCI, the downlink control information and/or data is received on the downlink physical resources in the physical resources indicated by the second DCI and/or the respective successive symbols for isolation purposes, and the uplink data is transmitted and the downlink data is received on the physical resources for bidirectional transmission in the physical resources indicated by the first DCI and/or the second DCI and/or the respective successive symbols for isolation purposes.

In some embodiments, the physical resources for unidirectional transmission comprise downlink physical resources and/or uplink physical resources. If the user equipment is not capable of full-duplex communication or deactivates a full-duplex communication function, the user equipment detects a first DCI for uplink transmission and a second DCI for downlink transmission, and performs signal transmission according to indications of the first DCI and the second DCI; and if the user equipment is capable of full-duplex communication and activates the full-duplex communication function, the user equipment detects a third DCI for bidirectional transmission, and performs signal transmission according to an indication of the third DCI.

In some embodiments, the physical resources for unidirectional transmission comprise downlink physical resources and/or uplink physical resources. If the user equipment is not capable of full-duplex communication or deactivates a full-duplex communication function, in a case that a first DCI for allocating uplink transmission is detected, uplink control information and/or data is transmitted on uplink physical resources in physical resources indicated by the first DCI, and uplink data is transmitted on physical resources for bidirectional transmission in the physical resources indicated by the first DCI and/or respective successive symbols for isolation purposes, and in a case that a second DCI for allocating downlink transmission is detected, downlink control information and/or data is received on downlink physical resources in physical resources indicated by the second DCI and/or respective successive symbols for isolation purposes, and downlink data is received on physical resources for bidirectional transmission in the physical resources indicated by the second DCI and/or respective successive symbols for isolation purposes. If the user equipment is capable of full-duplex communication and activates the full-duplex communication function, in a case that a third DCI for allocating bidirectional transmission is detected, uplink control information and/or data is transmitted on physical resources for uplink transmission in physical resources indicated by the third DCI, and downlink control information and/or data is received on downlink physical resources for downlink transmission in the physical resources indicated by the third DCI and/or respective successive symbols for isolation purposes, and uplink data is transmitted and downlink data is received on physical resources for bidirectional transmission in the physical resources indicated by the third DCI and/or respective successive symbols for isolation purposes.

In some embodiments, the method further comprises:

if the user equipment is capable of full-duplex communication, transmitting, to the base station, signaling indicating whether to activate the full-duplex communication function.

In some embodiments, the method further comprises:

receiving, from the base station, an indication of allowing uplink control information to be transmitted on the physical resources for bidirectional transmission; and multiplexing, based on the indication, the uplink control information with uplink data, and transmitting the uplink control information and the uplink data on the physical resources for bidirectional transmission.

According to a seventh aspect of the present disclosure, there is proposed a signal transmission method at a base station, the method comprising:

generating configuration information of physical resources, wherein the configuration information indicates physical resources for unidirectional transmission and physical resources for bidirectional transmission, wherein the physical resources for unidirectional transmission are used for transmission of control information, and the physical resources for unidirectional transmission and the physical resources for bidirectional transmission are used for transmission of data; and transmitting the configuration information to the user equipment.

In some embodiments, configuration units of the physical resources for unidirectional transmission and the physical resources for bidirectional transmission are symbols and/or resource blocks in symbols.

In some embodiments, when the physical resources for unidirectional transmission comprise downlink physical resources and/or uplink physical resources, there are isolations between the downlink physical resources and respective successive uplink physical resources or respective successive physical resources for bidirectional transmission, and/or when the physical resources for unidirectional transmission comprise downlink physical resources and/or uplink physical resources, if last one or more resources in a current time slot are physical resources for bidirectional transmission and first one or more resources in a next time slot are uplink physical resources, the last one or more resources in the current time slot are configured as isolations.

In the above embodiments, the isolations are guard periods or symbols having a cyclic prefix and a cyclic suffix.

In some embodiments, transmitting the configuration information to the user equipment comprises one or more of:

transmitting, to the user equipment, cell-specific RRC signaling or common Downlink Control Information (DCI), wherein the cell-specific RRC signaling or common DCI comprises the configuration information;

transmitting, to the user equipment, user equipment-group common RRC signaling, wherein the user equipment-group common RRC signaling comprises the configuration information; and transmitting, to the user equipment, user equipment-specific RRC signaling or dedicated DCI, wherein the user equipment-specific RRC signaling or dedicated DCI comprises the configuration information.

In some embodiments, the method further comprises:

deciding resource allocation for a user according to signaling indicating whether to activate the full-duplex communication function, which is reported by the user equipment.

In some embodiments, the method further comprises:

indicating, to the user equipment, that uplink control information is allowed to be transmitted on the physical resources for bidirectional transmission.

According to an eighth aspect of the present disclosure, there is proposed a user equipment, the user equipment comprising:

a configuration information reception module configured to receive configuration information of physical resources transmitted by a base station;

a resource determination module configured to determine, according to the configuration information, physical resources for unidirectional transmission and physical resources for bidirectional transmission; and a transmission module configured to transmit control information on the physical resources for unidirectional transmission, and transmit data on the physical resources for unidirectional transmission and the physical resources for bidirectional transmission.

According to a ninth aspect of the present disclosure, there is proposed a base station, the base station comprising:

an information generation module configured to generate configuration information of physical resources, wherein the configuration information indicates physical resources for unidirectional transmission and physical resources for bidirectional transmission, wherein the physical resources for unidirectional transmission are used for transmission of control information, and the physical resources for unidirectional transmission and the physical resources for bidirectional transmission are used for transmission of data; and a configuration information transmission module configured to transmit the configuration information to the user equipment.

According to a tenth aspect of the present disclosure, there is proposed a user equipment, comprising:

a processing unit; and a storage unit having stored thereon machine readable instructions which, when executed by the processing unit, configure the processing unit to perform the method according to the sixth aspect described above.

According to an eleventh aspect of the present disclosure, there is proposed a base station, comprising:

a processing unit; and a storage unit having stored thereon machine readable instructions which, when executed by the processing unit, configure the processing unit to perform the method according to the seventh aspect described above.

According to a twelfth aspect of the present disclosure, there is proposed a computer readable storage medium having stored thereon executable instructions which, when executed by a processor, cause the processor to perform any of the methods according to the sixth and seventh aspect described above.

These embodiments of the present disclosure ensure reliable transmission of control information while further improving the spectrum efficiency of the systems by reasonably allocating time-frequency resources for unidirectional transmission and bidirectional transmission.

According to the ITU (International Telecommunication Union), the global mobile data traffic per month will reach 62 EBs (Exa Bytes, 1 EB=$2^{30}$ GB) by 2020, and the global mobile data traffic will be increased at a rate of about 55% per year from 2020 to 2030. In addition, proportions of video traffic and machine to machine communication traffic in the mobile data traffic will gradually increase. In 2030, the video traffic will be six times of non-video traffic, while the machine to machine communication traffic will account for about 12% of the mobile data traffic (c.f., "IMT Traffic Estimates For The Years 2020 To 2030, Report ITU-R M.2370-0").

The rapid growth of the mobile data traffic, especially an exponential growth of high-definition video and ultra-high-definition video traffic, imposes a higher requirement on the transmission rate of wireless communications. In order to meet the increasing demand on the mobile traffic, people need to propose new technologies based on 4G or 5G to further improve the transmission rate and throughput of wireless communication systems. Full-duplex technology may further improve spectrum utilization on the existing systems. Unlike traditional half-duplex systems in which a time domain (time division duplexing, TDD) or a frequency domain (frequency division duplexing, FDD) orthogonal division is used for uplink and downlink, a full-duplex system allows an uplink and a downlink of a UE (user equipment) to be transmitted simultaneously in the time domain and the frequency domain. Therefore, the full-duplex system may theoretically achieve twice the throughput of the half-duplex system. However, performance of the full-duplex system may be affected by two main factors: first, since the uplink and the downlink are of co-time and co-frequency, a signal transmitted from a full-duplex device may generate a strong self-interference to a received signal, and the self-interference signal is even higher than a noise floor by more than 120 dB; second, since there are UEs that perform uplink and downlink transmissions coexisting on the same time-frequency resource, the UE performing the uplink transmission may generate co-channel interference for the UE performing the downlink transmission.

In order to cancel the self-interference signal, current solutions generally include three modules: a passive cancellation module, an analog cancellation module and a digital cancellation module. The passive cancellation module utilizes dual polarization or physical isolation of an antenna to cancel the self-interference, the analog cancellation module reconstructs and cancels an analog self-interface signal before digital-to-analog conversion, and the digital cancellation module reconstructs and cancels a digital self-interference signal after analog-to-digital conversion. A combination of these three modules may effectively reduce the self-interference signal. The existing solutions, as disclosed in the document "Full duplex radios, D. Bharadia, E. McMilin, S. Katti, 2013", may reduce the self-interference by more than 120 dB.

The co-channel interference of the UEs in a cell may be controlled by the base station by means of resource allocation and scheduling for the UEs. However, the existing solutions generally assume that the base station may obtain channel state information between the UEs. However, for an actual communication system, since the signals between the UEs are not synchronized and the overhead of the channel is greater when the number of the UEs is large, it is difficult for the base station to obtain the channel state information between the UEs. Therefore, the resource allocation and the scheduling for the UEs may be performed only based on some available information (for example, UE position information). In addition, the existing solutions fail to jointly consider uplink and downlink traffic requirements and fairness among the UEs performing the uplink and the downlink transmissions when uplink and downlink data transmissions are respectively scheduled for the UEs on the same time-frequency resource.

In addition, with the rapid growth of mobile data services, especially the rapid growth of high-definition video services and ultra-high-definition video services, higher demands are put on the transmission rate of wireless communications. In order to meet the growing demand for mobile services, new technologies are needed to further increase the throughput of wireless communication systems. Full-duplex systems have been proposed to meet throughput requirements. However, there is currently no resource allocation design, for example, frame structure design, of the full-duplex systems which are suitable for existing wireless communication systems.

In view of this, there is also a need for a technical solution to ensure reliable transmission of control information while improving the spectrum efficiency of the systems.

Hereinafter, a method of scheduling for a UE which is performed by a base station according to an exemplary embodiment of the present disclosure will be described in detail with reference to FIG. 1.

FIG. 1 schematically shows a flowchart of a method 100 of scheduling for a UE which is performed by a base station according to an exemplary embodiment of the present disclosure.

As shown in FIG. 1, the method 100 includes steps S101, S103 and S105.

In step S101, the base station divides a plurality of (e.g., M) UEs into several (e.g., N) groups such that a distance metric between each UE within a group and the center of the group does not exceed a first predetermined threshold. Here, M and N are positive integers, and M≥N.

A principle for grouping is to divide the UEs with a smaller distance metric into a group and to divide the UEs with a larger distance metric into different groups, and the distance metrics between the UEs in the same group and the center of this group do not exceed the first predetermined threshold, wherein the first predetermined threshold may be configured by the system. In this context, the center of the group is obtained by averaging the positions of all UEs in the group.

In an embodiment, when the number of the UEs is different from the number of the groups, i.e., when M>N, step S101 specifically includes:

initially dividing the M UEs into NO groups based on a distance metric between any two of the M UEs, where NO is a positive integer, and NO≤N. In the initial grouping, the principle for grouping is followed, in which the UEs with the smaller distance metric are divided into a group.

Preferably, the base station may divide the M UEs into the N0 groups using a clustering method, and a value of N0 may be determined according to the number of the UEs in the cell and a size of the cell. For example, we may select $$N0 = \frac{M}{3}.$$

The clustering method may include, but not limited to, e.g. a K-means clustering algorithm, a fuzzy C-means clustering algorithm, and the like.

Then, the following operations are performed for each of the N0 groups:

determining whether a distance metric between a UE in the group and an initial center of the group exceeds the first predetermined threshold, wherein an initial center of the group is obtained by averaging positions of all the UEs in the group;

if there is a UE in the group whose distance metric from the initial center of the group exceeds the first predetermined threshold, subdividing the group into two groups based on the distance metric between any two of the UEs in the group, e.g. using the clustering method;

similarly for each of the two groups, determining whether a distance metric between the UE in the group and the center of the group exceeds the first predetermined threshold;

if there is a UE in the group whose distance metric from the center of the group exceeds the first predetermined threshold, repeating the subdividing step;

if there is no UE in the group whose distance metric from the center of the group exceeds the first predetermined threshold, repeating the determining step for the next group, until there is no UE in any of the groups whose distance metric from the center of the group exceeds the first predetermined threshold; and obtaining the center of the group by averaging the positions of the UEs in the group.

After grouping the UEs in step S101, the method 100 proceeds to step S103, in which the base station pairs the N groups such that a distance metric between centers of the two paired groups is greater than a second predetermined threshold.

Next, the base station determines in step S105 whether there is a group paired with a group to which a UE (denoted as "UE1") for which scheduling is to be performed belongs.

If so ("Yes" from S105), the method 100 proceeds to step S107, in which the base station schedules transmissions in different directions respectively for UE1 and a UE (denoted as "UE2") from the paired group on the same time-frequency resource(s), e.g., scheduling the uplink transmission for UE1 and scheduling the downlink transmission for UE2 on the same time-frequency resource(s), or scheduling the downlink transmission for UE1 and scheduling the uplink transmission for UE2 on the same time-frequency resource(s).

In an embodiment, step S107 may further include:

pre-configuring a time slot to preferentially schedule an uplink transmission or a downlink transmission thereon; for example, a frame structure consisting of specific time slots may be pre-configured, as shown in FIG. 2; unlike e.g. an LTE and NR frame structure, each time slot in FIG. 2 may transmit uplink and downlink data simultaneously;

selecting, based on a predetermined scheduling criterion, the UE, i.e. UE1, whose transmission traffic meets a transmission requirement of a direction of the preferentially scheduled transmission; selecting, from the group paired with the group to which UE1 belongs, the UE, i.e., UE2, whose transmission traffic meets a transmission requirement in a different direction; and then scheduling the transmissions in different directions in the time slot respectively for the selected UE1 and UE2.

For example, the time slot only denoted as D in FIG. 2 denotes that the downlink transmission is preferentially scheduled at the time of scheduling, some UE, i.e., UE1, for which the downlink transmission is to be performed (also referred to as a downlink UE) is selected based on the predetermined scheduling criterion (e.g., a proportional fairness criterion or other scheduling criteria), then a group is selected to be paired with the group to which the downlink UE belongs, and then a UE, i.e., UE2, for which the uplink transmission is to be performed (also referred to as an uplink UE) is selected from the paired group based on the predetermined scheduling criterion (e.g., the proportional fairness criterion or other scheduling criteria); if there is no paired group, only the downlink transmission is scheduled for UE1 in the time slot.

Similarly, the time slot only denoted as U in FIG. 2 denotes that the uplink transmission is preferentially scheduled at the time of scheduling, some UE, i.e., UE1, for which the downlink transmission is to be performed is selected based on the predetermined scheduling criterion (e.g., the proportional fairness criterion or other scheduling criteria), then a group is selected to be paired with the group to which the uplink UE belongs, and then a UE, i.e., UE2, for which the downlink transmission is to be performed is selected from the paired group based on the predetermined scheduling criterion (e.g., the proportional fairness criterion or other scheduling criteria); if there is no paired group, only the uplink transmission is scheduled for UE1 in the time slot.

Here, the base station may indicate to the UE in a scheduling command whether it is to perform an uplink transmission or a downlink transmission.

In another embodiment, step S107 may further include:

determining the uplink UE and downlink UE in the time slot based on a weighted sum rate represented by a formula given as:

$$R_d + \alpha R_u,$$

where RD is a downlink rate of one of UE1 and UE2 in the time slot, RU is an uplink rate of the other of UE1 and UE2 in the time slot, and $\alpha$ is a weighting coefficient configured by a system for determining a ratio of the uplink rate in the time slot in the scheduling;

then, selecting, based on a predetermined scheduling criterion (e.g., the proportional fairness criterion or other scheduling criteria), the first UE, i.e., UE1, and the second UE, i.e., UE2, whose sum rate meets a transmission requirement; and scheduling the transmissions in different directions in the time slot respectively for the selected UE1 and UE2.

Similarly, the base station may indicate to the UE in the scheduling command whether it is to perform an uplink transmission or a downlink transmission.

If the base station determines in step S105 that there is no group paired with the group to which the UE (denoted as "UE1") for which the scheduling is to be performed belongs ("NO" from S105), the method 100 proceeds to step S109, in which the base station performs the scheduling only based on the transmission traffic requirement from UE1.

In an embodiment, the distance metric may be represented by a distance. Then, in step S101 of this embodiment, the base station may divide the M UEs into the N groups, wherein a distance between a UE in a group and the center of the group does not exceed the first predetermined threshold, for example, represented by dmax. In this embodiment, a particular principle for grouping is to divide the UEs with a relatively short distance into a group and to divide the UEs with a larger distance into different groups, and the distances between the UEs in the same group and the center of this group do not exceed dmax, wherein dmax may be configured by the system and is associated with a path loss. As known to those skilled in the art, the larger the path loss between two UEs is, the smaller the co-channel interference between the uplink transmission and the downlink transmission scheduled for the two UEs on the same time-frequency resource(s) will be.

In this embodiment, before step S101, the base station may obtain position information of the UE.

The base station may obtain the position information of the UE by:

calculating the position information of the UE using an estimated TA (Timing Advance) of the UE respectively combined with a SSB (Synchronization Signal Block) index selected by the UE, or a PMI (Precoding Matrix Index) reported by the user, or a CSI-RS (Channel State Information—Reference Signal) index; or calculating the position information of the UE based on an RSTD (Reference Signal Time Difference) reported by the UE, or enabling the UE to report the position information of the UE actively based on a positioning system (e.g., GPS).

Specifically, for a UE that has established an RRC connection, the base station first locates the UE, and may receive an optimal PMI, or an optimal SSB index, or an optimal CSI-RS index, or an RSTD the UE selects to report, or the position information based on the positioning system, such as GPS.

If the UE reports the PMI, the base station estimates a horizontal angle $\varphi$ at which the UE is located based on the PMI. A particular estimation method includes: assuming that the PMI reported by the UE is P, and the base station quantizes a $2\pi$ angle into W parts, to obtain angles $0 \leq \varphi_0 < \varphi_1 < \ldots < \varphi_{W-1} \leq 2\pi$, and beamforming vectors corresponding to these quantized angles $e(\varphi_0), e(\varphi_1), \ldots, e(\varphi_{W-1})$ respectively, a form of the vector is determined by a form of a base station antenna array, e.g., for a linear antenna array, $$e(\varphi_i) = \frac{1}{n_t}[1, \; e^{-j\pi\cos\varphi_i}, \; \ldots, \; e^{-j\pi(n_i-1)\cos\varphi_i}]^T,$$

where nt is the number of transmit antennas of the base station, then the anglean angle $\varphi$ at which the UE is located according to a formula given as:

$\varphi$=argmax$(\varphi_i)$max-element$(e^H(\varphi_i)P)$, where P is a PMI matrix, max-element$(e^H(\varphi_i)P)$ denotes a maximum element in a vector $e^H(\varphi_i)P$, and argmax$_{\varphi_i}$ denotes an angle $\varphi_i$ which makes max-element$(e^H(\varphi_i)P)$ maximum, where W is a positive integer, and i is an integer between 0 and (W−1).

The base station calculates a distance $\rho$ from the UE to the base station based on the TA of the UE, wherein the distance $\rho$ may be approximately expressed as $$\rho = \frac{TA}{2c},$$

where c is a speed of light, and TA is a timing advance of the UE estimated by the base station. Then, the position information of the UE is expressed as $(\rho, \varphi)$ in polar coordinates, which may be converted to rectangular coordinates $(x,y)=(\rho \cos(\varphi), \rho \sin(\varphi))$.

If the UE reports the measured optimal SSB index, and the SSB index is associated with a transmit beamforming direction of the base station, the base station determines, according to the SSB index, the transmit beamforming direction of the base station which corresponds to the UE, thereby determining the angle $\varphi$ at which the UE is located. Similarly, the base station determines the distance $\rho$ from the UE to the base station based on the TA of the UE, thereby determining the position information $(\rho,\varphi)$ of the UE, or equivalently, $(x,y)=(\rho \cos(\varphi), \rho \sin(\varphi))$.

If the UE reports the RSTD, the base station calculates the position information (x, y) of the UE according to position information of a plurality of base stations. The corresponding calculating method may refer to the OTDOA (Observation Time Difference Of Arrival)-based method in LTE.

If the UE reports its own position information directly, the base station may directly obtain the position information (x, y) of the UE.

In step S103 of this embodiment, the base station pairs the N groups such that the distance between the centers of the paired groups is greater than the second predetermined threshold, e.g., represented by dth, wherein dth is configured by the system, and is also associated with the path loss.

As previously mentioned, the center of the group is obtained by averaging the positions of all UEs in the group.

If the distance between the centers of two groups is greater than dth, these two groups may be paired with each other, otherwise these two groups cannot be paired with each other.

For example, referring to the example of FIG. 3, there are five groups in FIG. 3, wherein the distance between the centers of Group 1 and Group 2 is greater than dth, and thus Group 1 and Group 2 may be paired with each other; while the distance between the centers of Group 1 and Group 4 is smaller than dth, and thus Group 1 and Group 4 cannot be paired with each other; similarly, Group 1 and Group 3, Group 2 and Group 5, Group 3 and Group 5 may be paired with each other, while Group 4 cannot be paired with other groups.

A graph may be established in such a way that a group is taken as a vertex, if an edge may be established between two groups if they may be paired with each other; then a maximum match of the graph could be solved by a maximum matching algorithm of a bipartite graph, such as a Ford-Fulkerson algorithm or a Hungarian algorithm. A process of the algorithm will not be described in detail here. In the example of FIG. 3, the result of the maximum match may be that Group 1 and Group 2 match each other, Group 3 and Group 5 match each other, and Group 4 has no paired group since it is close to all other groups.

After the grouping and the pairing are completed, the base station performs step S105 as described above, and in the case of "YES" from S105, step S107 is performed as previously described, and in the case of "NO" from S105, step S109 is performed as previously described, and details are not described herein again.

In another embodiment, the distance metric may be determined based on a distance and a beamforming gain, wherein the distance is associated with a path loss estimate. That is, when the UE has a plurality of antennas, the beamforming gain of the UE may be considered in addition to the distance of the UE, for grouping the UE.

In an implementation of this embodiment, the distance metric between UEi and UEj may be calculated by a formula (1) given as:

$$\beta_{ij} = \frac{L_{ij}}{G_{ij}^{tx} G_{ij}^{rx}} \quad (1)$$

where Lij denotes a path loss estimate from UEi to UEj; $G_{ij}^{tx}$ denotes a beamforming gain of a transmit beam of UEi with respect to UEj when the transmit beam of UEi is directed to the base station, which may be determined according to positions of UEi and UEj, and the number of transmit antennas of UEi; and $G_{ij}^{rx}$ denotes a beamforming gain of a receive beam of UEi with respect to UEj when the receive beam of UEj is directed to the base station, which may be determined according to the positions of UEi and UEj, and the number of receive antennas of UEj, where i and j are positive integers and not greater than M.

It should be noted that when the number of the transmit antennas of UEi is different from that of UEj, and/or the number of the receive antennas of UEi is different from that of UEj, values of $\beta_{ij}$ and $\beta_{ji}$ may be different from each other. Here, the distance metric between UEi and UEj is represented by $$\frac{\beta_{ij} + \beta_{ji}}{2}.$$

As mentioned previously, the center of the group is the average of the positions of all UEs in the group. When calculating the distance metric between the UE in the group and the center of the group, it is assumed that the number of transmit antennas and the number of receive antennas of the center of the group are respectively equal to the number of the transmit antennas and the number of the receive antennas of the UE. Thus, the beamforming gain of a transmit beam of the center of the group may be determined according to the center of the group and the position of the UE as well as the number of the transmit antennas of the center of the group, and the beamforming gain of a receive beam of the center of the group may be determined according to the center of the group and the position of the UE as well as the number of the receive antennas of the center of the group.

As such, in step S101 of the implementation, the base station may divide the M UEs into the N groups based on $$\beta_{i0} = \frac{L_{i0}}{G_{i0}^{tx} G_{i0}^{rx}},$$

wherein the distance metric $\beta_{iO}$ between UEi in the group and the center G0 of the group does not exceed the first predetermined threshold, where Li0 denotes a path loss estimate from UEi to the center G0 of the group, $G_{iO}^{tx}$ denotes a beamforming gain of a transmit beam of UEi in a direction of G0 when the transmit beam of UEi is directed to the base station, which may be determined according to the position of G0 and the position of UEi as well as the number of the transmit antennas of UEi, and the beamforming gain of a receive beam of the center G0 of the group may be determined according to the position of G0 and the position of UEi as well as the number of the receive antennas of G0.

In step S103 of the implementation, the base station may pair the N groups based on $$\beta_{mn} = \frac{L_{mn}}{G_{mn}^{tx} G_{mn}^{rx}},$$

wherein the distance metric $\beta_{mn}$ between centers $G_m$ and $G_n$ of any two paired groups is greater than the second predetermined threshold, where $L_{mn}$ denotes a path loss estimate of the center $G_m$ of the group to the center $G_n$ of the group, $G_{mn}^{tx}$ denotes a beamforming gain of a transmit beam of the center $G_m$ of the group in a direction of the center $G_n$ of the group when the transmit beam of the center $G_m$ of the group is directed to the base station, which may be determined according to the positions of Gm and Gn as well as the number of transmit antennas of Gm; and $G_{mn}^{rx}$ denotes a beamforming gain of a receive beam of the center $G_n$ of the group in a direction of the center $G_m$ of the group when the receive beam of the center $G_n$ of the group is directed to the base station, which may be determined according to the positions of Gm and Gn as well as the number of receive antennas of Gn, where i is a positive integer and not greater than M, and m, n are positive integers and not greater than N.

When the distance metric βmn between Gm and Gn is calculated, it is assumed that the number of the transmit antennas and the number of the receive antennas of Gm and Gn are respectively equal to the number of the transmit antennas and the number of the receive antennas of the most UEs in their respective groups, then when the number of the transmit antennas of Gm is different from that of Gn, and/or the number of the receive antennas of Gm is different from that of Gn, the distance metric between Gm and Gn is represented by $$\frac{\beta_{mn} + \beta_{nm}}{2}.$$

After the grouping and the pairing are completed, the base station performs step S105 as described above, and in the case of "YES" from S105, step S107 is performed as previously described, and in the case of "NO" from S105, step S109 is performed as previously described, and details are not described herein again.

In another implementation of the embodiment, the distance metric between $UE_i$ and $UE_j$ may also be calculated by a formula (2):

$$\beta_{ij} = \frac{d_{ij}^\alpha}{e_t^H(\varphi_r) e_r(\varphi_{ij}) e_r^H(\phi_{ij}) e_r(\phi_r)} \quad (2)$$

where dij denotes a distance from UEi to UEj, α denotes a path loss exponent, $\varphi_t$ denotes a beamforming angle of the transmit beam of UEi in the direction of UEj when the transmit beam of UEi is directed to the base station, $e_t^H(\varphi_t)$ denotes a conjugate transpose of a transmit beamforming vector $e_t(\varphi^t)$ of UEi in the direction of UEj, $\phi_r$ denotes a beamforming angle of the receive beam of UEj in the direction of UEi when the receive beam of UEj is directed to the base station, $e_r(\phi_r)$ denotes a receive beamforming vector of UEj in the direction of UEi, $\varphi_{ij}$ denotes an AOD of UEi to UEj, and $e_t(\varphi_{ij})$ denotes an AOD vector of UEi to UEj, $\phi_{ij}$ denotes an AOA of UEi to UEj, and $e_r^H(\phi_{ij})$ denotes a conjugate transpose of an AOA vector $e_r(\phi_{ij})$ of UEi to UEj.

The transmit beamforming vector $e_t(\varphi_t)$ is related to the form of the transmit antenna of UEi. For example, for the linear antenna array, $$e_t(\varphi_t) = \frac{1}{n_t}[1, e^{-j\pi\cos\phi_t}, \ldots, e^{-j\pi(n_t-1)\cos\phi_t}]^T,$$

where nt is the number of the transmit antennas of UEi.

The receive beamforming vector $e_r(\phi_r)$ is related to the form of the receive antenna of UEj. For example, for the linear antenna array, $$e_r(\phi_r) = \frac{1}{n_r}[1, e^{-j\pi\cos\phi_r}, \ldots, -e^{j\pi(n_r-1)\cos\phi_r}]^T,$$

where nr is the number of the receive antennas of UEj.

As shown in FIG. 4, $\varphi_t$ is the transmit beamforming direction when UEi performs the uplink data transmission, and may be calculated as $$\varphi_t = a\tan 2\left(\frac{-y_i}{-x_i}\right)$$

according to position information (xi yi) of UEi; $\phi_r$ is the receive beamforming direction when UEj performs the downlink data reception, and may be calculated as $$\phi_r = a\tan 2\left(\frac{-y_j}{-x_j}\right)$$

according to position information (xj, yj) of UEj; and the AOD of UEi to UEj represented by $\varphi_{ij}$ and the AOA of UEi to UEj represented by $\phi_{ij}$ may be calculated as $$\varphi_{ij} = a\tan 2\left(\frac{y_j - y_i}{x_j - x_i}\right) \text{ and } \phi_{ij} = a\tan 2\left(\frac{y_i - y_j}{x_i - x_j}\right)$$

respectively according to the position information of UEi and UEj.

It should be noted that when the number of the transmit antennas of UEi is different from that of UEj, and/or the number of the receive antennas of UEi is different from that of UEj, values of $\beta_{ij}$ and $\beta_{ji}$ may be different from each other. Here, the distance metric between UEi and UEj is represented by $$\frac{\beta_{ij} + \beta_{ji}}{2}.$$

As mentioned previously, the center of the group is the average of the positions of all UEs in the group. When calculating the distance metric between the UE in the group and the center of the group, it is assumed that the number of transmit antennas and the number of receive antennas of the center of the group are respectively equal to the number of the transmit antennas and the number of the receive antennas of the UE.

As such, in step S101 of the implementation, the base station may divide the M UEs into the N groups based on $$\beta_{i0} = \frac{d_{i0}^\alpha}{e_t^H(\varphi_t)e_t(\varphi_{i0})e_r^H(\phi_{i0})e_r(\phi_r)},$$

wherein the distance metric $\beta_{iO}$ between UEi in the group and the center G0 of the group does not exceed the first predetermined threshold, where di0 denotes a distance from UEi to the center G0 of the group, α denotes a path loss exponent, $\varphi_t$ denotes a beamforming angle of the transmit beam of UEi in the direction of the center G0 of the group when the transmit beam of UEi is directed to the base station, $e_t^H(\varphi_t)$ denotes a conjugate transpose of a transmit beamforming vector $e_t(\varphi_t)$ of UEi in the direction of the center G0 of the group, $\phi_r$ denotes a beamforming angle of the receive beam of the center G0 of the group in the direction of UEi when the receive beam of the center G0 of the group is directed to the base station, $e_r(\phi_r)$ denotes a receive beamforming vector of the center G0 of the group in the direction of UEi, $\varphi_{iO}$ denotes an AOD (Angle of Departure) of UEi to the center G0 of the group, and $e_t(\varphi_{iO})$ denotes an AOD vector of UEi to the center G0 of the group, $\phi_{iO}$ denotes an AOA (Angle of Arrival) of UEi to the center G0 of the group, and $e_r^H(\phi_{iO})$ denotes a conjugate transpose of an AOA vector $e_r(\phi_{iO})$ of UEi to the center G0 of the group.

The transmit beamforming vector $e_t(\phi_{iO})$ is related to the form of the transmit antenna of $UE_i$. For example, for the linear antenna array, $$e_t(\varphi_t) = \frac{1}{n_t}\left[1^{-j\pi\cos\phi_t}e, \ldots, e^{-j\pi(n_t-1)\cos\phi_t}\right]^t,$$

where nt is the number of the transmit antennas of UEi.

The receive beamforming vector $e_r(\phi_r)$ is related to the form of the receive antenna of G0. Here, the form of the receive antenna of G0 refers to the form of the receive antenna that the most UEs in this group have. For example, for the linear antenna array, $$e_r(\phi_r) = \frac{1}{n_r}[1, e^{-j\pi\cos\phi_r}, \ldots, e^{-j\pi(n_r-1)\cos\phi_r}]^T$$

where nr is the number of the receive antennas of G0, i.e. the number of the receive antennas of UEi.

If $\varphi_t$ is the transmit beamforming direction when UEi performs the uplink data transmission, it may be calculated as $$\varphi_t = \text{atan}2\left(\frac{-y_i}{-x_i}\right)$$

according to the position information (xi, yi) of UEi; if $\phi_r$ is the receive beamforming direction when G0 performs the downlink data reception, it may be calculated as $$\phi_r = \text{atan2}\left(\frac{-y_0}{-x_0}\right)$$

according to position information (x0, y0) of G0; and the AOD of UEi to G0 represented by $\varphi_{iO}$ and the AOA of UEi to G0 represented by $\phi_{iO}$ may be calculated as $$\varphi_{i0} = \text{atan2}\left(\frac{y_0 - y_i}{x_0 - x_i}\right) \text{ and } \phi_{i0} = \text{atan2}\left(\frac{y_i - y_0}{x_i - x_0}\right),$$

respectively according to the position information of UEi and G0.

In step S103 of the implementation, the base station may pair the N groups based on $$\beta_{mn} = \frac{d_{mn}^\alpha}{e_t^H(\varphi'_t)e_t(\varphi'_{mn})e_r^H(\phi'_{mn})e_r(\phi'_r)}$$

wherein the distance metric $\beta_{mn}$ between the Gm and Gn of any two paired groups is greater than the second predetermined threshold, wherein dmn denotes a distance from Gm to Gn, $\varphi'_t$ denotes a beamforming angle of the transmit beam of Gm in a direction of Gn when the transmit beam of Gm is directed to the base station, $e_t^H(\varphi'_t)$ denotes a conjugate transpose of a transmit beamforming vector $e_t(\varphi'_t)$ of the transmit beam of Gm in the direction of Gn, $\phi'_r$ denotes a beamforming angle of a receive beam of Gn in the direction of Gm when the receive beam of Gn is directed to the base station, $e_r(\phi'_r)$ denotes a beamforming vector of the receive beam of Gn in the direction of Gm, $\varphi'_{mn}$ denotes an AOD of Gm to Gn, $e_t(\varphi'_{mn})$ denotes an AOD vector of Gm to Gn, $\phi'_{mn}$ denotes an AOA of Gm to Gn, and $e_r^H(\phi'_{mn})$ denotes a conjugate transpose of an AOA vector $e_r(\phi'_{mn})$ of Gm to Gn.

When the distance metric $\beta_{mn}$ between Gm and Gn is calculated, it is assumed that the number of the transmit antennas and the number of the receive antennas of Gm and Gn are respectively equal to the number of the transmit antennas and the number of the receive antennas of the most UEs in their respective groups, then when the number of the transmit antennas of Gm is different from that of Gn, and/or the number of the receive antennas of Gm is different from that of Gn, the distance metric between Gm and Gn is represented by $$\frac{\beta_{mn} + \beta_{nm}}{2}.$$

After the grouping and the pairing are completed, the base station performs step S105 as described above, and in the case of "YES" from S105, step S107 is performed as previously described, and in the case of "NO" from S105, step S109 is performed as previously described, and details are not described herein again.

The above embodiments are described for the case where the number of the UEs is different from the number of the groups (i.e., M>N). It should be understood that when the number of the UEs is equal to the number of the groups, i.e., M=N, each UE corresponds to one group. In fact, there is no need to group the UE at this time, and the operations on the group in step S103 and step S105 as described above are actually operations on the UE, and details thereof will not described herein repetitively for simplicity.

In an embodiment, in a case where there is a randomly accessing UE (new UE), the base station needs to initially group the new UE. FIG. 5 schematically shows a process of initially grouping the randomly accessing UE according to an exemplary embodiment of the present disclosure.

In S501, the base station transmits an initial access signal SSB to the UE.

In S502, the UE detects the downlink SSB signal, and determines an SSB index with the largest signal strength, i.e., the optimal SSB index. When the UE performs random access, the SSB index is associated with a preamble or an RACH time-frequency resource.

In S503, the UE transmits to the base station the preamble associated with the optimal SSB index or the preamble on the time domain resource associated with the optimal SSB index.

In S504, the base station determines the optimal SSB index selected by the UE and an optimal downlink beamforming direction of the base station based on the preamble or the RACH time-frequency resource selected by the UE, thereby determining the angle φ at which the UE is located; and then determines the distance ρ from the UE to the base station based on the estimated TA of the UE, thereby determining the position (φ, ρ) of the UE, or equivalently, (x,y)=(ρ cos(φ),ρ sin(φ)).

It should be noted that the estimation on the position of the UE in FIG. 5 is not limited to following step S504, and the base station may estimate the position of the UE based on the TA and the correspondence between the UE preamble or the RACH time-frequency resource and the SSB index at any time after the uplink preamble of the UE is obtained.

In S505, the base station transmits an RAR (Random Access Response) message to the UE.

In S506, the UE transmits an L2/L3 message to the base station.

In S507, the base station may initially group the UE (which will be described later in detail), or in the case where each UE corresponds to one group (i.e., there is no need to group the UE) as described previously, the base station may determine a UE paired with this UE, and perform corresponding scheduling.

In an embodiment where there is a new randomly accessing UE, the method 100 further includes:
  in a case where a new UE accesses, sequentially determining whether a distance metric between the new UE and the center of each group exceeds the first predetermined threshold;
  if there is a group for which a distance metric between its center and the new UE is smaller than the first predetermined threshold, assigning the new UE to the group;
  if the distance metric between the new UE and the center of each group exceeds the first predetermined threshold, assigning the new UE to a new group.

Hereinafter, a process of initially grouping a randomly accessing new UE in a case where the new UE occurs according to an exemplary embodiment of the present disclosure will be described below with reference to FIG. 6. In FIG. 6, the distance is taken as an example of the distance metric for ease of description. However, those skilled in the art will appreciate that the distance metric may also be determined based on the distance and the beamforming gain as described previously.

As shown in FIG. 6, the base station obtains position information of a new UE that completes random access in step S601.

In step S603, the base station calculates a distance metric between the new UE and the center of Group i (i=1, N).

If it is determined in step S605 that the distance between the new UE and the center of Group i is not greater than dmax ("YES" from S605) which is configured by the system, the new UE is assigned to Group i in step S613.

If it is determined in step S605 that the distance between the new UE and the center of Group i is greater than dmax ("NO" from S605), let i=i+1 in step S607; and if it is determined in step S609 that i≤N ("Yes" from S609), the process returns to step S603. The above steps are repeated for the next group. That is, for each group, it is sequentially determined whether the distance between the new UE and the center of the group is greater than dmax.

If it is determined that the distances between the new UE and the centers of all N groups are greater than dmax ("NO" from S609), the new UE is assigned to a new group in step S611, and is scheduled according to steps S103 to S107 as described above, which will not be described here in detail.

In an embodiment, for a UE that has established an RRC connection, the base station needs to update position related information (e.g., distance, beamforming gain, etc.) of the UE, and the update may be performed by periodic reporting of the UE, event-triggered periodic reporting, or event-triggered reporting, and particular reporting approaches may be configured by the base station and separately indicated to the UE. For example, the base station indicates a corresponding position information reporting approach to the UE according to a motion state of the UE, e.g., indicating the periodic reporting to the UE that is always in motion, indicating the event-triggered periodic reporting to the UE that is infrequent in motion, and indicating the event-triggered reporting to the UE that is relatively static. The information reported by the UE may be a PMI, or an optimal SSB index, or an optimal CSI-RS index, or an RSTD, or position information based on a positioning system such as GPS. If the UE reports the PMI or the optimal SSB index or the optimal CSI-RS index, the base station needs to estimate the TA further based on the uplink signal of the UE, thereby obtaining the position related information of the UE. After obtaining the position related information of the UE, the base station may calculate the distance metric for the grouping and the pairing as previously described.

In this embodiment, the method 100 further includes a process of updating the group, which specifically includes steps as follows:

when a report is received from the UE, determining whether the distance metric between the reporting UE and the center of the group to which the reporting UE belongs exceeds the first predetermined threshold;

if the distance metric between the reporting UE and the center of the group to which the reporting UE belongs exceeds the first predetermined threshold, sequentially determining whether the distance metric between the reporting UE and the center of each of the remaining groups exceeds the first predetermined threshold;

if there is a group in which the distance metric between its center and the reporting UE is smaller than the first predetermined threshold, assigning the reporting UE to the group;

if the distance metric between the reporting UE and the center of each group exceeds the first predetermined threshold, assigning the reporting UE to a new group.

After the process of updating the group is completed, the base station may perform the scheduling according to steps S103 to S109 as previously described, which will not be described here in detail.

When a failure of downlink UE data demodulation occurs, it may be caused by the fact that the quality of the UE data channel becomes deteriorated, or the position of the UE is changed, or the co-channel interference between the UEs is excessive due to inaccurate pairing of the UEs.

Therefore, the present disclosure further provides a method of scheduling transmissions in different directions respectively on the same time-frequency resource when the downlink UE data demodulation fails, wherein a first UE (i.e., a downlink UE) scheduled to perform a downlink transmission and a second UE (i.e., an uplink UE) scheduled to perform an uplink transmission respectively belong to two paired groups from a plurality of groups, a distance metric between any UE in each of the plurality of groups and the center of the group does not exceed a first predetermined threshold, and a distance metric between centers of the two paired groups is greater than a second predetermined threshold.

In an embodiment, in response to a failure of data demodulation by the first UE, the base station determines whether an RLF (Radio Link Failure) occurs for the first UE;

if the base station determines that the RLF occurs for the first UE, the base station performs a step of updating the group for the first UE in a case where the first UE reestablishes an RRC connection with the base station.

Specifically, the step of updating the group includes:

determining whether a distance metric between the first UE and the center of the group to which the first UE belongs exceeds the first predetermined threshold;

if the distance metric between the first UE and the center of the group to which the first UE belongs exceeds the first predetermined threshold, sequentially determining whether the distance metric between the first UE and the center of each of the remaining groups exceeds the first predetermined threshold;

if there is a group for which the distance metric between its center and the first UE is smaller than the first predetermined threshold, assigning the first UE to the group;

if the distance metric between the first UE and the center of each group exceeds the first predetermined threshold, assigning the first UE to a new group;

pairing the group to which the first UE belongs with another group, wherein the distance metric between the centers of the two paired groups is greater than the second predetermined threshold; and in a case where there is a group paired with the group to which the first UE belongs, scheduling the uplink transmission and the downlink transmission respectively for the first UE and a UE from the paired group for which the uplink transmission is to be performed on the same time-frequency resource.

In an implementation of this embodiment, if the base station determines that the RLF does not occur for the first UE, the base station performs a rate adjustment according to whether the downlink transmission or the uplink transmission is preferentially scheduled on the current time slot, by:

if the downlink transmission is preferentially scheduled on the current time slot, reducing a transmission power of the second UE by a predetermined amount, or stopping scheduling the uplink transmission;

if the uplink transmission is preferentially scheduled on the current time slot, reducing a modulation order or a code rate of the downlink transmission, or stopping scheduling the downlink transmission.

Hereinafter, a scheduling method 700 performed by a base station in an embodiment in which a failure of demodulation by a downlink UE (first UE) occurs will be described below with reference to FIG. 7.

In step S701, the base station determines whether an RLF occurs for the first UE in response to a failure of data demodulation by the first UE.

Specifically, when the UE fails to demodulate the data, the UE performs RLM (Radio Frequency Link Monitoring) based on the SSB or the CSI-RS, and reports the monitored result (that is, whether the RLF occurs) to the base station.

If it is determined that the RLF has occurred for the first UE ("Yes" from S701), the first UE re-establishes an RRC connection with the base station in step S703, and performs the step of updating the group in step S705, then performs steps S103 to S109 for the pairing and the scheduling based on the updated groups, which will not be described here in detail.

If it is determined that the RLF does not occur for the first UE ("NO" from S701), the base station determines in step S707 whether the current time slot is preferentially scheduled for downlink transmission or uplink transmission (for example, using the predetermined frame structure as previously described with reference to FIG. 2).

If it is determined that the downlink transmission is preferentially scheduled on the current time slot ("Yes" from S707), the transmission power of the UE (second UE) scheduled to perform the uplink transmission is reduced by a predetermined amount (for example, Δ dB, where Δ is configured by the system), or the uplink transmission is stopped to be scheduled in step S709.

If it is determined that the uplink transmission is preferentially scheduled on the current time slot ("NO" from S707), the modulation order or the code rate of the downlink transmission is reduced, or the downlink transmission is stopped to be scheduled in step S711.

In another implementation of this embodiment, if the base station determines that the RLF does not occur for the first UE, the base station performs the step of updating the group for the first UE;
  if the updated group to which the first UE belongs is the same group to which the first UE originally belongs, performing a rate adjustment according to whether the downlink transmission or the uplink transmission is preferentially scheduled on the current time slot, by:
  if the downlink transmission is preferentially scheduled on the current time slot, reducing a transmission power of the UE from the paired group for which the uplink transmission is to be performed by a predetermined amount according to a SINR reported by the first UE, or stopping scheduling the uplink transmission;
  if the uplink transmission is preferentially scheduled on the current time slot, reducing the modulation order or the code rate of the downlink transmission according to the SINR reported by the first UE, or stopping scheduling the downlink transmission.

In addition, if the updated group to which the first UE belongs is different from the group to which the first UE originally belongs, the updated group to which the first UE belongs is paired with another group, wherein the distance metric between the centers of the two paired groups is greater than the second predetermined threshold; and in a case where there is a group paired with the updated group to which the first UE belongs, the uplink transmission and the downlink transmission are scheduled respectively for the first UE and the UE from the paired group for which the uplink transmission is to be performed on the same time-frequency resource.

Hereinafter, a scheduling method 800 performed by a base station in another embodiment in which a failure of demodulation by a downlink UE occurs will be described below with reference to FIG. 8.

In step S801, the base station determines whether an RLF occurs for the first UE in response to a failure of data demodulation by the first UE.

Specifically, when the UE fails to demodulate the data, the UE performs RLM based on the SSB or the CSI-RS, and reports the monitored result (that is, whether the RLF occurs) to the base station.

If it is determined that the RLF has occurred for the first UE ("Yes" from S801), the first UE re-establishes an RRC connection with the base station in step S803, and performs the step of updating the group in step S805, then performs steps S103 to S109 for the pairing and the scheduling based on the updated groups, which will not be described here in detail.

If it is determined that the RLF does not occur for the first UE ("NO" from S801), the base station performs the step of updating the group for the first UE.

Next, the base station determines in step S809 whether the updated group to which the first UE belongs is the same group to which the first UE originally belongs.

If so ("Yes" from S809), the base station determines in step S811 whether the current time slot is preferentially scheduled for downlink transmission or uplink transmission (for example, using the predetermined frame structure as previously described with reference to FIG. 2).

If it is determined that the downlink transmission is preferentially scheduled on the current time slot ("Yes" from S811), the base station reduces a transmission power of the UE (i.e., the uplink UE) from the paired group for which the uplink transmission is to be performed by a predetermined amount according to a SINR reported by the first UE. Here, the SINR reported by the first UE may be measured according to the downlink DMRS or other reference signal(s). It should be noted that interference with the uplink UE also exists at the position of the downlink DMRS or other reference signal(s). For example, the transmission power may be reduced by Δ dB, where Δ may be calculated as a function of the SINR $\gamma_{SSB}$ measured based on the SSB and the SINR $\gamma_{DMRS}$ measured based on the DMRS according to a rule. For example, in order to guarantee that the SINR of the first UE (downlink UE) is not smaller than a certain threshold $\gamma_{th}$, $$\Delta \geq 10 \log\left(\frac{\frac{\gamma_{SSB}}{\gamma_{DMRS}}-1}{\frac{\gamma_{SSB}}{\gamma_{th}}-1}\right).$$

It should be noted that when the transmission power of the uplink UE is lower than a certain threshold $P_{th}^{U}$, in order to guarantee the minimum transmission power of the lowest transmission rate of the uplink UE, the data transmission of the uplink UE may not be configured on the current time-frequency resource, i.e., the uplink transmission may be stopped to be scheduled.

If the uplink transmission is preferentially scheduled on the current time slot ("No" from S811), the base station reduces the modulation order or the code rate of the downlink transmission according to the SINR reported by the first UE. Likewise, if the current SINR is smaller than the SINR that guarantees the lowest transmission rate requirement of the first UE, the data transmission of the first UE is not scheduled on the current time-frequency resource any more, i.e., the downlink transmission is stopped to be scheduled.

If the updated group to which the first UE belongs is different from the group to which the first UE originally belongs ("No" from S809), the base station pairs the updated group to which the first UE belongs with another group as described above, wherein the distance metric between the centers of the two paired groups is greater than the second predetermined threshold; and in a case where there is a group paired with the updated group to which the first UE belongs, the uplink transmission and the downlink transmission are scheduled respectively for the first UE and the UE from the paired group for which the uplink transmission is to be performed on the same time-frequency resource, which will not be described here in detail.

As described previously, in a case where there is no group paired with the group to which the first UE belongs, the base station schedules the downlink transmission for the first UE only.

Hereinafter, a structure of a base station according to an exemplary embodiment of the present disclosure will be described with reference to FIG. 9. FIG. 9 schematically shows a block diagram of a structure of a base station 900 according to an exemplary embodiment of the present disclosure. The base station 900 may be used to perform the method 100 described with reference to FIG. 1 or the processes described with reference to FIGS. 6-8.

As shown in FIG. 9, the base station 900 includes a processing unit or a processor 901, which may be a single unit or a combination of multiple units for performing different steps of the method; a memory 902 storing computer executable instructions which, when executed by the processor 901, cause the base station 900 to perform the method 100 described with reference to FIG. 1 or the processes described with reference to FIGS. 6-8. For the sake of brevity, only a schematic structure of the base station according to the exemplary embodiment of the present disclosure will be described herein, and details which have been described previously in the method 100 with reference to FIG. 1, in the process 600 described with reference to FIG. 6, in the process 700 described with reference to FIG. 7 and in the process 800 described with reference to FIG. 8 will thus be omitted.

In the exemplary embodiment of the base station 900 performing the method 100 when the instructions are executed by the processor 901, the instructions cause the base station 900 to:

divide M UEs into N groups, wherein a distance metric between each UE in a group and the center of the group does not exceed a first predetermined threshold, where M and N are positive integers, and M≥N;

pair the N groups, wherein a distance metric between centers of the two paired groups is greater than a second predetermined threshold; and in a case where there is a group paired with a group to which a first UE for which scheduling is to be performed belongs, schedule transmissions in different directions respectively for the first UE and a second UE from the paired group on a same time-frequency resource.

In an embodiment, when M>N, said dividing the M UEs into the N groups includes:

initially dividing the M UEs into N0 groups based on a distance metric between any two of the M UEs, where N0 is a positive integer, and N0≤N;

for each of the N0 groups, determining whether a distance metric between each UE in the group and an initial center of the group exceeds the first predetermined threshold, wherein the initial center of the group is obtained by averaging positions of the UEs in the group;

if there is a UE in the group whose distance metric from the initial center of the group exceeds the first predetermined threshold, subdividing the group into two groups based on the distance metric between any two of the UEs in the group;

for each of the two groups, determining whether a distance metric between the UE in the group and the center of the group exceeds the first predetermined threshold;

if there is a UE in the group whose distance metric from the center of the group exceeds the first predetermined threshold, repeating the subdividing step;

if there is no UE in the group whose distance metric from the center of the group exceeds the first predetermined threshold, repeating the determining step for the next group, until there is no UE in any of the groups whose distance metric from the center of the group exceeds the first predetermined threshold; and obtaining the center of the group by averaging the positions of the UEs in the group.

In an embodiment, the distance metric is represented by distance.

In this embodiment, the position of the UE is obtained by: quantizing a $2\pi$ angle into W parts, according to a Precoding Matrix Index 'PMI' reported by the UE, to obtain angles $0 \leq \varphi_0 < \varphi_1 < \ldots < \varphi_{W-1} \leq 2\pi$, corresponding to beamforming vectors $e(\varphi_0), e(\varphi_1), \ldots, e(\varphi_{W-1})$ respectively; and determining an angle $\varphi$ at which the UE is located according to a formula given as:

$$\varphi = \text{argmax}_{(\varphi_i)} \text{max-element}(e^H(\varphi_i)P),$$

where P is a PMI matrix max-element($e^H(\varphi_i)P$), denotes a maximum element in a vector, $e^H(\varphi_i)P$, and $\text{argmax}_{\varphi_i}$ denotes an angle $\varphi_i$ which makes max-element($e^H(\varphi_i)P$) maximum, where W is a positive integer, and i is an integer between 0 and (W−1); and calculating a distance between the UE and a base station based on a TA of the UE.

In another embodiment, the distance metric is determined based on a distance and a beamforming gain, wherein the distance is associated with a path loss estimate.

In this embodiment, said dividing the M UEs into the N groups includes: dividing the M UEs into the N groups based on $$\beta_{i0} = \frac{L_{i0}}{G_{i0}^{tx} G_{i0}^{rx}},$$

wherein the distance metric $\beta_{iO}$ between UEi in the group and the center G0 of the group does not exceed the first predetermined threshold, where Li0 denotes a path loss estimate from UEi to the center G0 of the group, $G_{iO}^{tx}$ denotes a beamforming gain of a transmit beam of UEi in a direction of G0 when the transmit beam of UEi is directed to the base station, $G_{iO}^{rx}$ denotes a beamforming gain of a receive beam of the center G0 of the group in a direction of UEi when the receive beam of the center G0 of the group is directed to the base station; and said pairing the N groups includes: pairing the N groups based on $$\beta_{mn} = \frac{L_{mn}}{G_{mn}^{tx} G_{mn}^{rx}},$$

wherein the distance metric $\beta_{mn}$ between centers $G_m$ and $G_n$ of any two paired groups is greater than the second predetermined threshold, where $L_{mn}$ denotes a path loss estimate of the center $G_m$ of the group to the center $G_n$ of the group, $G_{mn}^{tx}$ denotes a beamforming gain of a transmit beam of the center $G_m$ of the group in a direction of the center $G_n$ of the group when the transmit beam of the center $G_m$ of the group is directed to the base station, $G_{mn}^{rx}$ denotes a beamforming gain of a receive beam of the center $G_n$ of the group in a direction of the center $G_m$ of the group when the receive beam of the center $G_n$ of the group is directed to the base station, where i is a positive integer and not greater than M, and m and n are positive integers and not greater than N.

In another embodiment, said dividing the M UEs into the N groups includes: dividing the M UEs into the N groups based on $$\beta_{i0} = \frac{d_{i0}^{\alpha}}{e_t^H(\varphi_t)e_t(\varphi_{i0})e_r^H(\phi_{i0})e_r(\phi_r)},$$

wherein the distance metric $\beta_{iO}$ between UEi in the group and the center G0 of the group does not exceed the first predetermined threshold, where di0 denotes a distance from UEi to the center G0 of the group, α denotes a path loss exponent, $\phi_t$ denotes a beamforming angle of the transmit beam of UEi in the direction of the center G0 of the group when the transmit beam of UEi is directed to the base station, $e_t^H(\varphi_t)$ denotes a conjugate transpose of a transmit beamforming vector $e_t(\varphi_t)$ of UEi in the direction of the center G0 of the group, $\phi_r$ denotes a beamforming angle of the receive beam of the center G0 of the group in the direction of UEi when the receive beam of the center G0 of the group is directed to the base station, $e_r(\phi_r)$ denotes a receive beamforming vector of the center G0 of the group in the direction of UEi, $\varphi_{iO}$ denotes an AOD (Angle of Departure) of UEi to the center G0 of the group, and $e_t(\varphi_{iO})$ denotes an AOD vector of UEi to the center G0 of the group, $\phi_{iO}$ denotes an AOA (Angle of Arrival) of UEi to the center G0 of the group, and $e_r^H(\phi_{iO})$ denotes a conjugate transpose of an AOA vector $e_r(\phi_{iO})$ of UEi to the center G0 of the group; and said pairing the N groups includes: pairing the N groups based on $$\beta_{mn} = \frac{d_{mn}^{\alpha}}{e_t^H(\varphi_t')e_t(\varphi_{mn}')e_r^H(\phi_{mn}')e_r(\phi_r')},$$

wherein the distance metric $\beta_{mn}$ between the Gm and Gn of any two paired groups is greater than the second predetermined threshold, wherein dmn denotes a distance from Gm to Gn, $\varphi'_t$ denotes a beamforming angle of the transmit beam of Gm in a direction of Gn when the transmit beam of Gm is directed to the base station, $e_t^H(\varphi'_t)$ denotes a conjugate transpose of a transmit beamforming vector $e_t(\varphi'_t)$ of the transmit beam of Gm in the direction of Gn, $\phi'_r$ denotes a beamforming angle of a receive beam of Gn in the direction of Gm when the receive beam of Gn is directed to the base station, $e_r(\phi'_r)$ denotes a beamforming vector of the receive beam of Gn in the direction of Gm, $\varphi'_{mn}$ denotes an AOD of Gm to Gn, $e_t(\varphi'_{mn})$ denotes an AOD vector of Gm to Gn, $\phi'_{mn}$ denotes an AOA of Gm to Gn, and $e_r^H(\phi'_{mn})$ denotes a conjugate transpose of an AOA vector $e_r(\phi'_{mn})$ of Gm to Gn, where i, m and n are positive integers.

In an embodiment, when a number of transmit antennas of UEa is different from that of UEb, and/or a number of receive antennas of UEa is different from that of UEb, the distance metric between UEa and UEb is represented by $$\frac{\beta_{ab} + \beta_{ba}}{2}$$

where a and b are positive integers and not greater than M.

In an embodiment, when the distance metric $\beta_{iO}$ between UEi in the group and the center G0 of the group is calculated, it is assumed that numbers of transmit antennas and receive antennas of G0 are respectively equal to those of UEi; and when the distance metric $\beta_{mn}$ between Gm and Gn is calculated, it is assumed that numbers of transmit antennas and receive antennas of Gm and Gn are respectively equal to the numbers of transmit antennas and receive antennas of the most UEs in their respective groups, then when the number of the transmit antennas of Gm is different from that of Gn, and/or the number of the receive antennas of Gm is different from that of Gn, the distance metric between Gm and Gn is represented by $$\frac{\beta mn + \beta nm}{2}.$$

In an embodiment, said scheduling the transmissions in different directions respectively for the first UE and the second UE from the paired group on the same time-frequency resource further includes:

pre-configuring a time slot to preferentially schedule an uplink transmission or a downlink transmission thereon;

selecting, based on a predetermined scheduling criterion, the first UE whose transmission traffic meets a transmission requirement of a direction of the preferentially scheduled transmission;

selecting, from the group paired with the group to which the first UE belongs, the second UE whose transmission traffic requirement is a transmission requirement in a different direction;

and scheduling the transmissions in different directions in the time slot respectively for the selected first UE and second UE.

In an embodiment, said scheduling the transmissions in different directions respectively for the first UE and the second UE from the paired group on the same time-frequency resource further includes:

determining the uplink UE and downlink UE in a time slot based on a formula for a sum rate given as:

$$R_D + \alpha R_U$$

where RD is a downlink rate of one of the first UE and the second UE in the time slot, RU is an uplink rate of the other of the first UE and the second UE in the time slot, and α is a weighting coefficient configured by a system for determining a ratio of the uplink rate in the time slot in said scheduling;

selecting, based on a predetermined scheduling criterion, the first UE and the second UE whose sum rate meets a transmission requirement; and scheduling the transmissions in different directions in the time slot respectively for the selected first UE and second UE.

In an embodiment, the instructions further cause the base station 900 to:

in a case of access by a new UE, sequentially determine whether a distance metric between the new UE and the center of each group exceeds the first predetermined threshold;

if there occurs a group in which a distance metric between its center and the new UE is smaller than the first predetermined threshold, assign the new UE to the group;

if the distance metric between the new UE and the center of each group exceeds the first predetermined threshold, assign the new UE to a new group.

In an embodiment, the instructions further cause the base station 900 to update the group, which includes:

when a report is received from the UE, determining whether the distance metric between the reporting UE and the center of the group to which the reporting UE belongs exceeds the first predetermined threshold;

if the distance metric between the reporting UE and the center of the group to which the reporting UE belongs exceeds the first predetermined threshold, sequentially determining whether the distance metric between the reporting UE and the center of each of the remaining groups exceeds the first predetermined threshold;

if there is a group for which the distance metric between its center and the reporting UE is smaller than the first predetermined threshold, assigning the reporting UE to the group;

if the distance metric between the reporting UE and the center of each group exceeds the first predetermined threshold, assigning the reporting UE to a new group.

In an embodiment, the instructions further cause the base station 900 to:

determine whether an RLF (Radio Link Failure) occurs for the UE, in response to a failure of demodulating data by the UE;

if it is determined that the RLF occurs to the UE, perform a step of updating the group in a case where the UE reestablishes a RRC (Radio Resource Control) connection with the base station; and performing the pairing and the scheduling based on the updated group.

In an embodiment, the instructions further cause the base station to:

if it is determined that the RLF does not occur for the UE, perform a rate adjustment according to whether the downlink transmission or the uplink transmission is preferentially scheduled on the current time slot, by:

if the downlink transmission is preferentially scheduled on the current time slot, reducing a transmission power of a UE which is scheduled for the uplink transmission by a predetermined amount, or stopping scheduling the uplink transmission;

if the uplink transmission is preferentially scheduled on the current time slot, reducing a modulation order or a code rate of the downlink transmission, or stopping scheduling the downlink transmission.

In an embodiment, the instructions further cause the base station 900 to:

if it is determined that the RLF does not occur for the UE, perform the step of updating the group for the UE;

if the updated group to which the UE belongs is the same group to which the UE originally belongs, perform a rate adjustment according to whether the downlink transmission or the uplink transmission is preferentially scheduled on the current time slot, by:

if the downlink transmission is preferentially scheduled on the current time slot, reducing a transmission power of the UE which is scheduled for the uplink transmission by a predetermined amount according to a SINR reported by the UE which is scheduled for the downlink transmission, or stopping scheduling the uplink transmission;

if the uplink transmission is preferentially scheduled on the current time slot, reducing a modulation order or a code rate of the downlink transmission according to the SINR reported by the UE which is scheduled for the downlink transmission, or stopping scheduling the downlink transmission.

In an embodiment, the instructions further cause the base station 900 to:

if the updated group to which the UE belongs is different from the group to which the UE originally belongs, perform the pairing and the scheduling based on the updated group.

In an exemplary embodiment, the instructions further cause the base station 900 to:

in a case where there is no group paired with the group to which the first UE for which the scheduling is to be performed belongs, schedule the downlink transmission for the first UE only.

In the exemplary embodiment of the base station 900 performing the method 700 when the instructions are executed by the processor 901, the instructions cause the base station 900 to perform a process of scheduling transmissions in different directions respectively on a same time-frequency resource is provided, wherein a first UE scheduled to perform a downlink transmission and a second UE scheduled to perform an uplink transmission respectively belong to two paired groups from a plurality of groups, a distance metric between any UE in each of the plurality of groups and the center of the group does not exceed a first predetermined threshold, and a distance metric between centers of the two paired groups is greater than a second predetermined threshold. The process includes:

determining whether an RLF occurs for the first UE, in response to a failure of data demodulation by the first UE;

if it is determined that the RLF occurs for the first UE, performing a step of updating the group for the first UE in a case where the first UE reestablishes an RRC connection with the base station.

In an embodiment, the instructions further cause the base station 900 to perform said step of updating the group particularly cause the base station 900 to determine whether a distance metric between the first UE and the center of the group to which the first UE belongs exceeds the first predetermined threshold; if the distance metric between the first UE and the center of the group to which the first UE belongs exceeds the first predetermined threshold, sequentially determine whether the distance metric between the first UE and the center of each of the remaining groups exceeds the first predetermined threshold; if there is a group for which the distance metric between its center and the first UE is smaller than the first predetermined threshold, assign the first UE to the group; if the distance metric between the first UE and the center of each group exceeds the first predetermined threshold, assign the first UE to a new group;

pair the group to which the first UE belongs with another group, wherein the distance metric between the centers of the two paired groups is greater than the second predetermined threshold; and in a case where there is a group paired with the group to which the first UE belongs, schedule the uplink transmission and the downlink transmission respectively for the first UE and a UE from the paired group for which the uplink transmission is to be performed on the same time-frequency resource.

In an embodiment, the instructions further cause the base station 900 to: if it is determined that the RLF does not occur for the first UE, perform a rate adjustment according to whether the downlink transmission or the uplink transmission is preferentially scheduled on the current time slot, by:

if the downlink transmission is preferentially scheduled on the current time slot, reducing a transmission power of the second UE by a predetermined amount, or stopping scheduling the uplink transmission;

if the uplink transmission is preferentially scheduled on the current time slot, reducing a modulation order or a code rate of the downlink transmission, or stopping scheduling the downlink transmission.

In an embodiment, the instructions further cause the base station 900 to: in a case where there is no group paired with the group to which the first UE for which the scheduling is to be performed belongs, schedule the downlink transmission for the first UE only.

In the exemplary embodiment of the base station 900 performing the method 800 when the instructions are executed by the processor 901, the instructions cause the base station 900 to perform a process of scheduling transmissions in different directions respectively on a same time-frequency resource is provided, wherein a first UE scheduled to perform a downlink transmission and a second UE scheduled to perform an uplink transmission respectively belong to two paired groups from a plurality of groups, a distance metric between any UE in each of the plurality of groups and the center of the group does not exceed a first predetermined threshold, and a distance metric between centers of the two paired groups is greater than a second predetermined threshold. The process includes:

determining whether an RLF occurs for the first UE, in response to a failure of data demodulation by the first UE;

if it is determined that the RLF occurs for the first UE, performing a step of updating the group for the first UE in a case where the first UE reestablishes an RRC connection with the base station.

In an embodiment, the instructions further cause the base station 900 to perform said step of updating the group particularly cause the base station 900 to determine whether a distance metric between the first UE and the center of the group to which the first UE belongs exceeds the first predetermined threshold; if the distance metric between the first UE and the center of the group to which the first UE belongs exceeds the first predetermined threshold, sequentially determine whether the distance metric between the first UE and the center of each of the remaining groups exceeds the first predetermined threshold; if there is a group for which the distance metric between its center and the first UE is smaller than the first predetermined threshold, assign the first UE to the group; if the distance metric between the first UE and the center of each group exceeds the first predetermined threshold, assign the first UE to a new group; pair the group to which the first UE belongs with another group, wherein the distance metric between the centers of the two paired groups is greater than the second predetermined threshold; and in a case where there is a group paired with the group to which the first UE belongs, schedule the uplink transmission and the downlink transmission respectively for the first UE and a UE from the paired group for which the uplink transmission is to be performed on the same time-frequency resource.

In an embodiment, the instructions further cause the base station 900 to: if it is determined that the RLF does not occur for the first UE, perform the step of updating the group for the first UE;

if the updated group to which the first UE belongs is the same group to which the first UE originally belongs, perform a rate adjustment according to whether the downlink transmission or the uplink transmission is preferentially scheduled on the current time slot, by:

if the downlink transmission is preferentially scheduled on the current time slot, reducing a transmission power of the UE from the paired group for which the uplink transmission is to be performed by a predetermined amount according to a SINR reported by the first UE, or stopping scheduling the uplink transmission;

if the uplink transmission is preferentially scheduled on the current time slot, reducing a modulation order or a code rate of the downlink transmission according to the SINR reported by the first UE, or stopping scheduling the downlink transmission.

In an embodiment, the instructions further cause the base station 900 to: if the updated group to which the first UE belongs is different from the group to which the first UE originally belongs, pair the updated group to which the first UE belongs with another group, wherein the distance metric between the centers of the two paired groups is greater than the second predetermined threshold; and in a case where there is a group paired with the updated group to which the first UE belongs, schedule the uplink transmission and the downlink transmission respectively for the first UE and the UE from the paired group for which the uplink transmission is to be performed on the same time-frequency resource.

In an embodiment, the instructions further cause the base station 900 to: in a case where there is no group paired with the group to which the first UE belongs, schedule the downlink transmission for the first UE only.

The above embodiments of the present disclosure may effectively suppress the co-channel interference between the UEs in the cell while scheduling the uplink and the downlink data transmissions on the same time-frequency resource, thereby improving spectrum efficiency and throughput of the overall system.

Full-duplex technology can further improve spectrum utilization of existing systems. Unlike the conventional half-duplex systems which use time domain quad-division (Time Division Duplexing (TDD)) or frequency domain quad-division (Frequency Division Duplexing (FDD)) in uplink and downlink, full-duplex systems allow users' uplink and downlink to be transmitted simultaneously on the same time-frequency resources. Therefore, a rate of the full-duplex systems may theoretically achieve twice that of the half-duplex systems. In order to support the full-duplex technology, it is necessary to design a corresponding frame structure. There are mainly two types of frame structures of the existing half-duplex systems, that is, a frequency division duplex frame structure and a time division duplex frame structure. FIG. 10 illustrates a schematic diagram of a frequency division duplex frame structure, and FIG. 11 illustrates a schematic diagram of a time division duplex frame structure.

As shown in FIG. 10, in the frequency division duplex frame structure, one radio frame is 10 ms in length, and consists of 10 sub-frames; and each of the sub-frames is 1ms in length, and consists of 2 time slots, wherein each of the time slots is 0.5 ms in length. Here, uplink and downlink are differentiated by using different frequency bands.

As shown in FIG. 11, in the time division duplex frame structure, similarly to the frequency division duplex frame structure, one radio frame is 10 ms in length, and consists of 10 sub-frames; and each of the sub-frames is 1 ms in length, and consists of 2 time slots, wherein each of the time slots is 0.5 ms in length. Unlike the frequency division duplex frame structure, there are special sub-frames in the frame structure, for example, sub-frame #1 and sub-frame #6 in FIG. 11, and each of the special sub-frames consists of a downlink part (DwPTS) and a guard period (GP), and an uplink part (UpPTS), and is used between a downlink sub-frame and an uplink sub-frame. Uplink and downlink of the frame structure are differentiated in the time domain by using different sub-frames.

However, both the frequency division duplex frame structure and the time division duplex frame structure support only unidirectional transmission, that is, either uplink transmission or downlink transmission, on the same time-frequency resources, but the full-duplex system needs to support bidirectional transmission, that is, simultaneous uplink transmission and downlink transmission, on the same time-frequency resources. Therefore, the frame structure of the half-duplex system is not suitable for the full-duplex system, and there is a need to design a new frame structure for the full-duplex system. In the design of the full-duplex system, the inventors of the present disclosure found that when the frame structure of the full-duplex system is designed, the unidirectional transmission cannot be simply changed into the bidirectional transmission since the bidirectional transmission may be affected by self-interference and intra-cell co-channel interference as compared with the unidirectional transmission, which may reduce the reliability of the transmission, and as a result, different reliability requirements of different types of information also need to be considered, for example, control information generally has higher reliability requirements than data information. Therefore, the new full-duplex system design ensures the reliable transmission of the control information while improving the spectral efficiency of the system.

To this end, the embodiments of the present application propose a signal transmission method at a user equipment, which, as shown in FIG. 12, comprises the following steps.

In step S1210, configuration information of physical resources transmitted by a base station is received.

In step S1220, physical resources for unidirectional transmission and physical resources for bidirectional transmission are determined according to the configuration information.

In step S1230, control information is transmitted on the physical resources for unidirectional transmission, and data is transmitted on the physical resources for unidirectional transmission and the physical resources for bidirectional transmission.

In some embodiments, the control information is transmitted only on the physical resources for unidirectional transmission, but cannot be transmitted on the physical resources for bidirectional transmission.

In some embodiments, configuration units of the physical resources for unidirectional transmission and the physical resources for bidirectional transmission are symbols and/or resource blocks in symbols.

In some embodiments, when the physical resources for unidirectional transmission comprise downlink physical resources and/or uplink physical resources, there are isolations between the downlink physical resources and respective successive uplink physical resources or respective successive physical resources for bidirectional transmission.

In some embodiments, when the physical resources for unidirectional transmission comprise downlink physical resources and/or uplink physical resources, if last one or more resources in a current time slot are physical resources for bidirectional transmission and first one or more resources in a next time slot are uplink physical resources, it is determined, according to the configuration information, that the last one or more resources in the current time slot are configured as isolations.

In the above embodiments, the isolations may be guard periods or symbols having a cyclic prefix and a cyclic suffix.

In some embodiments, receiving configuration information of physical resources transmitted by a base station comprises one or more of:

receiving cell-specific RRC signaling or common Downlink Control Information (DCI) transmitted by the base station, wherein the cell-specific RRC signaling or common DCI comprises the configuration information;

receiving user equipment-group common RRC signaling transmitted by the base station, wherein the user equipment-group common RRC signaling comprises the configuration information; and receiving user equipment-specific RRC signaling or dedicated DCI transmitted by the base station, wherein the user equipment-specific RRC signaling or dedicated DCI comprises the configuration information.

In some embodiments, the physical resources for unidirectional transmission comprise downlink physical resources and/or uplink physical resources. If the user equipment receives a first DCI for allocating uplink transmission, uplink control information and/or data is transmitted on uplink physical resources in physical resources indicated by the first DCI, and uplink data is transmitted on physical resources for bidirectional transmission in the physical resources indicated by the first DCI and/or respective successive symbols for isolation purposes. If the user equipment receives a second DCI for allocating downlink transmission, downlink control information and/or data is received on downlink physical resources in physical resources indicated by the second DCI and/or respective successive symbols for isolation purposes, and downlink data is received on physical resources for bidirectional transmission in the physical resources indicated by the second DCI and/or respective successive symbols for isolation purposes. If the user equipment is capable of full-duplex communication and activates a full-duplex communication function, and receives the first DCI for allocating uplink transmission and the second DCI for allocating downlink transmission, and the first DCI and the second DCI indicate the same physical resources, the uplink control information and/or data is transmitted on the uplink physical resources in the physical resources indicated by the first DCI, the downlink control information and/or data is received on the downlink physical resources in the physical resources indicated by the second DCI and/or the respective successive symbols for isolation purposes, and the uplink data is transmitted and the downlink data is received on the physical resources for bidirectional transmission in the physical resources indicated by the first DCI and/or the second DCI and/or the respective successive symbols for isolation purposes.

In some embodiments, the physical resources for unidirectional transmission comprise downlink physical resources and/or uplink physical resources. If the user equipment is not capable of full-duplex communication or deactivates a full-duplex communication function, the user equipment detects a first DCI for uplink transmission and a second DCI for downlink transmission, and performs signal transmission according to indications of the first DCI and the second DCI; and if the user equipment is capable of full-duplex communication and activates the full-duplex communication function, the user equipment detects a third DCI for bidirectional transmission, and performs signal transmission according to an indication of the third DCI.

In some embodiments, the physical resources for unidirectional transmission comprise downlink physical resources and/or uplink physical resources. If the user equipment is not capable of full-duplex communication or deactivates a full-duplex communication function, in a case that a first DCI for allocating uplink transmission is detected, uplink control information and/or data is transmitted on uplink physical resources in physical resources indicated by the first DCI, and uplink data is transmitted on physical resources for bidirectional transmission in the physical resources indicated by the first DCI and/or respective successive symbols for isolation purposes, and in a case that a second DCI for allocating downlink transmission is detected, downlink control information and/or data is received on downlink physical resources in physical resources indicated by the second DCI and/or respective successive symbols for isolation purposes, and downlink data is received on physical resources for bidirectional transmission in the physical resources indicated by the second DCI and/or respective successive symbols for isolation purposes. If the user equipment is capable of full-duplex communication and activates the full-duplex communication function, in a case that a third DCI for allocating bidirectional transmission is detected, uplink control information and/or data is transmitted on physical resources for uplink transmission in physical resources indicated by the third DCI, and downlink control information and/or data is received on downlink physical resources for downlink transmission in the physical resources indicated by the third DCI and/or respective successive symbols for isolation purposes, and uplink data is transmitted and downlink data is received on physical resources for bidirectional transmission in the physical resources indicated by the third DCI and/or respective successive symbols for isolation purposes.

In some embodiments, the method further comprises:

if the user equipment is capable of full-duplex communication, transmitting, to the base station, signaling indicating whether to activate the full-duplex communication function.

In some embodiments, the method further comprises:

receiving, from the base station, an indication of allowing uplink control information to be transmitted on the physical resources for bidirectional transmission; and multiplexing, based on the indication, the uplink control information with uplink data, and transmitting the uplink control information and the uplink data on the physical resources for bidirectional transmission.

To this end, the embodiments of the present application propose a UE. FIG. 13 illustrates a schematic diagram of a UE according to an embodiment of the present application. As shown in FIG. 13, the UE comprises a configuration information reception module 1310, a resource determination module 1320, and a transmission module 1330.

The configuration information reception module 1310 is configured to receive configuration information of physical resources transmitted by a base station.

The resource determination module 1320 is configured to determine physical resources for unidirectional transmission and physical resources for bidirectional transmission according to the configuration information.

The transmission module 1330 is configured to transmit control information on the physical resources for unidirectional transmission, and transmit data on the physical resources for unidirectional transmission and the physical resources for bidirectional transmission.

In some embodiments, the control information is transmitted only on the physical resources for unidirectional transmission, but cannot be transmitted on the physical resources for bidirectional transmission.

In some embodiments, configuration units of the physical resources for unidirectional transmission and the physical resources for bidirectional transmission are symbols and/or resource blocks in symbols.

In some embodiments, when the physical resources for unidirectional transmission comprise downlink physical resources and/or uplink physical resources, there are isolations between the downlink physical resources and respective successive uplink physical resources or respective successive physical resources for bidirectional transmission.

In some embodiments, the UE may further comprise an isolation determination module 1340, which may be configured to, when the physical resource for unidirectional transmission comprises downlink physical resources and/or uplink physical resources, if last one or more resources in a current time slot are physical resources for bidirectional transmission and first one or more resources in a next time slot are uplink physical resources, determine, according to the configuration information, that the last one or more resources in the current time slot are configured as isolations.

In the above embodiments, the isolations may be guard periods or symbols having a cyclic prefix and a cyclic suffix.

In some embodiments, the configuration information reception module 1310 may be configured to:

receive cell-specific RRC signaling or common Downlink Control Information (DCI) transmitted by the base station, wherein the cell-specific RRC signaling or common DCI comprises the configuration information;

receive user equipment-group common RRC signaling transmitted by the base station, wherein the user equipment-group common RRC signaling comprises the configuration information; and receive user equipment-specific RRC signaling or dedicated DCI transmitted by the base station, wherein the user equipment-specific RRC signaling or dedicated DCI comprises the configuration information.

In some embodiments, the physical resources for unidirectional transmission comprise downlink physical resources and/or uplink physical resources. If the configuration information reception module 1310 receives a first DCI for allocating uplink transmission, the transmission module 1330 transmits uplink control information and/or data on uplink physical resources in physical resources indicated by the first DCI, and transmits uplink data on physical resources for bidirectional transmission in the physical resources indicated by the first DCI and/or respective successive symbols for isolation purposes. If the configuration information reception module 1310 receives a second DCI for allocating downlink transmission, the transmission module 1330 receives downlink control information and/or data on downlink physical resources in physical resources indicated by the second DCI and/or respective successive symbols for isolation purposes, and receives downlink data on physical resources for bidirectional transmission in the physical resources indicated by the second DCI and/or respective successive symbols for isolation purposes. If the user equipment is capable of full-duplex communication and activates a full-duplex communication function, and the configuration information reception module 1310 receives the first DCI for allocating uplink transmission and the second DCI for allocating downlink transmission, and the first DCI and the second DCI indicate the same physical resources, the transmission module 1330 transmits the uplink control information and/or data on the uplink physical resources in the physical resources indicated by the first DCI, receives the downlink control information and/or data on the downlink physical resources in the physical resources indicated by the second DCI and/or the respective successive symbols for isolation purposes, and transmits the uplink data and receives the downlink data on the physical resources for bidirectional transmission in the physical resources indicated by the first DCI and/or the second DCI and/or the respective successive symbols for isolation purposes.

In some embodiments, the physical resources for unidirectional transmission comprise downlink physical resources and/or uplink physical resources. If the user equipment is not capable of full-duplex communication or deactivates a full-duplex communication function, the configuration information reception module 1310 detects a first DCI for uplink transmission and a second DCI for downlink transmission, and the transmission module 1330 performs signal transmission according to indications of the first DCI and the second DCI; and if the user equipment is capable of full-duplex communication and activates the full-duplex communication function, the configuration information reception module 1310 detects a third DCI for bidirectional transmission, and the transmission module 1330 performs signal transmission according to an indication of the third DCI.

In some embodiments, the physical resources for unidirectional transmission comprise downlink physical resources and/or uplink physical resources. If the user equipment is not capable of full-duplex communication or deactivates a full-duplex communication function, in a case that a first DCI for allocating uplink transmission is detected, the transmission module 1330 transmits uplink control information and/or data on uplink physical resources in physical resources indicated by the first DCI, and transmits uplink data on physical resources for bidirectional transmission in the physical resources indicated by the first DCI and/or respective successive symbols for isolation purposes, and in a case that a second DCI for allocating downlink transmission is detected, the transmission module 1330 receives downlink control information and/or data on downlink physical resources in physical resources indicated by the second DCI and/or respective successive symbols for isolation purposes, and receives downlink data on physical resources for bidirectional transmission in the physical resources indicated by the second DCI and/or respective successive symbols for isolation purposes. If the user equipment is capable of full-duplex communication and activates the full-duplex communication function, in a case that a third DCI for allocating bidirectional transmission is detected, the transmission module 1330 transmits uplink control information and/or data on physical resources for uplink transmission in physical resources indicated by the third DCI, and receives downlink control information and/or data on downlink physical resources for downlink transmission in the physical resources indicated by the third DCI and/or respective successive symbols for isolation purposes, and transmits uplink data and receives downlink data on physical resources for bidirectional transmission in the physical resources indicated by the third DCI and/or respective successive symbols for isolation purposes.

In some embodiments, the UE may further comprise a signaling transmission module configured to, if the user equipment is capable of full-duplex communication, transmit, to the base station, signaling indicating whether to activate the full-duplex communication function.

In some embodiments, the configuration information reception module 1310 may further be configured to: receive from the base station, an indication of allowing uplink control information to be transmitted on the physical resources for bidirectional transmission. The transmission module 1330 is configured to, multiplex, based on the indication, the uplink control information with uplink data, and transmit the uplink control information and the uplink data on the physical resources for bidirectional transmission.

The UE shown in FIG. 13 may further comprise a storage module 1350, configured to store data which needs to be used and/or data which is acquired when other modules in the UE perform processing and/or transceiving.

To this end, the embodiments of the present application propose a signal transmission method at a base station. As shown in FIG. 14, the method comprises the following steps.

In step S1410, configuration information of physical resources is generated, wherein the configuration information indicates physical resources for unidirectional transmission and physical resources for bidirectional transmission, wherein the physical resources for unidirectional transmission are used for transmission of control information, and the physical resources for unidirectional transmission and the physical resources for bidirectional transmission are used for transmission of data.

In step S1420, the configuration information is transmitted to the user equipment.

In some embodiments, configuration units of the physical resources for unidirectional transmission and the physical resources for bidirectional transmission are symbols and/or resource blocks in symbols.

In some embodiments, when the physical resources for unidirectional transmission comprise downlink physical resources and/or uplink physical resources, there are isolations between the downlink physical resources and respective successive uplink physical resources or respective successive physical resources for bidirectional transmission, and/or when the physical resources for unidirectional transmission comprise downlink physical resources and/or uplink physical resources, if last one or more resources in a current time slot are physical resources for bidirectional transmission and first one or more resources in a next time slot are uplink physical resources, the last one or more resources in the current time slot are configured as isolations.

In the above embodiments, the isolations are guard periods or symbols having a cyclic prefix and a cyclic suffix.

In some embodiments, transmitting the configuration information to the user equipment comprises one or more of:
transmitting, to the user equipment, cell-specific RRC signaling or common Downlink Control Information (DCI), wherein the cell-specific RRC signaling or common DCI comprises the configuration information;

transmitting, to the user equipment, user equipment-group common RRC signaling, wherein the user equipment-group common RRC signaling comprises the configuration information; and transmitting, to the user equipment, user equipment-specific RRC signaling or dedicated DCI, wherein the user equipment-specific RRC signaling or dedicated DCI comprises the configuration information.

In some embodiments, the method further comprises:

deciding resource allocation for a user according to signaling indicating whether to activate the full-duplex communication function, which is reported by the user equipment.

In some embodiments, the method further comprises:

indicating, to the user equipment, that uplink control information is allowed to be transmitted on the physical resources for bidirectional transmission.

The embodiments of the present application further propose a base station. FIG. 6 illustrates a schematic block diagram of a base station according to an embodiment of the present application. As shown in FIG. 15, the base station comprises a configuration information generation module 1510 and a configuration information transmission module 620.

The configuration information generation module 1510 is configured to generate configuration information of physical resources, wherein the configuration information indicates physical resources for unidirectional transmission and physical resources for bidirectional transmission, wherein the physical resources for unidirectional transmission are used for transmission of control information, and the physical resources for unidirectional transmission and the physical resources for bidirectional transmission are used for transmission of data.

The configuration information transmission module 1520 is configured to transmit the configuration information to the user equipment.

In some embodiments, configuration units of the physical resources for unidirectional transmission and the physical resources for bidirectional transmission are symbols and/or resource blocks in symbols.

In some embodiments, when the physical resources for unidirectional transmission comprise downlink physical resources and/or uplink physical resources, there are isolations between the downlink physical resources and respective successive uplink physical resources or respective successive physical resources for bidirectional transmission, and/or when the physical resources for unidirectional transmission comprise downlink physical resources and/or uplink physical resources, if last one or more resources in a current time slot are physical resources for bidirectional transmission and first one or more resources in a next time slot are uplink physical resources, the last one or more resources in the current time slot are configured as isolations.

In the above embodiments, the isolations are guard periods or symbols having a cyclic prefix and a cyclic suffix.

In some embodiments, the configuration information transmission module 620 may be configured to:

transmit, to the user equipment, cell-specific RRC signaling or common Downlink Control Information (DCI), wherein the cell-specific RRC signaling or common DCI comprises the configuration information;

transmit, to the user equipment, user equipment-group common RRC signaling, wherein the user equipment-group common RRC signaling comprises the configuration information; and transmit, to the user equipment, user equipment-specific RRC signaling or dedicated DCI, wherein the user equipment-specific RRC signaling or dedicated DCI comprises the configuration information.

In some embodiments, the configuration information generation module 610 may be configured to decide resource allocation for a user according to signaling indicating whether to activate the full-duplex communication function, which is reported by the user equipment.

In some embodiments, the configuration information transmission module 620 may be configured to indicate, to the user equipment, that uplink control information is allowed to be transmitted on the physical resources for bidirectional transmission.

The UE shown in FIG. 15 may further comprise a storage module 1530, configured to store data which needs to be used and/or data which is acquired when other modules in the UE perform processing and/or transceiving.

It should be illustrated that FIGS. 13 and 15 are schematic diagrams only for the convenience of understanding the technical solutions of the present application. The technical solutions of the present application are not limited by the structures shown in FIGS. 13 and 15. For example, in some implementations, the configuration information reception module 1310 and the transmission module 1330 in FIG. 13 may also be implemented by one transmission module or may also be implemented by more modules.

The technical solutions of the present application will be described in detail below according to specific examples. It is to be understood that the following specific implementations are merely examples for implementing the technical solutions of the present application, and should not be construed as limiting the technical solutions of the present application.

First Embodiment

FIG. 16 illustrates a schematic diagram of a frame structure according to the present embodiment.

As shown in FIG. 16, each frame in the frame structure consists of 10 time slots, and each of the time slots consists of 14 symbols. Here, each of the symbols may be configured as a downlink symbol, which is only used for downlink transmission, and is represented by D; or may be configured as an uplink symbol, which is only used for uplink transmission, and is represented by U; or may be configured as a full-duplex symbol, which may be used for simultaneous uplink transmission and downlink transmission, and is represented by F; or may be configured as a guard period symbol, which is not used for transmission, and is represented by G. In order to ensure that the downlink symbol is not interfered by an adjacent uplink symbol, a guard period symbol is added between the downlink symbol and the adjacent uplink symbol, and a guard period symbol is added between the downlink symbol and an adjacent full-duplex symbol, for example, there is one guard period symbol between a downlink symbol and a full-duplex symbol in FIG. 16. Preferably, one time slot may be configured, so that first few symbols are downlink symbols, intermediate symbols are full-duplex symbols, and last few symbols are uplink symbols, wherein there is a guard period symbol between each of the downlink symbols and an adjacent full-duplex symbol (if any). In addition, if last few symbols in a current time slot are full-duplex symbols or downlink symbols, and first few symbols in a next time slot are uplink symbols or full-duplex symbols, then last one or more symbols in the current time slot may be configured as guard period symbols.

Configuration of symbols in each time slot may be determined by the system, and may be notified to a user through control signaling. Specifically, there may be two types of content configuration manners for the control signaling. In a first content configuration manner, the system pre-defines some time slot symbol configuration schemes, and numbers the configuration schemes. For example, Table 1 lists some feasible configuration schemes which are numbered, and the base station notifies the user of numbers of the schemes through control signaling. It should be illustrated that Table 1 only lists some preferred configuration schemes, and other feasible schemes may also be included in the table. It should also be illustrated that in the symbol configuration schemes shown in Table 1, there is a guard period between each of downlink symbols and an adjacent full-duplex symbol (if any) and there is a guard period between each of the downlink symbols and an adjacent uplink symbol (if any), which is mainly used to protect information of the downlink symbol from inter-user interference caused by users' non-synchronization in a cell. If the cell has a relatively large radius or a problem of inter-cell non-synchronization is considered, the guard period may be appropriately increased and consists of a plurality of symbols. In a second content configuration manner, if the system does not have a predefined time slot symbol configuration scheme, the base station notifies the user of the frame structure by indicating, to the user, a configuration manner of each time slot in one frame. For example, in each time slot, first few symbols may be specified as downlink symbols, last few symbols may be specified as uplink symbols, intermediate symbols may be specified as full-duplex symbols, and there is one guard period symbol between each of the downlink symbols and an adjacent full-duplex symbol (if any). Then, for each time slot, the base station only needs to notify the user of a number of the downlink symbols and a number of the uplink symbols, and then the user may determine a configuration scheme of the time slot accordingly. In addition, when a symbol configuration scheme of one time slot is repeated within one frame, a period of the configuration scheme may also be notified to the user.

The base station may notify the user in the cell in the following three manners. In a first manner, the base station may notify the user that the same frame structure is configured for all users in the cell through cell-specific RRC signaling or common DCI. In a second manner, the base station may notify the user that the same frame structure is configured for some of the users in the cell through user equipment-group common RRC signaling. In a third manner, the base station may notify the user that different frame structures are configured for different users through user equipment-specific RRC signaling or dedicated DCI.

TABLE 1

Example of time slot symbol configuration schemes

| Numbers of formats | Numbers of time slot symbols | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | G | G | G | G | G | G | G | G | G | G | G | G | G | G |
| 4 | D | D | D | D | D | D | D | D | D | D | D | D | D | G |
| 5 | D | D | D | D | D | D | D | D | D | D | D | D | G | F |
| 5 | D | D | D | D | D | D | D | D | D | D | D | G | F | F |
| 6 | D | D | D | D | D | D | D | D | D | D | G | F | F | F |
| 7 | D | D | D | D | D | D | D | D | D | G | F | F | F | F |
| 8 | D | D | D | D | D | D | D | D | G | F | F | F | F | F |
| 9 | D | D | D | D | D | D | D | G | F | F | F | F | F | F |
| 10 | D | D | D | D | D | D | G | F | F | F | F | F | F | F |
| 11 | D | D | D | D | D | G | F | F | F | F | F | F | F | F |
| 12 | D | D | D | D | G | F | F | F | F | F | F | F | F | F |
| 13 | D | D | D | G | F | F | F | F | F | F | F | F | F | F |
| 14 | D | D | G | F | F | F | F | F | F | F | F | F | F | F |
| 15 | D | G | F | F | F | F | F | F | F | F | F | F | F | F |
| 16 | F | F | F | F | F | F | F | F | F | F | F | F | F | U |
| 17 | F | F | F | F | F | F | F | F | F | F | F | F | U | U |
| 18 | F | F | F | F | F | F | F | F | F | F | F | U | U | U |
| 19 | F | F | F | F | F | F | F | F | F | F | U | U | U | U |
| 20 | F | F | F | F | F | F | F | F | F | U | U | U | U | U |
| 21 | F | F | F | F | F | F | F | F | U | U | U | U | U | U |
| 22 | F | F | F | F | F | F | F | U | U | U | U | U | U | U |
| 23 | D | D | D | D | D | D | D | D | D | D | D | D | G | U |
| 24 | D | D | D | D | D | D | D | D | D | D | D | G | U | U |
| 25 | D | D | D | D | D | D | D | D | D | D | G | U | U | U |
| 26 | D | D | D | D | D | D | D | D | D | G | U | U | U | U |
| 27 | D | D | D | D | D | D | D | D | G | U | U | U | U | U |
| 28 | D | D | D | D | D | D | D | G | U | U | U | U | U | U |
| 29 | D | D | D | D | D | D | G | U | U | U | U | U | U | U |
| 30 | D | G | F | F | F | F | F | F | F | F | F | F | F | U |
| 31 | D | D | G | F | F | F | F | F | F | F | F | F | F | U |
| 32 | D | D | D | G | F | F | F | F | F | F | F | F | F | U |
| 33 | D | G | F | F | F | F | F | F | F | F | F | F | U | U |
| 34 | D | D | G | F | F | F | F | F | F | F | F | F | U | U |
| 35 | D | D | D | G | F | F | F | F | F | F | F | F | U | U |
| 36 | D | G | F | F | F | F | F | F | F | F | F | U | U | U |
| 37 | D | D | G | F | F | F | F | F | F | F | F | U | U | U |
| 38 | D | D | D | G | F | F | F | F | F | F | F | U | U | U |
| 39 | D | D | D | D | G | U | D | D | D | D | D | D | G | U |
| 40 | D | D | D | D | G | U | U | D | D | D | D | G | U | U |
| 41 | D | D | D | G | U | U | U | D | D | G | U | U | U | U |
| 42 | D | G | F | F | F | F | F | D | G | F | F | F | F | F |
| 43 | D | D | G | F | F | F | F | D | D | G | F | F | F | F |
| 44 | D | G | F | F | F | F | F | U | F | F | F | F | F | U |
| 45 | D | D | G | F | F | F | F | U | F | F | F | F | F | U |
| 46 | D | D | D | G | F | F | F | U | F | F | F | F | F | U |
| 47-255 | reserved | | | | | | | | | | | | | |

Since interferences on the full-duplex symbols are generally more serious than those on the downlink symbols or the uplink symbols, and control information has higher reliability requirements than data, in order to ensure reliable transmission of the control information, an information transmission rule is stipulated as follows: the control information is transmitted only on unidirectional symbols, that is, downlink control information is transmitted only on downlink symbols, and uplink control information is transmitted only on uplink symbols; and the data may be transmitted on uplink symbols, downlink symbols or full-duplex symbols. When there are both control information and data on unidirectional symbols, transmission of the control information is preferentially guaranteed. FIG. 17 is an example of the rule, in which there are 4 time slots. In a first time slot, downlink control information is transmitted only on downlink symbols, uplink control information is transmitted only on uplink symbols, and data is transmitted only on full-duplex symbols; in a second time slot, since all symbols are full-duplex symbols, only data is transmitted; in a third time slot, there are only downlink symbols and one guard period, which may transmit downlink control information and/or data, and in a fourth time slot, there are only uplink symbols, which may transmit uplink control information and/or data.

Based on the frame structure and the information transmission rule, a process for a user to perform initial access is as follows.

The user reads downlink synchronization information (which is transmitted on downlink symbols) to perform downlink synchronization, and acquires system-related information (which is transmitted on downlink symbols), such as a system bandwidth, a Physical Random Access Channel (PRACH) channel position etc.;

the user randomly selects a preamble, and transmits the preamble on a PRACH channel (which is transmitted on uplink symbols) allocated by the system; after detecting the preamble of the user, the base station feeds back information such as the detected preamble, Timing Advance (TA), and allocated uplink symbol resources etc. on downlink symbols; the user detects the information fed back by the base station, and transmits information such as a user ID on the allocated uplink symbols; after detecting the information such as the user ID etc., the base station transmits a user ID which successfully performs random access for conflict resolution; and if the user detects that his/her own ID successfully performs random access, the user feeds back an ACK on uplink symbols, and if the user does not detect that his/her own ID successfully performs random access, the random access procedure is restarted; and a user having a full-duplex communication capability reports information about whether to active a full-duplex communication function through, for example, Msg 3 in a random access process, or through, for example, Uplink Control Information (UCI) after completing random access, and the base station performs resource scheduling according to the information about whether to active the full-duplex communication function reported by the user. For a half-duplex user or for a full-duplex user who does not activate the full-duplex communication function, only unidirectional transmission is scheduled on the same time-frequency resources, and for a full-duplex user who activates the full-duplex communication function, bidirectional transmission is scheduled on the same time-frequency resources. In addition, the full-duplex user may report activation or deactivation of the full-duplex communication function to the base station through UCI according to his/her own needs.

Based on the frame structure and the information transmission rule, the user performs the transmission according to the allocated time-frequency resources and the time slot symbol configuration manners. Specifically, the transmission is performed according to Downlink Control Information (DCI) formats defined by the system in the following two manners.

If the system only defines different DCI formats for allocating downlink resources and allocating uplink resources, and there is no DCI format defined for allocating full-duplex resources, when the DCI for allocating downlink resources is detected, the user receives downlink control information and/or data on downlink symbols of the acquired time-frequency resources, and receives downlink data on full-duplex symbols of the acquired time-frequency resources; and when the DCI for allocating uplink resources is detected, the user transmits uplink control information and/or data on uplink symbols of the acquired time-frequency resources, and transmits uplink data on full-duplex symbols of the acquired time-frequency resources. When the user is capable of full-duplex communication and activates a full-duplex communication function, the base station not only transmits the DCI for allocating downlink resources, but also transmits the DCI for allocating uplink resources, and time-frequency resources allocated by the two DCIs are the same. In this case, the user receives downlink control information and/or data on downlink symbols, transmits uplink control information and/or data on uplink symbols, and transmits uplink data and downlink data on full-duplex symbols.

If the system defines different DCI formats for allocating downlink resources, allocating uplink resources, and allocating full-duplex resources, the user detects the different DCI formats according to whether the full-duplex communication function may be supported and whether activation of the full-duplex communication function has been reported to the base station. A half-duplex user and a full-duplex user who deactivates the full-duplex communication function only detect the DCIs for allocating downlink resources and allocating uplink resources, and do not detect the DCI for allocating full-duplex resources. If the DCI for allocating downlink resources is detected, downlink control information and/or data is received on the acquired downlink symbols, and downlink data is received on the acquired full-duplex symbols; and if the DCI for allocating uplink resources is detected, control information and/or data is transmitted on the acquired uplink symbols, and uplink data is transmitted on the acquired full-duplex symbols. A full-duplex user who activates the full-duplex communication function only detects the DCI for allocating full-duplex resources, and does not detect the DCI for allocating uplink resources and the DCI for allocating downlink resources. Downlink control information and/or data is received on downlink symbols of the acquired resources, uplink control information and/or data is transmitted on uplink symbols, and uplink data and downlink data are transmitted simultaneously on full-duplex symbols.

In addition, the base station may indicate, in the DCI, to the user whether the uplink control information is allowed to be transmitted on the full-duplex symbols. If allowed, the uplink control information of the user may be multiplexed with the data and then the multiplexed uplink control information and data are transmitted on the full-duplex symbols without waiting for the uplink symbols; otherwise, the user must transmit the uplink control information on the allocated uplink symbols. If there is no explicit indication in the DCI, the user only transmits the uplink control information on the uplink symbols by default.

Second Embodiment

In the present embodiment, another frame structure and corresponding information transmission rule and communication method are described.

In the present embodiment, a specific OFDM symbol having a cyclic suffix is defined. A sum of lengths of a cyclic prefix and the cyclic suffix of the symbol is the same as a length of a cyclic prefix of a normal downlink OFDM symbol, and a structure of the symbol is as shown in FIG. 18. Preferably, each of the lengths of the cyclic prefix and the cyclic suffix of the special symbol is a half of the length of the cyclic prefix of the normal OFDM symbol. Two special symbols are defined based on the special OFDM symbol. Only downlink transmission is performed on a first special symbol, and in the downlink, the symbol adopts the special OFDM symbol shown in FIG. 18, and is represented by S1; and both uplink transmission and downlink transmission may be performed simultaneously on a second special symbol, and in the downlink, the symbol adopts the special OFDM symbol shown in FIG. 18, and is represented by S2. In this case, the guard period symbol G in the first embodiment may be replaced with the special symbol S1 or S2. Specifically, a guard period symbol G between each of the downlink symbols in the time slot and an adjacent uplink symbol (if any) and a guard period symbol G between each of the downlink symbols in the time slot and an adjacent full-duplex symbol (if any) may be replaced with S1, and a last guard period symbol Gin the time slot may be replaced with S1 or S2. FIG. 19 illustrates an example, in which the special symbol S1 is used as a fourth symbol in a first time slot to separate downlink control from full-duplex data, and the special symbol S2 is used as a last symbol in a second time slot for protection.

Similarly, an information transmission rule is stipulated as follows: the control information is transmitted only on unidirectional symbols, that is, downlink control information is transmitted only on downlink symbols and/or the special symbol S1, and uplink control information is transmitted only on uplink symbols; and the data may be transmitted on uplink symbols, downlink symbols, the special symbol S1, the special symbol S2, and full-duplex symbols. When there are both control information and data transmitted on unidirectional symbols, transmission of the control information is preferentially guaranteed.

Based on the frame structure and the information transmission rule, a process for a user to perform initial access is the same as that in the first embodiment, and details thereof will not be described here again.

Based on the frame structure and the information transmission rule, the user performs the transmission according to the allocated time-frequency resources and the time slot symbol configuration manners. Similarly, the transmission is performed according to DCI formats defined by the system in the following two manners.

If the system only defines different DCI formats for allocating downlink resources and allocating uplink resources, and there is no DCI format defined for allocating full-duplex resources, when the DCI for allocating downlink resources is detected, the user receives downlink control information on downlink symbols and/or the special symbol S1 of the acquired time-frequency resources, and receives downlink data on downlink symbols and/or the special symbol S1 and/or the special symbol S2 and/or full-duplex symbols of the acquired time-frequency resources; and when the DCI for allocating uplink resources is detected, the user transmits uplink control information on uplink symbols of the acquired time-frequency resources, and transmits uplink data on uplink symbols and/or the special symbol S2 and/or full-duplex symbols of the acquired time-frequency resources. When the user is capable of full-duplex communication and activates a full-duplex communication function, the base station not only transmits the DCI for allocating downlink resources, but also transmits the DCI for allocating uplink resources, and time-frequency resources allocated by the two DCIs are the same. In this case, the user receives downlink control information and/or data on downlink symbols and/or the special symbol S1, transmits uplink control information and/or data on uplink symbols, and transmits uplink data and downlink data on full-duplex symbols and/or the special symbol S2.

If the system defines different DCI formats for allocating downlink resources, allocating uplink resources, and allocating full-duplex resources, the user detects the different DCI formats according to whether the full-duplex communication function may be supported and whether activation of the full-duplex communication function has been reported to the base station. A half-duplex user and a full-duplex user who deactivates the full-duplex communication function only detect the DCIs for allocating downlink resources and allocating uplink resources, and do not detect the DCI for allocating full-duplex resources. If the DCI for allocating downlink resources is detected, downlink control information and/or data is received on the acquired downlink symbols and/or the special symbol S1, and downlink data is received on the acquired full-duplex symbols and/or the special symbol S2; and if the DCI for allocating uplink resources is detected, control information and/or data is transmitted on the acquired uplink symbols, and uplink data is transmitted on the acquired full-duplex symbols and/or the special symbol S2. A full-duplex user who activates the full-duplex communication function only detects the DCI for allocating full-duplex resources, and does not detect the DCI for allocating uplink resources and the DCI for allocating downlink resources. Downlink control information and/or data is received on downlink symbols and/or the special symbol S1 of the acquired resources, uplink control information and/or data is transmitted on uplink symbols, and uplink data and downlink data are transmitted simultaneously on full-duplex symbols and/or the special symbol S2.

Similarly, the base station may indicate, in the DCI, to the user whether the uplink control information is allowed to be transmitted on the full-duplex symbols. A specific indication manner and a specific processing method of the user are the same as those in the first embodiment, and details thereof will not be described here again.

Third Embodiment

In the present embodiment, another frame structure and corresponding information transmission rule and communication method are described.

Similarly to the first embodiment, each frame in the frame structure consists of 10 time slots, and each of the time slots consists of 14 symbols. Unlike the first embodiment, different transmission directions may be configured for different frequency-domain resource blocks on the same symbol. As shown in FIG. 20, some resource blocks on the same symbol are unidirectional, and may be used for only uplink transmission or downlink transmission, and resource blocks for uplink transmission and resource blocks for downlink transmission are represented by U and D respectively; some resource blocks are bidirectional (full-duplex), and may be used for simultaneous uplink transmission and downlink transmission, and the resource blocks are represented by F; and some resource blocks are used as guard periods, which are not used for transmission of data, and the resource blocks are represented by G. There may be downlink resource blocks and/or uplink resource blocks and/or full-duplex resource blocks in one time slot.

The frame structure is notified to a user through control information. There may be two types of content configuration manners for the control information. In a first content configuration manner, some time slot configuration schemes are pre-defined and numbered, and the base station notifies the user of the numbers. In a second content configuration manner, time-frequency resources in each time slot are full-duplex resources by default, and then the user is notified of time-frequency positions and sizes of downlink resource blocks or uplink resource blocks through signaling. The base station may notify the user in the following manners: the base station may notify the user that the same frame structure is configured for all users in a cell through cell-specific RRC signaling or common DCI; the base station may notify the user that the same frame structure is configured for some of the users through user equipment-group common RRC signaling; and the base station may notify the user that different frame structures are configured for different users through user equipment-specific RRC signaling or DCI.

In order to ensure reliable transmission of the control information, it is stipulated that the control information is transmitted only on unidirectional time-frequency resource blocks, that is, downlink control information is transmitted only on downlink resource blocks, and uplink control information is transmitted only on uplink resource blocks; and the data may be transmitted on both unidirectional resource blocks and full-duplex resource blocks. For example, FIG. 20 illustrates four time slots, wherein in a first time slot, there are uplink resource blocks, downlink resource blocks and full-duplex resource blocks, in a second times lot, there are downlink resource blocks and full-duplex resource blocks, in a third time slot, there are uplink resource blocks and full-duplex resource blocks, and in a fourth time slot, there are only full-duplex resource blocks. In these four time slots, the control information is transmitted only on the unidirectional resource blocks, and the data is transmitted on the full-duplex resource blocks.

Based on the frame structure and the information transmission rule, a process for a user to perform initial access is as follows.

The user reads downlink synchronization information (which is transmitted on downlink resource blocks) to perform downlink synchronization, and acquires system-related information (which is transmitted on downlink resource blocks), such as a system bandwidth, a Physical Random Access Channel (PRACH) channel position etc.;

the user randomly selects a preamble, and transmits the preamble on an uplink PRACH channel (which is transmitted on uplink resource blocks) allocated by the system; after detecting the preamble of the user, the base station feeds back information such as the detected preamble, TA, and allocated uplink resource blocks etc. on downlink resource blocks; the user detects the information fed back by the base station, and transmits information such as a user ID on the allocated uplink resource blocks; after detecting the information such as the user ID etc., the base station transmits a user ID which successfully performs random access for conflict resolution; and if the user detects that his/her own ID successfully performs random access, the user feeds back an ACK on uplink resource blocks, and if the user does not detect that his/her own ID successfully performs random access, the random access procedure is restarted.

Based on the frame structure and the information transmission rule, the user performs the transmission according to the allocated time-frequency resources and the time slot resource block configuration manners. Similarly, the transmission is performed according to DCI formats defined by the system in the following two manners.

If the system only defines different DCI formats for allocating downlink resources and allocating uplink resources, and there is no DCI format defined for allocating full-duplex resources, when the DCI for allocating downlink resources is detected, the user receives downlink control information and/or data on downlink resource blocks of the acquired time-frequency resources, and receives downlink data on full-duplex resource blocks of the acquired time-frequency resources; and when the DCI for allocating uplink resources is detected, the user transmits uplink control information and/or data on uplink resource blocks of the acquired time-frequency resources, and transmits uplink data on full-duplex resource blocks of the acquired time-frequency resources. When the user is capable of full-duplex communication and activates a full-duplex communication function, the base station not only transmits the DCI for allocating downlink resources, but also transmits the DCI for allocating uplink resources, and time-frequency resources allocated by the two DCIs are the same. In this case, the user receives downlink control information and/or data on downlink resource blocks, transmits uplink control information and/or data on uplink resource blocks, and transmits uplink data and downlink data on full-duplex resource blocks.

If the system defines different DCI formats for allocating downlink resources, allocating uplink resources, and allocating full-duplex resources, the user detects the different DCI formats according to whether the full-duplex communication function may be supported and whether activation of the full-duplex communication function has been reported to the base station. A half-duplex user and a full-duplex user who deactivates the full-duplex communication function only detect the DCIs for allocating downlink resources and allocating uplink resources, and do not detect the DCI for allocating full-duplex resources. If the DCI for allocating downlink resources is detected, downlink control information and/or data is received on the acquired downlink resource blocks, and downlink data is received on the acquired full-duplex resource blocks; and if the DCI for allocating uplink resources is detected, control information and/or data is transmitted on the acquired uplink resource blocks, and uplink data is transmitted on the acquired full-duplex resource blocks. A full-duplex user who activates the full-duplex communication function only detects the DCI for allocating full-duplex resources, and does not detect the DCI for allocating uplink resources and the DCI for allocating downlink resources. Downlink control information and/or data is received on downlink resource blocks of the acquired resources, uplink control information and/or data is transmitted on uplink resource blocks, and uplink data and downlink data are transmitted simultaneously on full-duplex resource blocks.

In addition, the base station may indicate, in the DCI, to the user whether the uplink control information is allowed to be transmitted on the full-duplex resource blocks. If allowed, the uplink control information of the user may be multiplexed with the data and then the multiplexed uplink control information and data are transmitted on the full-duplex resource blocks without waiting for the uplink resource blocks; otherwise, the user must transmit the uplink control information on the allocated uplink resource blocks. If there is no explicit indication in the DCI, the user only transmits the uplink control information on the uplink resource blocks by default.

Fourth Embodiment

In the present embodiment, another frame structure and corresponding information transmission rule and communication method are described.

Similarly to the third embodiment, each frame in the frame structure consists of 10 time slots, each of the time slots consists of 14 symbols, and different transmission directions may be configured for different frequency-domain resource blocks on the same symbol. Unlink the third embodiment, special symbols having a cyclic prefix and a cyclic suffix are used between each of downlink resource blocks and an adjacent uplink resource block (if any) and between each of the downlink resource blocks and an adjacent full-duplex resource block (if any) for protection. The special symbols here are OFDM symbols only for the downlink, and any suitable waveform may be used for the uplink. Similarly, in order to ensure a fixed total length of each symbol, a sum of lengths of the cyclic prefix and the cyclic suffix needs to be the same as a length of a cyclic prefix of another symbol. Preferably, each of the lengths of the cyclic prefix and the cyclic suffix of the special symbol may be a half of the length of the cyclic prefix of the other symbol, as shown in FIG. 21. In FIG. 21, special symbols having a cyclic suffix are used as a third symbol and a last symbol of a time slot.

In addition, a guard period may be used in combination with a cyclic suffix. For example, a guard period resource block is inserted into a last symbol of downlink resource blocks, and a special symbol having a cyclic suffix is used as a last symbol of a time slot in the downlink, as shown in FIG. 22.

Based on the frame structure, an information transmission rule of the user may be as follows: the control information is transmitted only on unidirectional time-frequency resource blocks, that is, downlink control information is transmitted only on downlink resource blocks, and uplink control information is transmitted only on uplink resource blocks; and the data may be transmitted on both unidirectional resource blocks and full-duplex resource blocks. When the downlink control information or data is transmitted on resource blocks of the special symbol, a downlink waveform of the entire symbol adopts an OFDM symbol having a cyclic prefix and a cyclic suffix. As shown in FIG. 21, any suitable waveform may be used for the uplink.

Based on the frame structure and the information transmission rule, a process for a user to perform initial access is the same as that in the third embodiment, and details thereof will not be described here again.

Based on the frame structure and the information transmission rule, the user performs the transmission according to the allocated time-frequency resources and the time slot resource block configuration manners. A specific manner is the same as that in the third embodiment, and details thereof will not be described here again.

In addition, the base station may indicate, in the DCI, to the user whether the uplink control information is allowed to be transmitted on the full-duplex resource blocks. A specific indication manner and a specific processing method of the user are the same as those in the third embodiment, and details thereof will not be described here again.

FIG. 23 is a block diagram illustrating an electronic device 2301 in a network environment 2300 according to various embodiments. The electronic device 2301 may be the UE shown in FIG. 20 or the base station shown in FIG. 21. Referring to FIG. 23, the electronic device 2301 in the network environment 2300 may communicate with an electronic device 2302 via a first network 2398 (e.g., a short-range wireless communication network), or an electronic device 2304 or a server 2308 via a second network 2399 (e.g., a long-range wireless communication network). According to an embodiment, the electronic device 2301 may communicate with the electronic device 2304 via the server 2308. According to an embodiment, the electronic device 2301 may include a processor 2320, memory 2330, an input device 2350, a sound output device 2355, a display device 2360, an audio module 2370, a sensor module 2376, an interface 2377, a haptic module 2379, a camera module 2380, a power management module 2388, a battery 2389, a communication module 2390, a subscriber identification module (SIM) 2396, or an antenna module 2397. In some embodiments, at least one (e.g., the display device 2360 or the camera module 2380) of the components may be omitted from the electronic device 2301, or one or more other components may be added in the electronic device 2301. In some embodiments, some of the components may be implemented as single integrated circuitry. For example, the sensor module 2376 (e.g., a fingerprint sensor, an iris sensor, or an illuminance sensor) may be implemented as embedded in the display device 2360 (e.g., a display).

The processor 2320 may execute, for example, software (e.g., a program 2340) to control at least one other component (e.g., a hardware or software component) of the electronic device 2301 coupled with the processor 2320, and may perform various data processing or computation. According to one embodiment, as at least part of the data processing or computation, the processor 2320 may load a command or data received from another component (e.g., the sensor module 2376 or the communication module 2390) in volatile memory 2332, process the command or the data stored in the volatile memory 2332, and store resulting data in non-volatile memory 2334. According to an embodiment, the processor 2320 may include a main processor 2321 (e.g., a central processing unit (CPU) or an application processor (AP)), and an auxiliary processor 2323 (e.g., a graphics processing unit (GPU), an image signal processor (ISP), a sensor hub processor, or a communication processor (CP)) that is operable independently from, or in conjunction with, the main processor 2321. Additionally or alternatively, the auxiliary processor 2323 may be adapted to consume less power than the main processor 2321, or to be specific to a specified function. The auxiliary processor 2323 may be implemented as separate from, or as part of the main processor 2321.

The auxiliary processor 2323 may control at least some of functions or states related to at least one component (e.g., the display device 2360, the sensor module 2376, or the communication module 2390) among the components of the electronic device 2301, instead of the main processor 2321 while the main processor 2321 is in an inactive (e.g., sleep) state, or together with the main processor 2321 while the main processor 2321 is in an active state (e.g., executing an application). According to an embodiment, the auxiliary processor 2323 (e.g., an image signal processor or a communication processor) may be implemented as part of another component (e.g., the camera module 2380 or the communication module 2390) functionally related to the auxiliary processor 2323.

The memory 2330 may store various data used by at least one component (e.g., the processor 2320 or the sensor module 2376) of the electronic device 2301. The various data may include, for example, software (e.g., the program 2340) and input data or output data for a command related thereto. The memory 2330 may include the volatile memory 2332 or the non-volatile memory 2334.

The program 2340 may be stored in the memory 2330 as software, and may include, for example, an operating system (OS) 2342, middleware 2344, or an application 2346.

The input device 2350 may receive a command or data to be used by other component (e.g., the processor 2320) of the electronic device 2301, from the outside (e.g., a user) of the electronic device 2301. The input device 2350 may include, for example, a microphone, a mouse, a keyboard, or a digital pen (e.g., a stylus pen).

The sound output device 2355 may output sound signals to the outside of the electronic device 2301. The sound output device 2355 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 2360 may visually provide information to the outside (e.g., a user) of the electronic device 2301. The display device 2360 may include, for example, a display, a hologram device, or a projector and control circuitry to control a corresponding one of the display, hologram device, and projector. According to an embodiment, the display device 2360 may include touch circuitry adapted to detect a touch, or sensor circuitry (e.g., a pressure sensor) adapted to measure the intensity of force incurred by the touch.

The audio module 2370 may convert a sound into an electrical signal and vice versa. According to an embodiment, the audio module 2370 may obtain the sound via the input device 2350, or output the sound via the sound output device 2355 or a headphone of an external electronic device (e.g., an electronic device 2302) directly (e.g., wiredly) or wirelessly coupled with the electronic device 2301.

The sensor module 2376 may detect an operational state (e.g., power or temperature) of the electronic device 2301 or an environmental state (e.g., a state of a user) external to the electronic device 2301, and then generate an electrical signal or data value corresponding to the detected state. According to an embodiment, the sensor module 2376 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 2377 may support one or more specified protocols to be used for the electronic device 2301 to be coupled with the external electronic device (e.g., the electronic device 2302) directly (e.g., wiredly) or wirelessly. According to an embodiment, the interface 2377 may include, for example, a high definition multimedia interface (HDMI), a universal serial bus (USB) interface, a secure digital (SD) card interface, or an audio interface.

A connecting terminal 2378 may include a connector via which the electronic device 2301 may be physically connected with the external electronic device (e.g., the electronic device 2302). According to an embodiment, the connecting terminal 2378 may include, for example, a HDMI connector, a USB connector, a SD card connector, or an audio connector (e.g., a headphone connector).

The haptic module 2379 may convert an electrical signal into a mechanical stimulus (e.g., a vibration or a movement) or electrical stimulus which may be recognized by a user via his tactile sensation or kinesthetic sensation. According to an embodiment, the haptic module 2379 may include, for example, a motor, a piezoelectric element, or an electric stimulator.

The camera module 2380 may capture a still image or moving images. According to an embodiment, the camera module 2380 may include one or more lenses, image sensors, image signal processors, or flashes.

The power management module 2388 may manage power supplied to the electronic device 2301. According to one embodiment, the power management module 2388 may be implemented as at least part of, for example, a power management integrated circuit (PMIC).

The battery 2389 may supply power to at least one component of the electronic device 2301. According to an embodiment, the battery 2389 may include, for example, a primary cell which is not rechargeable, a secondary cell which is rechargeable, or a fuel cell.

The communication module 2390 may support establishing a direct (e.g., wired) communication channel or a wireless communication channel between the electronic device 2301 and the external electronic device (e.g., the electronic device 2302, the electronic device 2304, or the server 2308) and performing communication via the established communication channel. The communication module 2390 may include one or more communication processors that are operable independently from the processor 2320 (e.g., the application processor (AP)) and is capable of a direct (e.g., wired) communication or a wireless communication. According to an embodiment, the communication module 2390 may include a wireless communication module 2392 (e.g., a cellular communication module, a short-range wireless communication module, or a global navigation satellite system (GNSS) communication module) or a wired communication module 2394 (e.g., a local area network (LAN) communication module or a power line communication (PLC) module). A corresponding one of these communication modules may communicate with the external electronic device via the first network 2398 (e.g., a short-range communication network, such as Bluetooth™, wireless-fidelity (Wi-Fi) direct, or infrared data association (IrDA)) or the second network 2399 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 2392 may identify and authenticate the electronic device 2301 in a communication network, such as the first network 2398 or the second network 2399, using subscriber information (e.g., international mobile subscriber identity (IMSI)) stored in the subscriber identification module 2396.

The antenna module 2397 may transmit or receive a signal or power to or from the outside (e.g., the external electronic device) of the electronic device 2301. According to an embodiment, the antenna module 2397 may include an antenna including a radiating element composed of a conductive material or a conductive pattern formed in or on a substrate (e.g., PCB). According to an embodiment, the antenna module 2397 may include a plurality of antennas. In such a case, at least one antenna appropriate for a communication scheme used in the communication network, such as the first network 2398 or the second network 2399, may be selected, for example, by the communication module 2390 (e.g., the wireless communication module 2392) from the plurality of antennas. The signal or the power may then be transmitted or received between the communication module 2390 and the external electronic device via the selected at least one antenna. According to an embodiment, another component (e.g., a radio frequency integrated circuit (RFIC)) other than the radiating element may be additionally formed as part of the antenna module 2397.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 2301 and the external electronic device 2304 via the server 2308 coupled with the second network 2399. Each of the electronic devices 2302 and 2304 may be a device of a same type as, or a different type, from the electronic device 2301. According to an embodiment, all or some of operations to be executed at the electronic device 2301 may be executed at one or more of the external electronic devices 2302, 2304, or 2308. For example, if the electronic device 2301 should perform a function or a service automatically, or in response to a request from a user or another device, the electronic device 2301, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 2301. The electronic device 2301 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 2340) including one or more instructions that are stored in a storage medium (e.g., internal memory 2336 or external memory 2338) that is readable by a machine (e.g., the electronic device 2301). For example, a processor (e.g., the processor 2320) of the machine (e.g., the electronic device 2301) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

These embodiments of the present disclosure ensure reliable transmission of control information while further improving the spectrum efficiency of the systems by reasonably allocating time-frequency resources for unidirectional transmission and bidirectional transmission.

The above description is merely a part of embodiments of the present application. It should be illustrated that those skilled in the art can also make several improvements and retouches without departing from the principle of the present application, and these improvements and retouches should be considered as falling within the protection scope of the present application.

The programs running on the device according to the present disclosure may be programs that enable the computer to implement functions of the embodiments of the present disclosure by controlling a central processing unit (CPU). The programs or information processed by the programs may be temporarily stored in a volatile memory, such as a random access memory (RAM), a hard disk drive (HDD), a non-volatile memory (e.g., flash memory), or other memory system.

The programs for implementing the functions of the embodiments of the present disclosure may be recorded on a computer-readable recording medium. Corresponding functions can be implementing by making the computer system read the programs recorded on the recording medium and execute these programs. The so-called "computer system" herein may be a computer system embedded in the device, and may include an operating system or hardware, such as a peripheral device. The "computer-readable recording medium" may be a semi-conductor recording medium, an optical recording medium, a magnetic recording medium, a recording medium for a short-time dynamic storage program, or any other computer readable recording medium.

Various features or functional blocks of the device used in the above embodiments may be implemented or executed by circuitry (e.g., monolithic or multi-chip integrated circuits). The circuitry designed to perform the functions described in this specification may include general purpose processors, digital signal processors (DSPs), application specific integrated circuits (ASICs), field programmable gate arrays (FPGAs), or other programmable logic devices, discrete gate or transistor logic, discrete hardware components, or any combination of the above devices. The general purpose processor may be a microprocessor or any existing processor, controller, microcontroller, or state machine. The circuit may be a digital circuit or an analog circuit. One or more embodiments of the present disclosure may also be implemented using these new integrated circuit techniques in the event of a new integrated circuit technology that replaces existing integrated circuits due to advances in semiconductor technology.

As described above, the embodiments of the present disclosure have been described in detail with reference to the accompanying drawings. However, the specific structure is not limited to the above-described embodiments, and the present disclosure also includes any design modifications that do not depart from the spirit of the present disclosure. In addition, various modifications may be made to the present disclosure within the scope of the claims, and the embodiments obtained by appropriate combinations of the technical means disclosed in the different embodiments are also included within the technical scope of the present disclosure. In addition, the components having the same effects described in the above embodiments may be substituted for each other.

The foregoing descriptions are only preferred embodiments of the present disclosure and a description of the technical principles of the present disclosure. It should be understood by those skilled in the art that the scope of the present disclosure recited in this application is not limited to the particular combinations of the above technical features and should also cover other technical solutions formed by any combinations of the technical features described above or their equivalent features without departing from the inventive concept, e.g., the technical solutions formed by the above mentioned features being interchangeable with, but not limited to, technical features having similar functions as disclosed in this application.

The invention claimed is:

1. A method of scheduling for a user equipment (UE), comprising:
   dividing M UEs into N groups, wherein a distance metric between each UE in a group and a center of the group does not exceed a first predetermined threshold, where M and N are positive integers, and M≥N;
   pairing the N groups, wherein a distance metric between centers of the paired groups is greater than a second predetermined threshold; and
   in a case where there is a group paired with a group to which a first UE for which scheduling is to be performed belongs, scheduling transmissions in different directions respectively for the first UE and a second UE from the paired group on a same time-frequency resource.

2. The method of claim 1, wherein when M>N, said dividing the M UEs into the N groups comprises:
   initially dividing the M UEs into N0 groups based on a distance metric between any two of the M UEs, where N0 is a positive integer, and N0≤N;
   for each of the N0 groups,
   determining whether a distance metric between each UE in the group and an initial center of the group exceeds the first predetermined threshold, wherein the initial center of the group is obtained by averaging positions of the UEs in the group;
   if there is a UE in the group whose distance metric from the initial center of the group exceeds the first predetermined threshold, subdividing the group into two groups based on the distance metric between any two of the UEs in the group;
   for each of the two groups,
   determining whether a distance metric between the UE in the group and the center of the group exceeds the first predetermined threshold;
   if there is a UE in the group whose distance metric from the center of the group exceeds the first predetermined threshold, repeating the subdividing step; and
   if there is no UE in the group whose distance metric from the center of the group exceeds the first predetermined threshold, repeating the determining step for the next group, until there is no UE in any of the groups whose distance metric from the center of the group exceeds the first predetermined threshold; and
   obtaining the center of the group by averaging the positions of the UEs in the group.

3. The method of claim 1, wherein said scheduling the transmissions in different directions respectively for the first UE and the second UE from the paired group on the same time-frequency resource further comprises:
   pre-configuring a time slot to preferentially schedule an uplink transmission or a downlink transmission thereon;
   selecting, based on a predetermined scheduling criterion, the first UE whose transmission traffic meets a transmission requirement of a direction of the preferentially scheduled transmission;
   selecting, from the group paired with the group to which the first UE belongs, the second UE whose transmission traffic meets a transmission requirement in a different direction; and
   scheduling the transmissions in different directions in the time slot respectively for the selected first UE and second UE.

4. The method of claim 1, wherein said scheduling the transmissions in different directions respectively for the first UE and the second UE from the paired group on the same time-frequency resource further comprises:

determining an uplink UE and a downlink UE in a time slot based on a formula for a sum rate given as:

$$RD + \alpha RU$$

where RD is a downlink rate of one of the first UE and the second UE in the time slot, RU is an uplink rate of the other of the first UE and the second UE in the time slot, and α is a weighting coefficient configured by a system for determining a ratio of the uplink rate in the time slot in said scheduling;

selecting, based on a predetermined scheduling criterion, the first UE and the second UE whose sum rate meets a transmission requirement; and scheduling the transmissions in different directions in the time slot respectively for the selected first UE and second UE.

5. The method of claim 1, further comprising:

in a case of access by a new UE, sequentially determining whether a distance metric between the new UE and the center of each group exceeds the first predetermined threshold;

if there is a group for which a distance metric between its center and the new UE is smaller than the first predetermined threshold, assigning the new UE to the group; and if the distance metric between the new UE and the center of each group exceeds the first predetermined threshold, assigning the new UE to a new group.

6. The method of claim 1, further comprising updating the group, which comprises:

when a report is received from a reporting UE, determining whether the distance metric between the reporting UE and the center of the group to which the reporting UE belongs exceeds the first predetermined threshold;

if the distance metric between the reporting UE and the center of the group to which the reporting UE belongs exceeds the first predetermined threshold, sequentially determining whether the distance metric between the reporting UE and the center of each of the remaining groups exceeds the first predetermined threshold;

if there is a group for which the distance metric between its center and the reporting UE is smaller than the first predetermined threshold, assigning the reporting UE to the group; and if the distance metric between the reporting UE and the center of each group exceeds the first predetermined threshold, assigning the reporting UE to a new group.

7. The method of claim 1, further comprising:

in a case where there is no group paired with the group to which the first UE for which the scheduling is to be performed belongs, performing the scheduling based on a transmission traffic requirement from the first UE.

8. A base station, comprising:

a processor; and a memory storing computer executable instructions that, when executed by the processor, cause the base station to:

divide M UEs into N groups, wherein a distance metric between each UE in a group and a center of the group does not exceed a first predetermined threshold, where M and N are positive integers, and M≥N;

pair the N groups, wherein a distance metric between centers of the paired groups is greater than a second predetermined threshold; and in a case where there is a group paired with a group to which a first UE for which scheduling is to be performed belongs, schedule transmissions in different directions respectively for the first UE and a second UE from the paired group on a same time-frequency resource.

* * * * *